United States Patent
Ogaya et al.

(10) Patent No.: US 11,214,012 B2
(45) Date of Patent: Jan. 4, 2022

(54) ULTRASONIC WELDING METHOD, STRUCTURE WELDED BY ULTRASONIC WELDING METHOD, AND ULTRASONIC WELDING DEVICE

(71) Applicant: SEIDENSHA ELECTRONICS CO., LTD., Tokyo (JP)

(72) Inventors: Shigeru Ogaya, Tokyo (JP); Noriaki Matsugishi, Tokyo (JP)

(73) Assignee: SEIDENSHA ELECTRONICS CO., LTD., Tokyo (JP)

( * ) Notice: Subject to any disclaimer, the term of this patent is extended or adjusted under 35 U.S.C. 154(b) by 0 days.

(21) Appl. No.: 17/046,376

(22) PCT Filed: Apr. 12, 2019

(86) PCT No.: PCT/JP2019/015975
§ 371 (c)(1),
(2) Date: Oct. 9, 2020

(87) PCT Pub. No.: WO2019/198816
PCT Pub. Date: Oct. 17, 2019

(65) Prior Publication Data
US 2021/0154944 A1    May 27, 2021

(30) Foreign Application Priority Data

Apr. 13, 2018   (JP) .............................. JP2018-078022

(51) Int. Cl.
*B32B 37/00*   (2006.01)
*B29C 65/08*   (2006.01)
*B29K 101/12*   (2006.01)

(52) U.S. Cl.
CPC ........ *B29C 65/081* (2013.01); *B29K 2101/12* (2013.01)

(58) Field of Classification Search
USPC ...................................... 425/174.2
See application file for complete search history.

(56) References Cited

U.S. PATENT DOCUMENTS

| 8,250,725 B2 * | 8/2012 | Sigler ..................... B29C 61/02 29/447 |
| 11,027,498 B2 * | 6/2021 | Li ..................... B29C 66/72143 |

FOREIGN PATENT DOCUMENTS

| JP | S55-129607 U | 9/1980 |
| JP | H02-117815 A | 5/1990 |

(Continued)

OTHER PUBLICATIONS

International Search Report, dated Jul. 2, 2019 by the Japan Patent Office, in International Application No. PCT/JP2019/015975.

(Continued)

*Primary Examiner* — James D Sells
(74) *Attorney, Agent, or Firm* — Greenblum & Bernstein, P.L.C.

(57) ABSTRACT

A pair of thermoplastic resin members are placed on an anvil. A pressing force of a tool horn vibrating ultrasonically in a direction not perpendicular to but along upper surfaces of the pair of thermoplastic resin members is applied to the upper surfaces. The application of the pressing force of the tool horn vibrating ultrasonically allows melting of a vicinity of the upper surfaces of the pair of thermoplastic resin members. A welded structure part is formed on an unwelded structure part, thereby welding the pair of thermoplastic resin members as an overlap structure including the welded structure part arranged on the unwelded structure part. The distance and positional relationship between the pair of thermoplastic resin members after the welding are unchanged before and after the welding. The surfaces, (Continued)

placed on the anvil, of the thermoplastic resin members are neither burned nor discolored.

14 Claims, 48 Drawing Sheets

(56) References Cited

FOREIGN PATENT DOCUMENTS

| | | |
|---|---|---|
| JP | H10-273115 A | 10/1998 |
| JP | 2003-136613 A | 5/2003 |
| JP | 2017-218703 A | 12/2017 |

OTHER PUBLICATIONS

Extended European Search Report, dated May 3, 2021 by the European Patent Office (EPO), for European Application No. 19785641.2.

Yuji Watanabe et al., "Ultrasonic Joining of Polytetrafluoroethylene Sheets Using a Lateral Face of Rod Vibrating Longitudinally at 19 kHz", Japanese Journal of Applied Physics, vol. 35, Part 1, No. 5B, May 1996, pp. 3263-3266, XP-000721087 (in English).

* cited by examiner

ULTRASONIC WELDING METHOD, STRUCTURE WELDED BY ULTRASONIC WELDING METHOD, AND ULTRASONIC WELDING DEVICE

TECHNICAL FIELD

The present invention relates to an ultrasonic welding method, a structure welded by the ultrasonic welding method, and an ultrasonic welding machine. In the method, welding is performed by pressing an ultrasonically vibrating tool horn directly onto the surfaces of a pair of thermoplastic resin members, or indirectly with another thermoplastic resin member interposed therebetween. More specifically, the present invention relates to the following ultrasonic welding method, a structure welded by the ultrasonic welding method, and an ultrasonic welding machine. In the ultrasonic welding method, the same distance and positional relationship are kept between the facing end surfaces of a pair of thermoplastic resin members before and after ultrasonic welding. In addition, conditions of anvil-side surfaces of the pair of thermoplastic resin members are kept unchanged before and after the ultrasonic welding so as not to be burned and discolored.

BACKGROUND ART

Suitcases with casters are widely used for overseas trips. Each suitcase needs to be distinguishable from others so that it can be smoothly picked up by the owner from a baggage carousel at an airport. For this purpose, a lot of unique suitcases with plastic containers in unique shapes, patterns, unevenness, or colors are available. However, suitcase manufacturers sell their products attached with the same brand nameplate. The suitcases, with casters, produced by the same manufacturer and having completely the same appearance and brand nameplate may come out one after another onto a baggage carousel at an airport. In such a case, it is difficult to distinguish the suitcases with the same appearance and the same brand nameplate from each other.

As shown in FIG. 51, a brand nameplate 100 includes thermoplastic resin plates in two different colors. Purchasers select a preferred combination of two colors, for example, a white plate 10 and a red plate 11 and paste the plates onto their suitcases 200. Even suitcases 200 with completely the same appearance are more likely to be distinguishable from each other, if the combinations of the two colors of the brand nameplates 100 and the right and left positions of the two colors are different. Alternatively, the purchaser may select a preferred combination of two patterns and paste plates with the two patterns onto the suitcase. This configuration allows the owners to distinguish their own suitcases 200 from others without attaching any unique sticker or belt as an identifier. It is however not easy to weld thermoplastic resin plates in two different colors or patterns into a beautiful brand nameplate.

It is known that burning occurs if excessive heat is generated when stacked plastic sheets or thin plastic plates, which are sandwiched between an anvil and a tool horn, are welded using the tool horn vibrating ultrasonically (see, e.g., Patent Document 1).

The following technique may be used to weld a pair of thermoplastic resin members placed on an anvil with their end surfaces facing each other. That is, for example, as shown in FIGS. 52A and 52B, the lower surfaces of a pair of thermoplastic resin members 10 and 11 are placed on an anvil 70; with the end surfaces of the pair of thermoplastic resin members 10 and 11 facing each other, the lower surface of another thermoplastic resin member 12 is stacked on the tops of the facing end surfaces; and a tool horn 20 vibrating ultrasonically in a vertical direction of the figure (i.e., perpendicularly to the surface of the thermoplastic resin member 12) is pressed onto the upper surface of the other thermoplastic resin member 12, thereby welding the thermoplastic resin members.

In FIGS. 53, (a), (b), (c), and (d) show steps of ultrasonic welding. The end surfaces of the pair of thermoplastic resin members 10 and 11 face each other. The other thermoplastic resin member 12 is stacked on the tops of the facing end surfaces.

For easier understanding, the following description assumes that the thermoplastic resin member 10 is a "white plate" and the thermoplastic resin member 11 as a "red plate". As long as generating heat and melting upon application of ultrasonic vibration, the thermoplastic resin members 10 and 11 may have any hardness, thickness, shape, color, pattern, transparency, material, or other characteristics.

Although the anvil 70 may not be shown in FIG. 53 and other figures, it is to be understood that the thermoplastic resin members 10, 11, and 12 are placed on the anvil 70.

In (a) of FIG. 53, when the tool horn 20 vibrating ultrasonically, for example, at an amplitude of several tens of μm and a frequency of 40 kHz is pressed onto the upper surface of the other thermoplastic resin member 12, the pressing force is applied to the entire width (W0) that is slightly greater than the width (H0) of the tool horn 20. The ultrasonic vibration energy is then transmitted to the thermoplastic resin members 10, 11, and 12, thereby generating heat and melting the thermoplastic resin members.

In (b) of FIG. 53, the pressing surface of the tool horn 20 sinks into the surface of the thermoplastic resin member 12 to form a recess 12c. Once the tool horn 20 ascends, as shown in (c) of FIG. 53, the thermoplastic resin members 10, 11, and 12 melt each other and are cooled to be welded as indicated by the dotted line within the width (W0) that is slightly greater than the width (H0) of the tool horn 20. In FIG. 53, (c) shows states of the thermoplastic resin members 10, 11, and 12 after the welding and partially includes a cross section. In FIG. 53, (d) shows states of the thermoplastic resin members 10, 11, and 12 after the welding.

FIG. 54 is a perspective view showing the thermoplastic resin members 10, 11, and 12 after the welding operation. The rectangular recess 12c is formed in the surface of the thermoplastic resin member 12. FIG. 55 is a perspective view in which the welded thermoplastic resin members 10, 11, and 12 are turned over. It can be seen from FIG. 55 that the gap (S) between the facing end surfaces of the pair of thermoplastic resin members 10 and 11 is not a constant distance (S1) as it is before the welding, but increases to a distance (S2) near the area in which heat is generated by the welding. With an increase in the distance between letters, the positional relationship between the letters changes and the letters are distorted. The surface of the area (G) where heat is generated by the welding of the surface (P) printed with the letters "ABC" is burned and discolored.

In an ultrasonic welding machine according to the background art shown in FIGS. 52A and 52B, the tool horn 20 vibrates ultrasonically in the vertical direction toward the thermoplastic resin members 10, 11, and 12. The tool horn 20 applies ultrasonic vibration energy like hitting the entire region where the thermoplastic resin member 12 is stacked on the thermoplastic resin members 10 and 11 to apply the pressing force. Accordingly, the melted thermoplastic resin members 10, 11, and 12 break into the gap (S) between the facing end surfaces of the pair of thermoplastic resin members 10 and 11. Depending on the location, the gap (s) between the facing end surfaces of the pair of thermoplastic resin members 10 and 11 increases from the distance (S1) before the welding to the distance (S2). This increase changes the positional relationship and results in badly finished facing end surfaces, which makes it difficult to obtain a finish quality at a certain level.

In addition, the tool horn 20 transmits the ultrasonic vibration energy along the thicknesses of the thermoplastic resin members 10, 11, and 12. Accordingly, the heat is generated in the entire region where the thermoplastic resin members 10, 11 and 12 are stacked one another right under the pressing surface of the tool horn 20. Thus, upon application of excessive ultrasonic vibration energy, the surfaces (p), abutting on the anvil, of the thermoplastic resin members 10 and 11 may be burned and discolored. As shown in FIG. 55, with the letters "ABC" or other characters printed thereon, the surfaces (P) of the thermoplastic resin members 10 and 11 are finished significantly poor.

CITATION LIST

Patent Document

PATENT DOCUMENT 1: Japanese Utility Model Publication No. S55-129607

SUMMARY OF THE INVENTION

Technical Problems

It is an objective of the present invention to provide an ultrasonic welding method, a structure welded by the ultrasonic welding method, and an ultrasonic welding machine, in which the same distance and positional relationship between facing end surfaces of a pair of thermoplastic resin members are kept before and after the ultrasonic welding, and in which conditions of the anvil-side surfaces of the pair of thermoplastic resin members are kept unchanged before and after the ultrasonic welding.

Solution to the Problem

According to the ultrasonic welding method, the structure welded by the ultrasonic welding method, and the ultrasonic welding machine according to the present invention, a pair of thermoplastic resin members are placed on an anvil. A pressing force of a tool horn vibrating ultrasonically in a direction not perpendicular to but along upper surfaces of the pair of thermoplastic resin members is applied to the upper surfaces. The application of ultrasonic vibration energy allows melting of a vicinity of the upper surfaces of the pair of thermoplastic resin members. A welded structure part is formed on an unwelded structure part, thereby welding the pair of thermoplastic resin members in an overlap structure including the welded structure part arranged on the unwelded structure part.

The ultrasonic vibration energy is supplied from the pressing surface of the tool horn in the direction along the surfaces of the pair of thermoplastic resin members, and is not directed in a thickness direction of the pair of thermoplastic resin members. Accordingly, heat is generated near the surfaces, abutting on the pressing surface of the tool horn, of the thermoplastic resin members, but less heat is generated near the anvil-side surfaces of the thermoplastic resin members. The melted thermoplastic resin members are present near the surfaces, abutting on the pressing surface of the tool horn, of the thermoplastic resin members and do not break into the gap between the facing end surfaces of the pair of thermoplastic resin members. This configuration keeps the positional relationship and generates less heat near the anvil-side surfaces of the thermoplastic resin members so that the surfaces are neither burned nor discolored.

In this configuration, even after the ultrasonic welding, the distance and positional relationship between the facing end surfaces of the pair of thermoplastic resin members are kept unchanged before and after the ultrasonic welding. In addition, conditions of the surfaces, not abutting on another thermoplastic resin member, of the pair of thermoplastic resin members are kept unchanged before and after the ultrasonic welding.

Advantages of the Invention

The present invention provides an ultrasonic welding method, a structure welded by the ultrasonic welding method, and an ultrasonic welding machine. The distance and positional relationship between facing end surfaces of a pair of thermoplastic resin members can be kept unchanged before and after the ultrasonic welding. In addition, conditions of the anvil-side surfaces of the pair of thermoplastic resin members can be kept unchanged before and after the ultrasonic welding.

DESCRIPTION OF EMBODIMENTS

First Embodiment of Present Invention

Figure 1A:
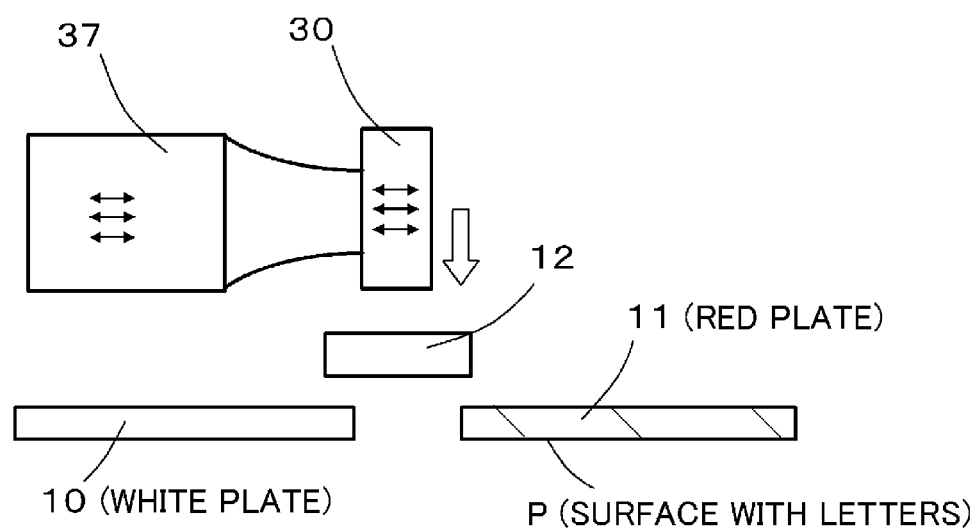
FIG. 1A shows a pair of thermoplastic resin members, another thermoplastic resin member, a tool horn, and their positional relationship in an ultrasonic welding machine according to a first embodiment of the present invention.
Figure 1B:
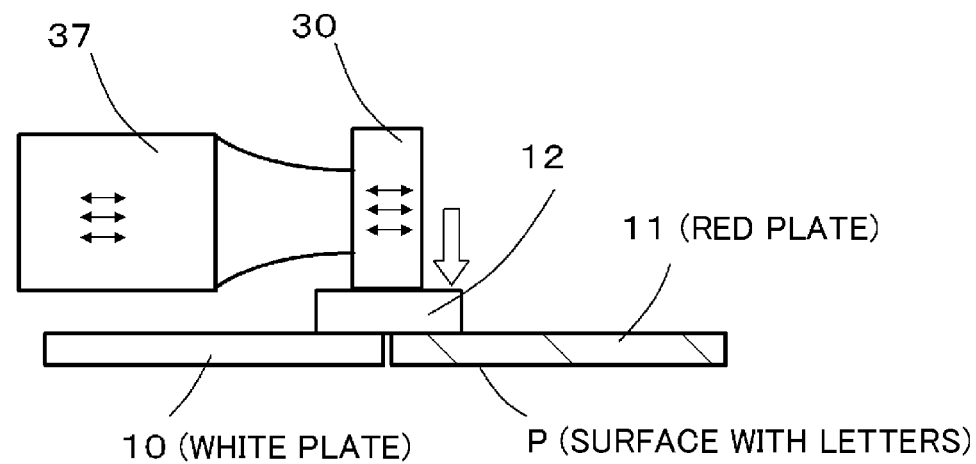
FIG. 1B shows the pair of thermoplastic resin members, the other thermoplastic resin member, the tool horn, and their positional relationship in the ultrasonic welding machine according to the first embodiment of the present invention.

FIGS. 1A and 1B show a pair of thermoplastic resin members, another thermoplastic resin member, a tool horn, and their positional relationship in an ultrasonic welding machine according to a first embodiment of the present invention.

In FIG. 1B, the lower surfaces of a pair of thermoplastic resin members 10 and 11 are placed on an anvil 70 (not shown). With the end surfaces of the pair of thermoplastic resin members 10 and 11 facing each other, the lower surface of another thermoplastic resin member 12 is stacked on the tops of the facing end surfaces. This is the same as in the background art shown in FIG. 52B.

In FIG. 1B, however, the tool horn 30 vibrating ultrasonically in a direction along the upper surface of the other thermoplastic resin member 12 (i.e., horizontally to the surface of the thermoplastic resin member 12) is pressed onto the upper surface of the other thermoplastic resin member 12. The present invention will be described below with this positional relationship as a reference positional relationship.

Figure 52A:
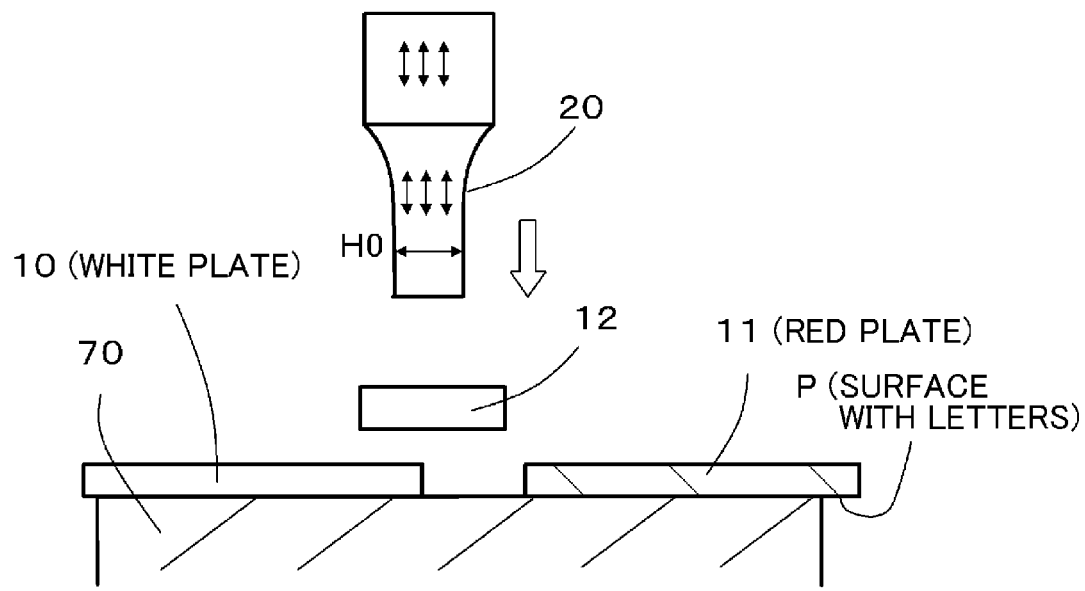
FIG. 52A shows a positional relationship among a pair of thermoplastic resin members, another thermoplastic resin member, and a tool horn in an ultrasonic welding machine according to the background art.
Figure 52B:
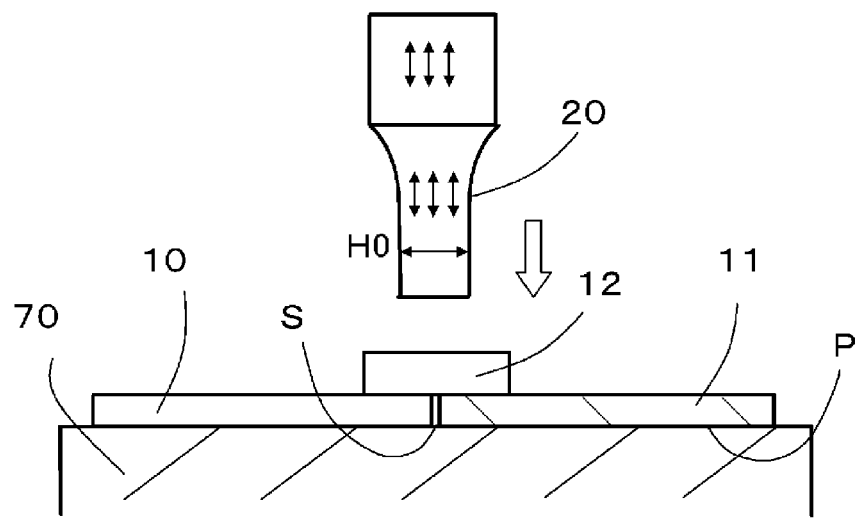
FIG. 52B shows a positional relationship among the pair of thermoplastic resin members, the other thermoplastic resin member, and the tool horn in the ultrasonic welding machine according to the background art.
Figure 53:
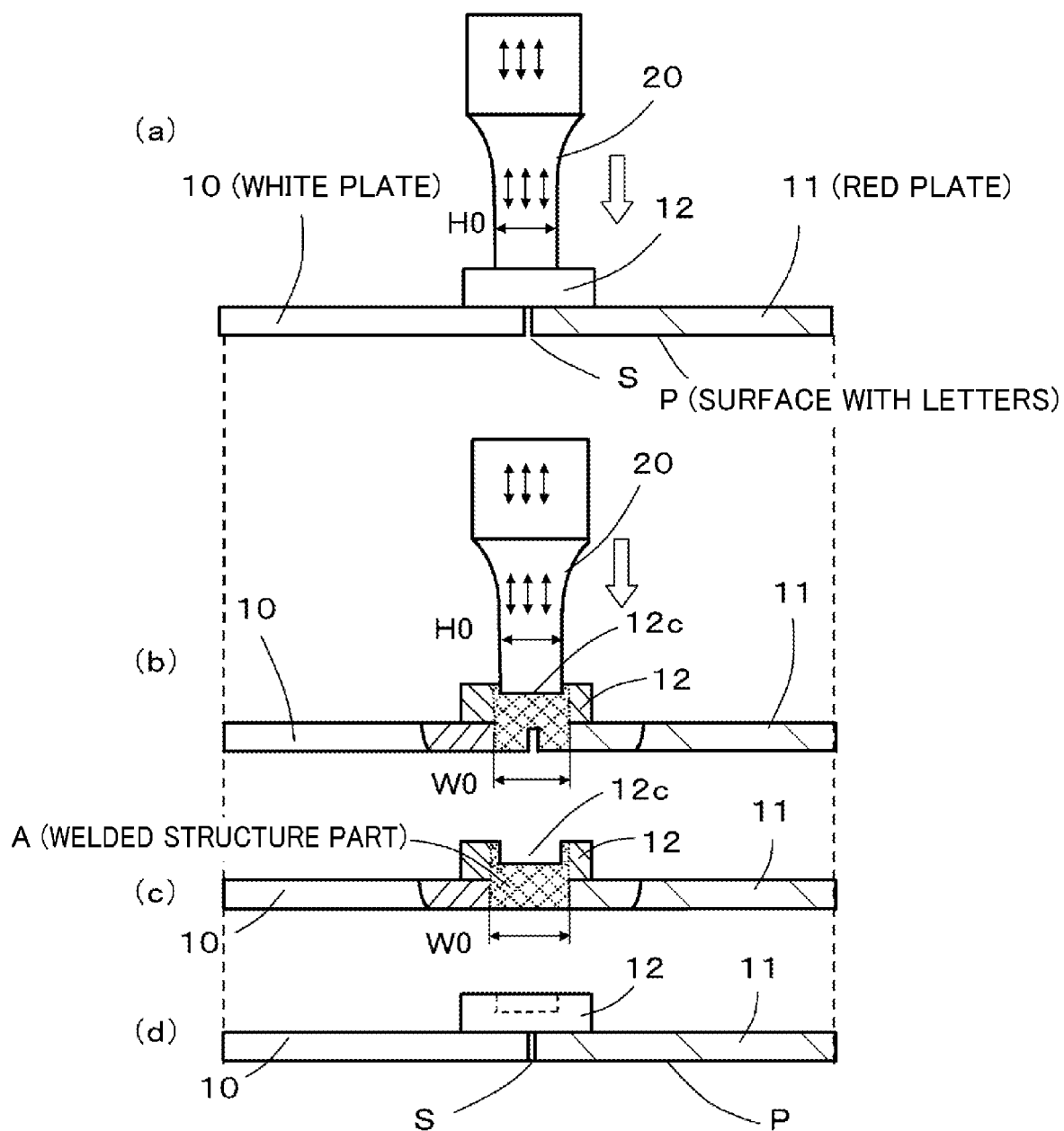
FIG. 53 includes (a) and (b) which show a positional relationship when the tool horn applies ultrasonic vibration energy to the pair of thermoplastic resin members and the other thermoplastic resin member in the ultrasonic welding machine according to the background art; (c) which shows a cross section of a part of a structure welded by the ultrasonic welding machine according to the background art; and (d) which shows an appearance of the structure welded by the ultrasonic welding machine according to the background art.
Figure 54:
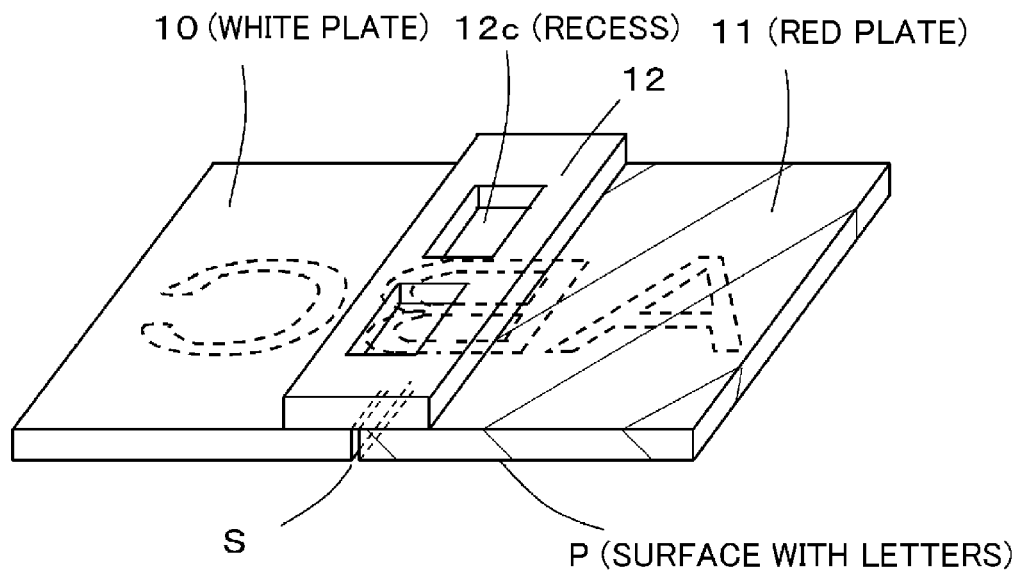
FIG. 54 is a perspective view of the brand nameplate that is the structure welded by the ultrasonic welding machine according to the background art.
Figure 55:
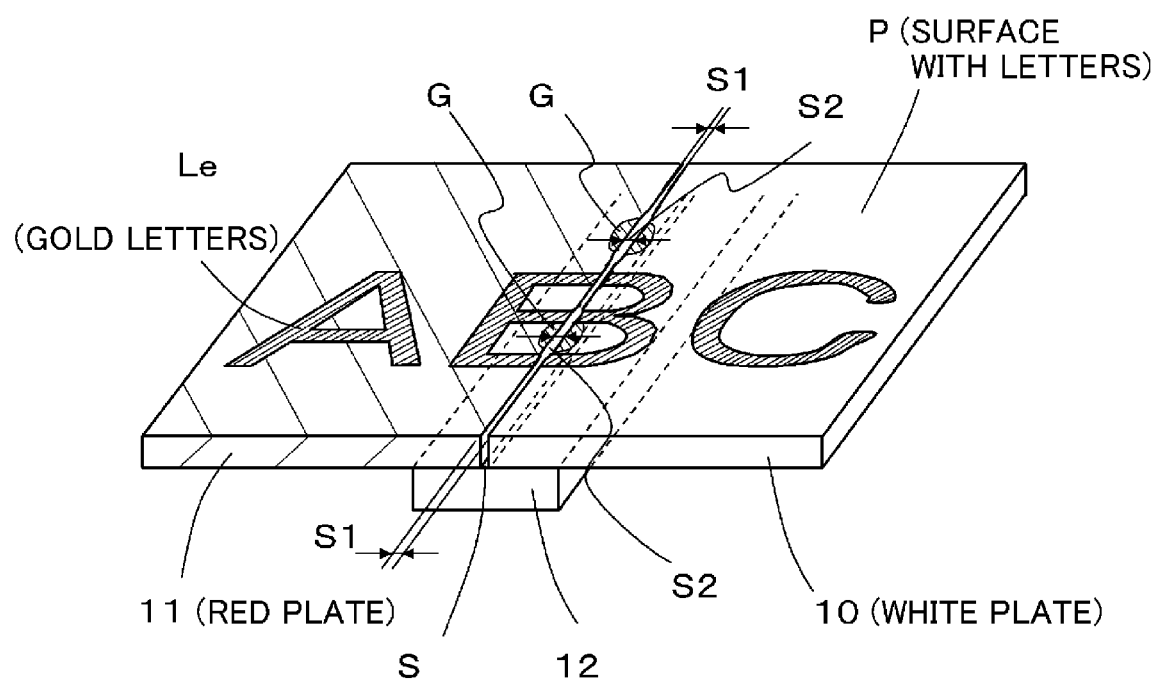
FIG. 55 is a perspective view showing a surface, printed with letters "ABC" and placed on the anvil at the time of welding and now turned over, of the brand nameplate that is the structure welded by the ultrasonic welding machine according to background art and turned over.

In FIGS. 1A and 1B, the tool horn 30 vibrates differently from that in the background art in FIGS. 52A, 52B, and 53. The tool horn 30 vibrates ultrasonically in two opposite directions along the surfaces (i.e., in parallel to the surfaces) of the pair of thermoplastic resin members 10 and 11 and the other thermoplastic resin member 12. The following description assumes that one facing thermoplastic resin member 10 is a white plate, whereas the other facing thermoplastic resin member 11 is a red plate.

Depending on the direction of the ultrasonic vibration, how the ultrasonic vibration is transmitted differs. Depending on how the ultrasonic vibration is transmitted, how heat is generated in and transmitted to the pair of thermoplastic resin members 10 and 11 and the other thermoplastic resin member 12, how the materials melt, and how the materials are welded together differ. When the tool horn vibrates ultrasonically in two opposite directions along the surfaces (i.e., in parallel to the surfaces) of the thermoplastic resin members 10, 11, and 12, the ultrasonic vibration energy is transmitted in the two opposite directions along the surfaces (i.e., parallel to the surfaces) of the thermoplastic resin members 10, 11, and 12.

Note that the tool horn 30 according to this first embodiment vibrates ultrasonically in the direction along the straight line intersecting the facing surfaces of the pair of thermoplastic resin members 10 and 11, as the two opposite directions along the upper surfaces of the thermoplastic resin members. However, as long as the ultrasonic vibration energy is transmitted in two opposite directions along the surfaces (i.e., in parallel to the surfaces) of the thermoplastic resin members 10, 11, and 12, the two opposite directions may intersect with the facing surfaces at a predetermined angle or be parallel to the facing surfaces as necessary in the welding operation.

Figure 2:
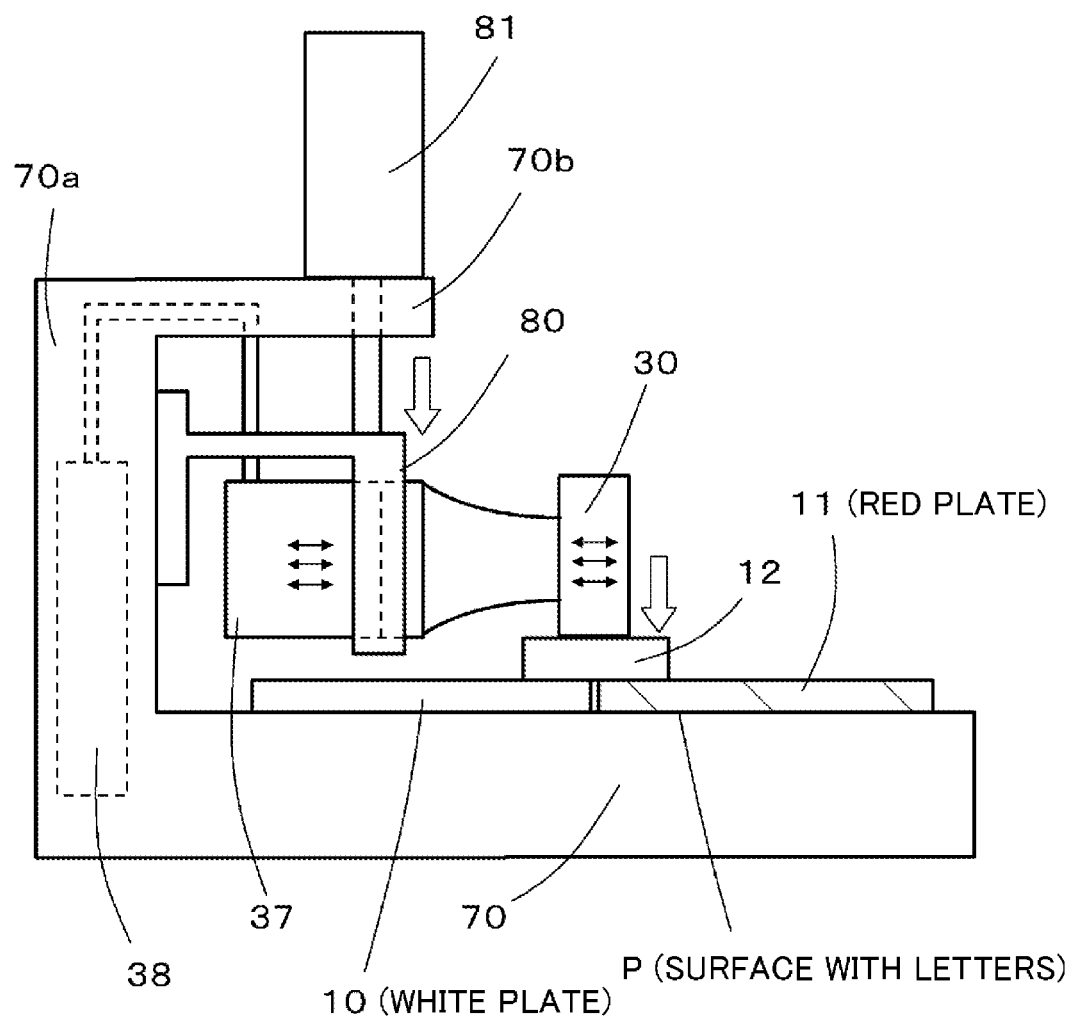
FIG. 2 is a front view of the ultrasonic welding machine according to the first embodiment of the present invention.

FIG. 2 is a front view of the ultrasonic welding machine according to the first embodiment of the present invention. The ultrasonic welding machine in FIG. 2 includes the anvil 70, the tool horn 30, an ultrasonic vibrator 37, an ultrasonic vibration controller 38, a support 80 for the tool horn 30, a vertical mover 81, a column 70a, and a mount 70b for the vertical mover. The pair of thermoplastic resin members 10 and 11 and the other thermoplastic resin member 12 are placed on the anvil 70. The tool horn 30 presses a region near the facing end surfaces of the pair of thermoplastic resin members 10 and 11 from above the other thermoplastic resin member 12. The ultrasonic vibrator 37 ultrasonically vibrates the pressing surface of the tool horn 30 in two opposite directions along the surfaces of the pair of thermoplastic resin members 10 and 11 and the other thermoplastic resin member 12. The vertical mover 81 moves the tool horn 30 and the support 80 vertically and integrally.

The tool horn 30 in FIG. 2 is made of a material such as titanium or duralumin and includes a cuboid press on the right, a curved, truncated conical connector at the center, and a columnar base on the left which are integrally milled from the material. The ultrasonic vibrator 37 that is a piezoelectric element such as a piezo vibrator is attached to end surface of the columnar base on the left.

Again, the tool horn 30 according to this embodiment is conically tapered from the columnar base to the top at which the cuboid press is formed. The press applies the pressing force onto the thermoplastic resin member 12 using, as the pressing surface, its lower surface toward the thermoplastic resin (i.e., toward the anvil).

The ultrasonic vibration controller 38, which will be described later, causes the ultrasonic vibrator 37 to ultrasonically vibrate the press of the tool horn 30 at an amplitude of several tens of μm and a frequency within the range from about 20 kHz to about 40 kHz. The lower surface of the press of the tool horn 30 is used as the pressing surface.

The column 70a is on the left of, and integral with, the anvil 70. The mount 70b for the vertical mover is located on the column 70a. An air press, which is the vertical mover 81, is attached to the mount 70b for the vertical mover so as to be directed downward. The support 80 for the tool horn 30 is, as a hanging, fixed and attached to the top of a vertically moving actuator of the air press. In FIG. 2, the left end of the support 80 for the tool horn 30 abuts on a slide guide of the column 70a and is slidably guided. When the top of the actuator of the air press serving as the vertical mover 81 descends, the pressing surface of the tool horn 30 is pressed the region near the facing end surfaces of the pair of thermoplastic resin members 10 and 11 from above the other thermoplastic resin member 12.

The ultrasonic vibration controller 38 of the tool horn 30 indicated by the broken line in the column 70a has a control signal line and a power supply line connected to the ultrasonic vibrator 37. When the ultrasonic vibrator 37 is driven, the pressing surface of the tool horn 30 vibrates ultrasonically in two opposite directions along the surfaces of the pair of thermoplastic resin members 10 and 11 and the other thermoplastic resin member 12. The pressing surface of the tool horn 30 presses the region near the facing end surfaces of the pair of thermoplastic resin members 10 and 11 from above the other thermoplastic resin member 12, and applies ultrasonic vibration energy to the other thermoplastic resin member 12 and the region near the facing end surfaces of the pair of thermoplastic resin members 10 and 11. The thermoplastic resin members 10, 11, and 12 undergo processes of heat generation, melting, cooling, and solidification and are then welded together. Accordingly, a recess is formed in the other thermoplastic resin member 12.

Figure 3:
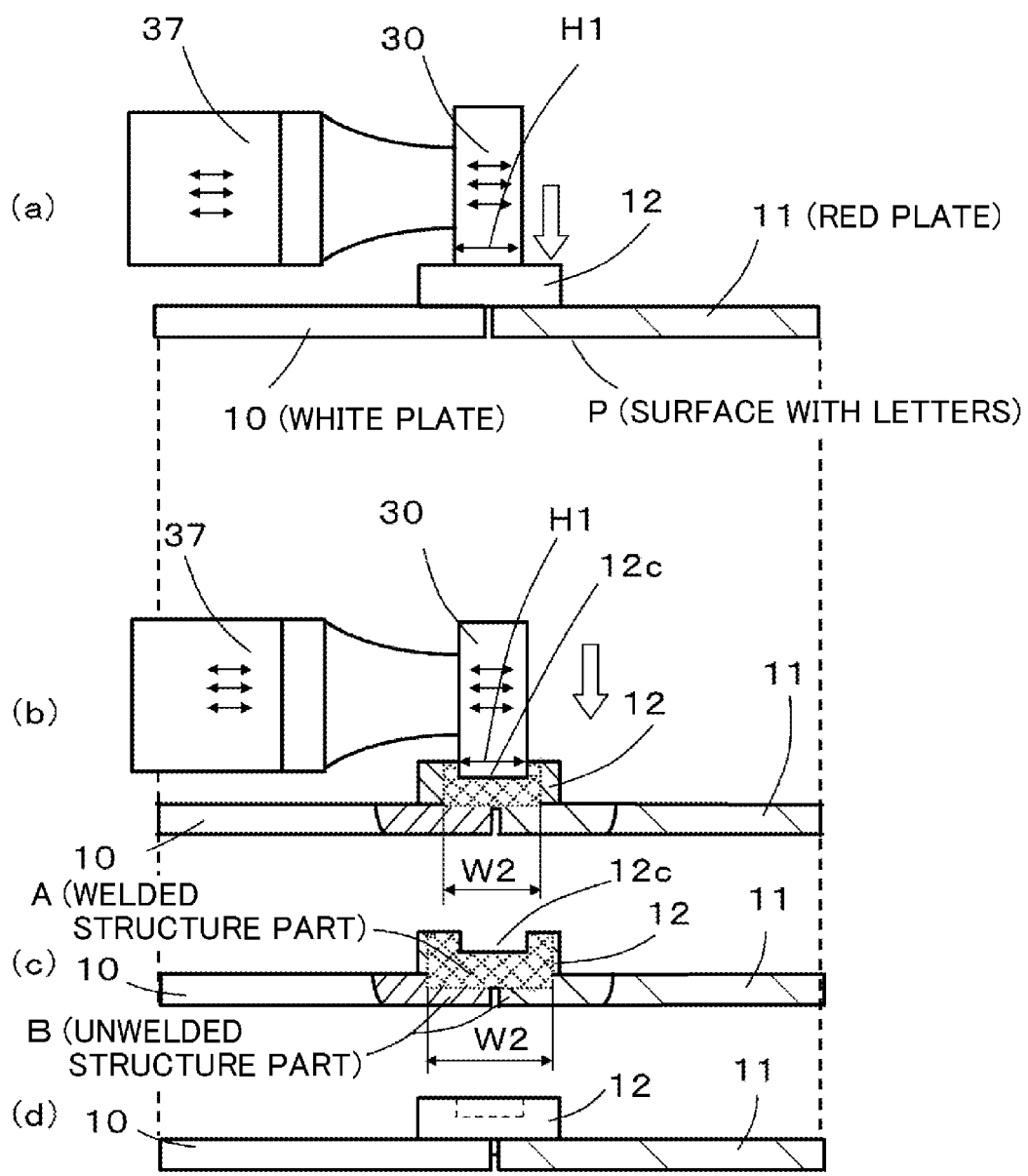
FIG. 3 includes: (a) and (b) which show a positional relationship where the tool horn applies ultrasonic vibration energy to the pair of thermoplastic resin members and the other thermoplastic resin member in the ultrasonic welding machine according to the first embodiment of the present invention; (c) which shows a cross section of a part of a structure welded by the ultrasonic welding method and machine according to the first embodiment of the present invention; and (d) which shows an appearance of the structure welded by the ultrasonic welding method and machine according to the first embodiment of the present invention.

In FIG. 3, (a) shows a positional relationship where the tool horn 30 applies the ultrasonic vibration energy to the pair of thermoplastic resin members 10 and 11 and the other thermoplastic resin member 12 in the ultrasonic welding machine according to the first embodiment of the present invention. The pressing surface of the tool horn 30 is pressed on the upper surface of the other thermoplastic resin member 12 placed on the pair of thermoplastic resin members 10 and 11 whose end surfaces face each other. Accordingly, the horizontal ultrasonic vibration energy in the drawing is applied to the upper surface of the other thermoplastic resin member 12.

As shown in (b) of FIG. 3, the pressing surface of the tool horn 30 descends as indicated by the white arrow while rubbing the upper surface of the other thermoplastic resin member 12 horizontally in the drawing paper so that the upper surface of the other thermoplastic resin member 12 melts to form the recess 12c. On the plane on which the other thermoplastic resin member 12 abuts on the pair of thermoplastic resin members 10 and 11, the thermoplastic resin members across the width (W2) that is greater than the width (H1) of the pressing surface of the tool horn 30.

As shown in (c) of FIG. 3, when the tool horn 30 ultrasonically vibrates for a predetermined period and ascends and stops the ultrasonic vibration thereafter, the melted region is cooled and solidified to be welded. In FIG. 3, (c) shows a cross section of a part of the pair of thermoplastic resin members and the other thermoplastic resin member after the welding in the first embodiment of the present invention. In FIG. 3, (d) shows appearances of the pair of thermoplastic resin members and the other thermoplastic resin member after the welding.

The ultrasonic vibration energy is supplied from the pressing surface of the tool horn 30 in a direction along the surfaces of the pair of thermoplastic resin members 10 and 11, that is, horizontally in FIG. 3, and is not directed in a thickness direction of the pair of thermoplastic resin members 10 and 11, that is, downward in FIG. 3. Accordingly, more heat is generated near the surface, abutting on the pressing surface of the tool horn 30, of the thermoplastic resin member 12, but less heat is generated near the anvil-side surfaces of the thermoplastic resin members 10 and 11. The melted thermoplastic resin members are present near the surface, abutting on the pressing surface of the tool horn 30, of the thermoplastic resin member 12 and do not break into the gap between the facing end surfaces of the pair of thermoplastic resin members 10 and 11. Since less heat is generated near the anvil-side surfaces of the thermoplastic resin members 10 and 11, burning or discoloration of the surfaces does not occur.

The ultrasonic welding machine according to the first embodiment of the present invention can keep the distance between the facing end surfaces of the pair of thermoplastic resin members 10 and 11 unchanged before and after the ultrasonic welding. The ultrasonic welding machine can also keep conditions of the surfaces, not abutting on the other thermoplastic resin member 12, of the pair of thermoplastic resin members 10 and 11 unchanged before and after the ultrasonic welding.

Figure 4:
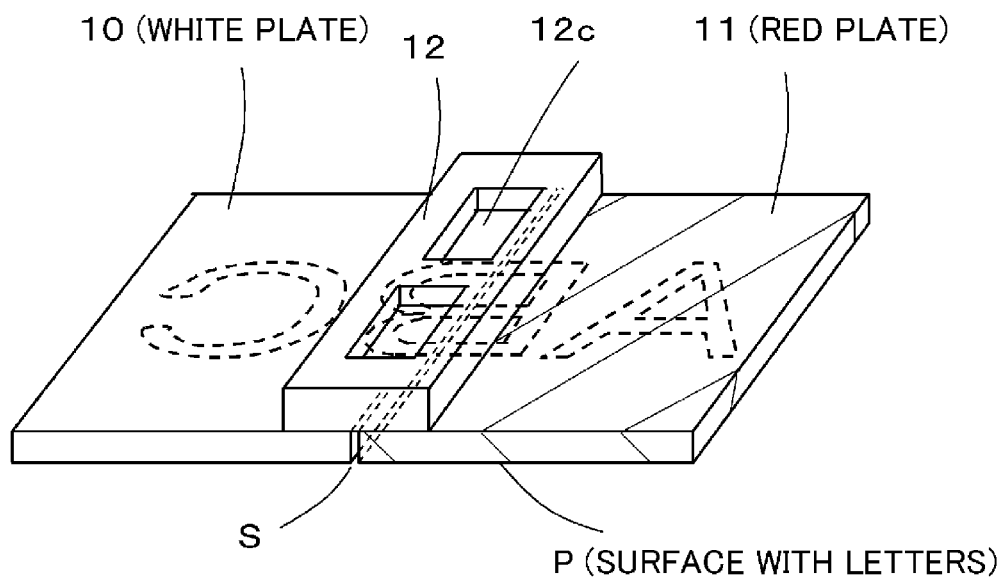
FIG. 4 is a perspective view of the structure welded by the ultrasonic welding method and machine according to the first embodiment of the present invention.

FIG. 4 is a perspective view of the thermoplastic resin members 10, 11, and 12 after a welding operation, that is, the structure welded by the ultrasonic welding method and the ultrasonic welding machine according to the first embodiment of the present invention. The recess 12c is formed in the upper surface of the other thermoplastic resin member 12. Although not shown in FIG. 4, the rest of the thermoplastic resin member 12 after forming the recess 12c is raised around the recess 12c. The melted thermoplastic resin members do not move toward the anvil, where less heat is generated, from near the surface, abutting on the pressing surface of the tool horn 30, of the thermoplastic resin member 12, and do not break into the gap between the facing end surfaces of the pair of thermoplastic resin members 10 and 11.

Figure 5:
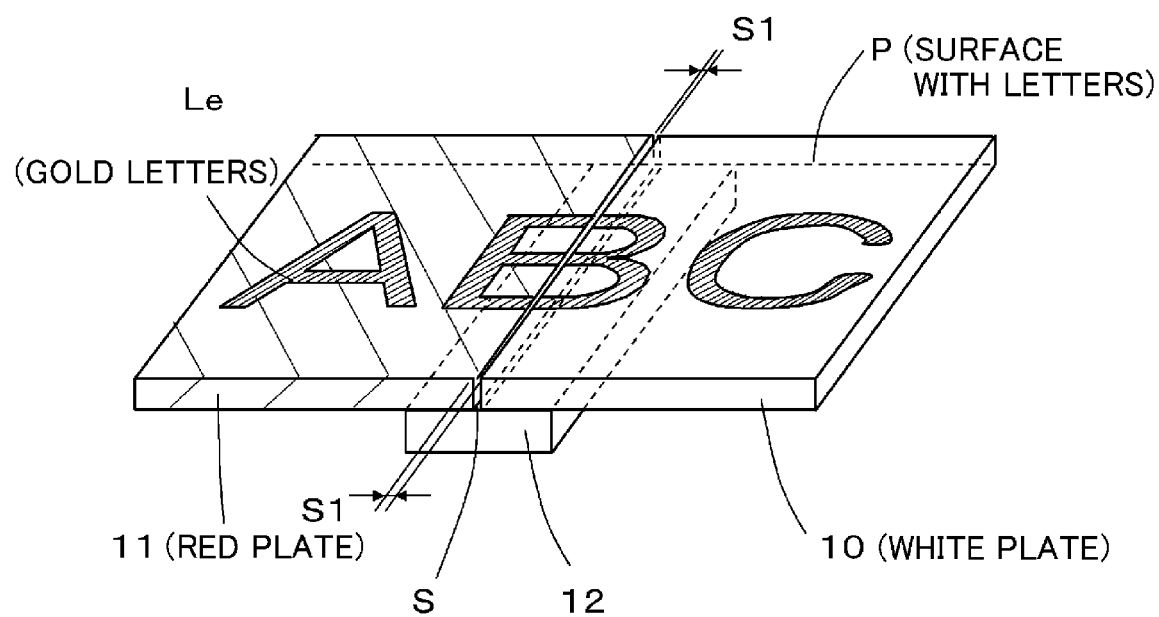
FIG. 5 is a perspective view of surfaces, printed with letters and placed on the anvil at the time of welding and now turned over, of the structure welded by the ultrasonic welding method and machine according to the first embodiment of the present invention.

FIG. 5 is a perspective view of the surfaces (P), printed with letters "ABC" and placed on the anvil at the time of welding and now turned over, of the thermoplastic resin members 10 and 11 after the welding operation, which is a structure welded by the ultrasonic welding method and machine according to the first embodiment of the present invention. The distance (S1), that is, the gap (S) between the facing end surfaces of the pair of thermoplastic resin members 10 and 11 is uniform and the same as before the welding. Moreover, the temperatures of the surfaces printed with the letters "ABC" do not increase, and burning or discoloration of the surfaces does not occur. The letters "ABC" themselves, which are gold letters (Le) in this embodiment, are not discolored.

FIGS. 4 and 5 illustrate that the gap (S) in a predetermined size of 1 mm or smaller is left between the facing end surfaces of the pair of thermoplastic resin members 10 and 11. The size of the gap (S) may be determined as necessary. Thus, as will be shown later in FIG. 6B, the end surfaces of a pair of thermoplastic resin members 40 and 41 may cohere, that is, be welded together with no gap (S) or conversely, with a wider gap (S).

Second Embodiment of Present Invention

Figure 6A:
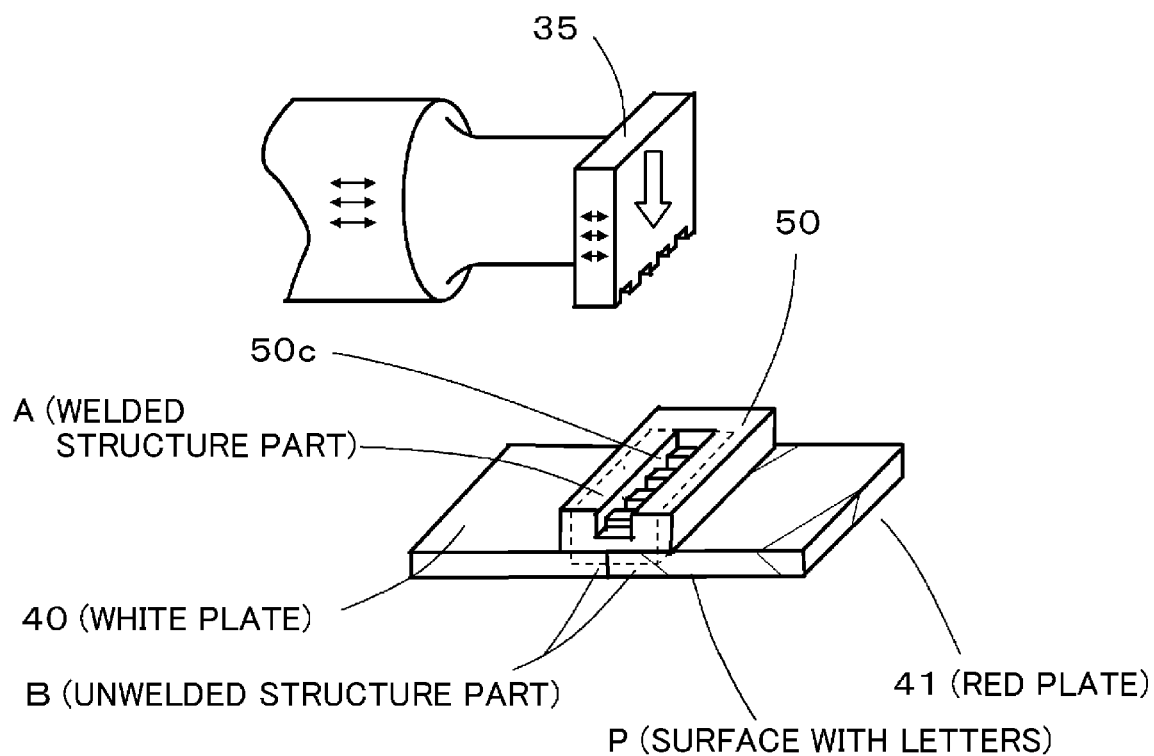
FIG. 6A shows a positional relationship between a tool horn and a structure welded by an ultrasonic welding method and an ultrasonic welding machine according to a second embodiment of the present invention.

As a second embodiment of the present invention, FIG. 6A shows a positional relationship among a pair of thermoplastic resin members 40 and 41, another thermoplastic resin member 50, and a tool horn 35. The resin members form a structure welded by an ultrasonic welding method and an ultrasonic welding machine according to the second embodiment of the present invention.

The tool horn 35 according to this embodiment has a pressing surface with projections and recesses. Accordingly, a recess 50c has a surface with projections and recesses corresponding to the projections and recesses of the pressing surface of the tool horn 35.

In this embodiment, the ultrasonic vibration energy is applied from the tool horn 35 in two opposite directions along the upper surface of the thermoplastic resin member 50. Accordingly, heat is generated in an area from the surface, abutting on the pressing surface of the tool horn 35, of the thermoplastic resin member 50 to a region beyond the interface between thermoplastic resin member 50 and the thermoplastic resin members 40 and 41. However, less heat is generated near the anvil-side surfaces of the thermoplastic resin members 40 and 41. The melted thermoplastic resin members are present in the area from the surface, abutting on the pressing surface of the tool horn 35, of the thermoplastic resin member 50 to the region beyond the interface between the thermoplastic resin member 50 and the thermoplastic resin members 40 and 41, and do not break into the gap between the facing end surfaces of the pair of thermoplastic resin members 40 and 41. Since less heat is generated near the anvil-side surfaces of the thermoplastic resin members 40 and 41, burning or discoloration of the surfaces does not occur.

Figure 6B:
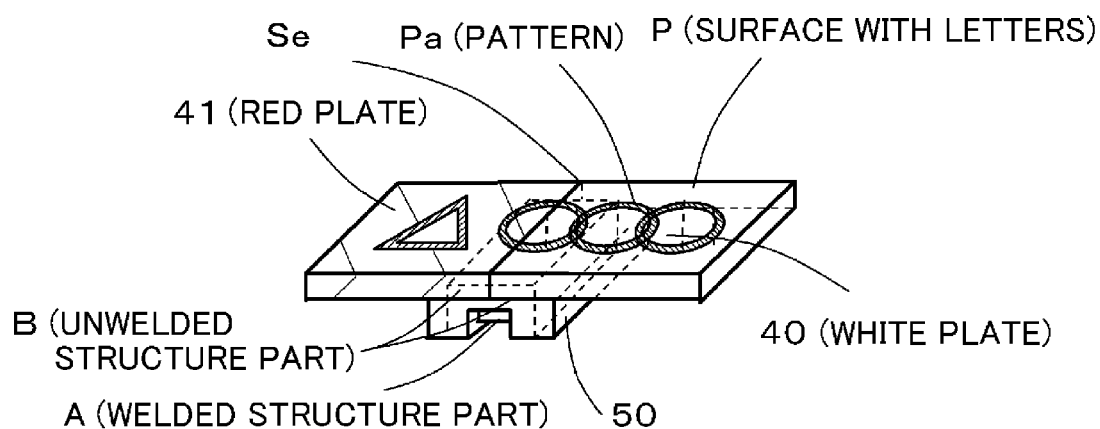
FIG. 6B shows the structure welded by the ultrasonic welding method according to the second embodiment of the present invention, and the structure is turned over.

As in FIG. 6B showing the thermoplastic resin members 40 and 41 that are turned over after the ultrasonic welding, the gap between the facing surfaces of the thermoplastic resin members 40 and 41 remains like a straight line Se with a constant width, and it was confirmed that the anvil-side surfaces of the thermoplastic resin members 40 and 41 were neither burned nor colored. Note that FIG. 6B shows a brand nameplate with a surface P (i.e., the surface with letters) printed with a pattern including circles and a triangle instead of the letters "ABC."

The ultrasonic welding method, the structure welded by the ultrasonic welding method, and the ultrasonic welding machine according to the present invention can keep the distance between the facing end surfaces of the pair of thermoplastic resin members unchanged before and after the ultrasonic welding. In addition, the method, structure, and machine can keep conditions of the anvil-side surfaces of the pair of thermoplastic resin members unchanged before and after the ultrasonic welding.

While the pressing surface of the tool horn 30 is the rectangular plane in the first embodiment of the present invention, the pressing surface of the tool horn 35 is an uneven surface with alternating projections and recesses in the second embodiment of the present invention. On the pressing surface that is the uneven surface with alternating projections and recesses, the thermoplastic resin pushed away by the projections easily moves into the spaces of the recesses adjacent to the projections. If the pressing surface of the tool horn is a rectangular plane, the entire rectangular plane needs to sink into a recess, thereby requiring a greater pressing force. If the pressing surface is an uneven surface with alternating projections and recesses, the pressing force of the projections pushing the resin suffices. That is, the welding operation proceeds with a smaller pressing force.

Figure 7:
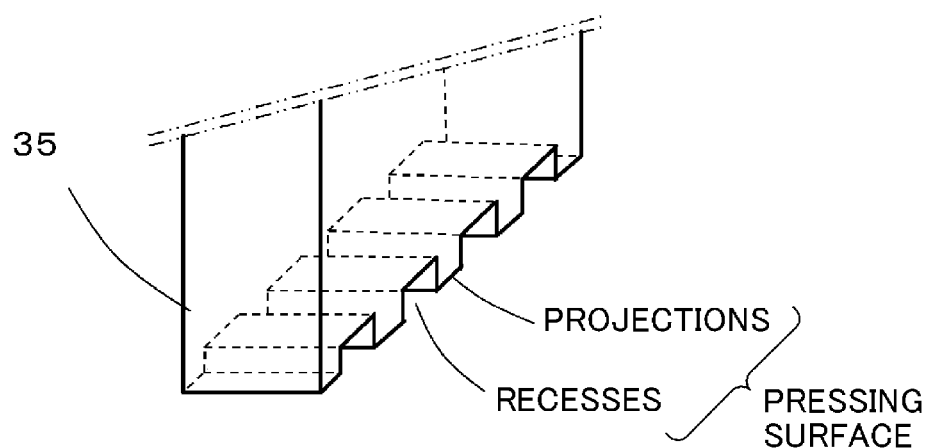
FIG. 7 is an enlarged partial perspective view of a press of the tool horn of the ultrasonic welding machine according to the second embodiment of the present invention.
Figure 8A:
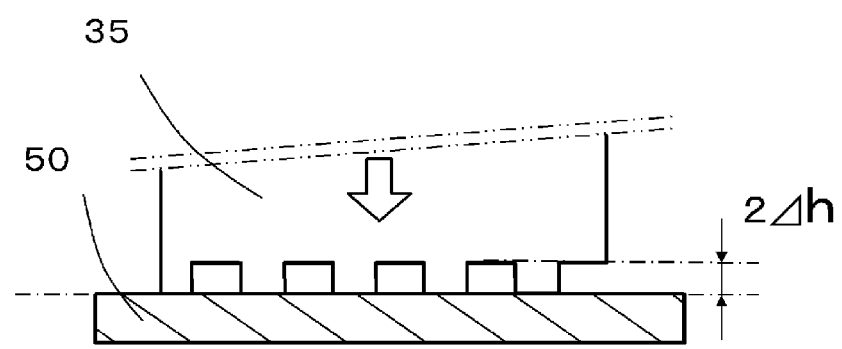
FIG. 8A shows a moment of starting the welding using the tool horn of the ultrasonic welding machine according to the second embodiment of the present invention.
Figure 8B:
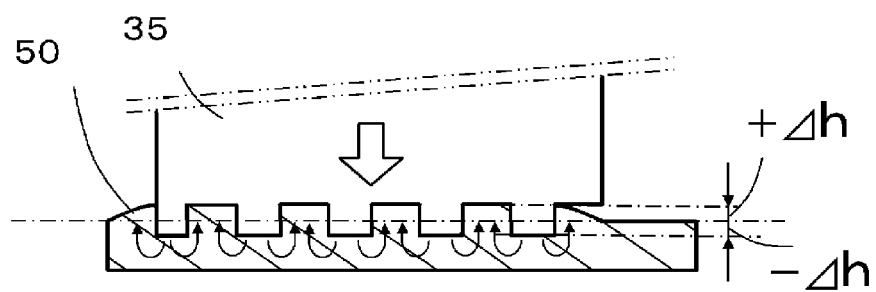
FIG. 8B shows a moment of ending the welding using the tool horn of the ultrasonic welding machine according to the second embodiment of the present invention.

FIG. 7 is an enlarged partial perspective view of a press of the tool horn according to the second embodiment of the present invention. FIG. 8A shows a moment of starting the welding using the tool horn according to the second embodiment of the present invention. FIG. 8B shows a moment of ending the welding using the tool horn according to the second embodiment of the present invention.

Specifically, in a case in which the pressing surface of the tool horn 35 is an uneven surface with alternating projections and recesses as shown in FIGS. 7, 8A and 8B and in which the projections and recesses of the pressing surface have a height difference of 2Δh as shown in FIG. 8A, the thermoplastic resin abutting on the projections of the pressing surface of the tool horn 35 starts melting at the moment of start of the welding using the tool horn 35. At this moment, since only the thermoplastic resin abutting on the projections of the pressing surface of the tool horn 35 melts, a small pressing force suffices to melt the thermoplastic resin.

As shown in FIG. 8B, if the projections of the pressing surface of the tool horn 35 sink by Δh, the thermoplastic resin pushed away by the projections rises by Δh in the recesses of the pressing surface of the tool horn 35. In the figure, the arrows represent movements of the thermoplastic resin pushed away by the projections into the recesses.

Both the projections and recesses of the pressing surface of the tool horn 35, that is, the entire pressing surface of the tool horn 35 abuts on the thermoplastic resin members. The process then enters the phase of pushing down the thermoplastic resin members having the same area as in the case of using the rectangular plane as the pressing surface of the tool horn 35. Until the projections of the pressing surface of the tool horn 35 sink by Δh, a smaller pressing force suffices to melt the thermoplastic resin. Once both the projections and recesses of the pressing surface of the tool horn 35, that is, the entire pressing surface of the tool horn 35 abuts on the thermoplastic resin members, the load resistance increases, thereby requiring a greater pressing force.

In this time point, the recess 50c is already formed in the upper surface of the other thermoplastic resin member 50, and the other thermoplastic resin member 50 melts. The pair of thermoplastic resin members 40 and 41 under the thermoplastic resin member 50 also melt together.

As the welding operation, in this time point, the ultrasonic vibration is stopped to cool, solidify, and weld the resin members. At this time, a smaller pressing force suffices for the welding operation. Depending on the required welding operation conditions, the tool horn 35 may turn to ascend upon detection that a load resistance is increased by the entire pressing surface of the tool horn 35 pressed onto the thermoplastic resin members. In this case, application of a smaller pressing force suffices to end the welding operation.

In FIG. 6A, the shape of the recess 50c after the welding shows the state in which both the projections and recesses of the pressing surface of the tool horn 35, that is, the entire pressing surface of the tool horn 35 abuts on the thermoplastic resin members, and thereafter, the thermoplastic resin members having the same area as in the case of using the rectangular plane as the pressing surface of the tool horn 35 are pressed down and welded together. This configuration provides a greater welding strength.

Figure 9:
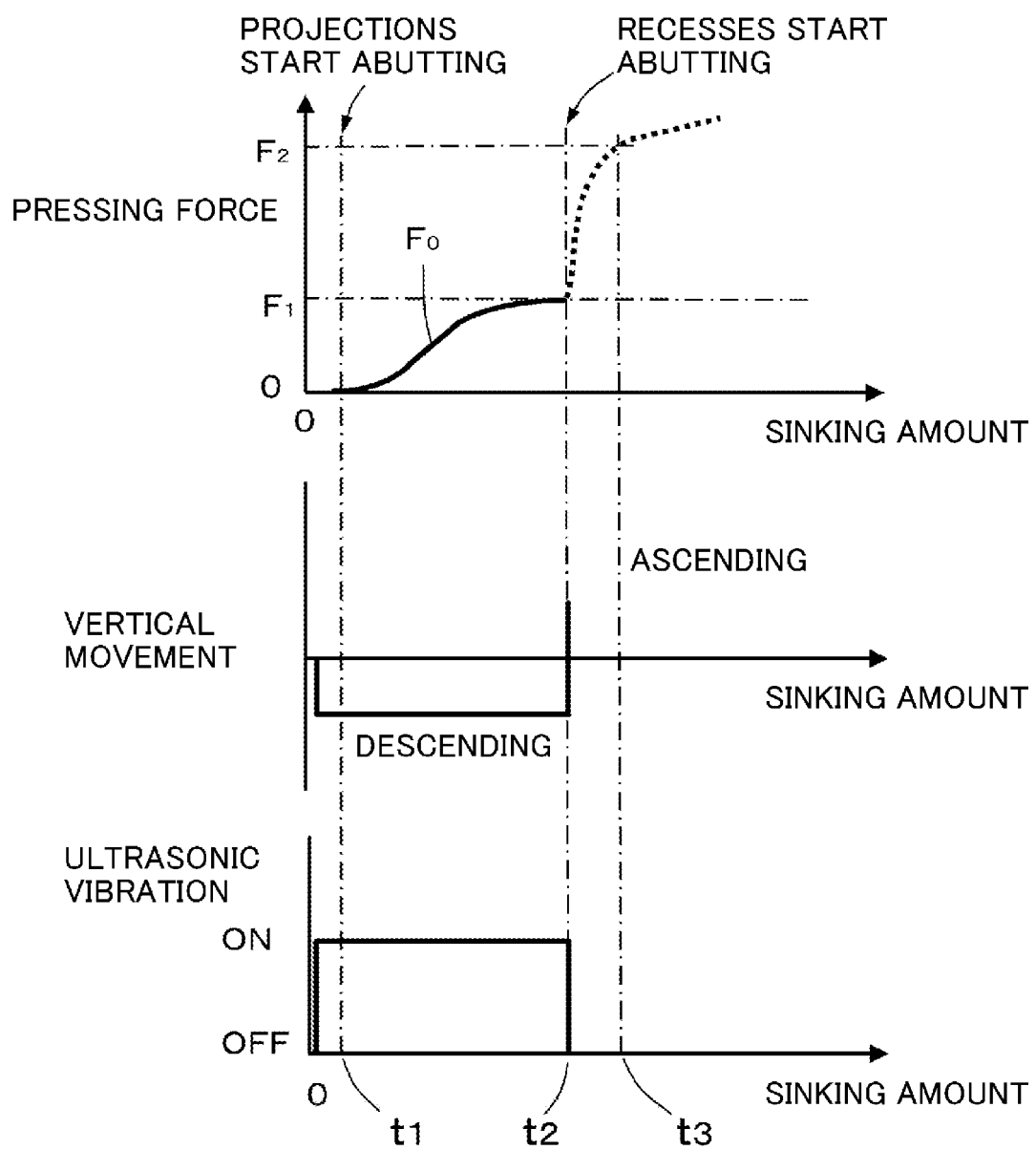
FIG. 9 is a graph showing a sinking amount of the pressing surface, the pressing force, the direction of the vertical movement, and the time relationship (timing) of the ultrasonic vibration of the tool horn according to the second embodiment of the present invention. The horizontal axis represents the sinking amount of the pressing surface of the tool horn.

In FIG. 9, the horizontal axis represents the amount of the top of the pressing surface of the tool horn 35 sinking into the thermoplastic resin member, whereas the vertical axis represents the pressing force required for the tool horn 35 to be pressed onto the thermoplastic resin member, the direction of the vertical movement of the tool horn 35, and the ON/OFF state of the ultrasonic vibration driving. Apparent from FIG. 9 is the relationship between the times when the pressing surface proceeds to sink into the thermoplastic resin member and the pressing force, the direction of the vertical movement of the tool horn, and the ON/OFF state of the ultrasonic vibration driving.

In FIG. 9, first, when the ultrasonic vibration starts, that is, the tool horn starts descending, the projections of the pressing surface of the tool horn 35 start abutting on the thermoplastic resin member 50 at the time indicated by the amount t1 of sinking. When the projections start sinking into the thermoplastic resin member 50, the pressing force gradually increases from zero as the amount of sinking increases. Then, all the projections sink, so that the recesses abut on the thermoplastic resin member 50. If the tool horn 35 stops descending and turns to ascend at this time indicated by the amount t2 of sinking, it is possible to end the welding operation by only allowing the projections to sink into the thermoplastic resin member 50.

If there is a need to sink all the projections and recesses, the tool horn continues to descend even after the time indicated by t2 until the pressing force increases to a predetermined magnitude. For example, at the time indicated by the amount t3 of sinking, the tool horn 35 stops descending and turns to ascend so that the projections and recesses sink into the thermoplastic resin member 50 and that the welding operation ends.

Figure 10:
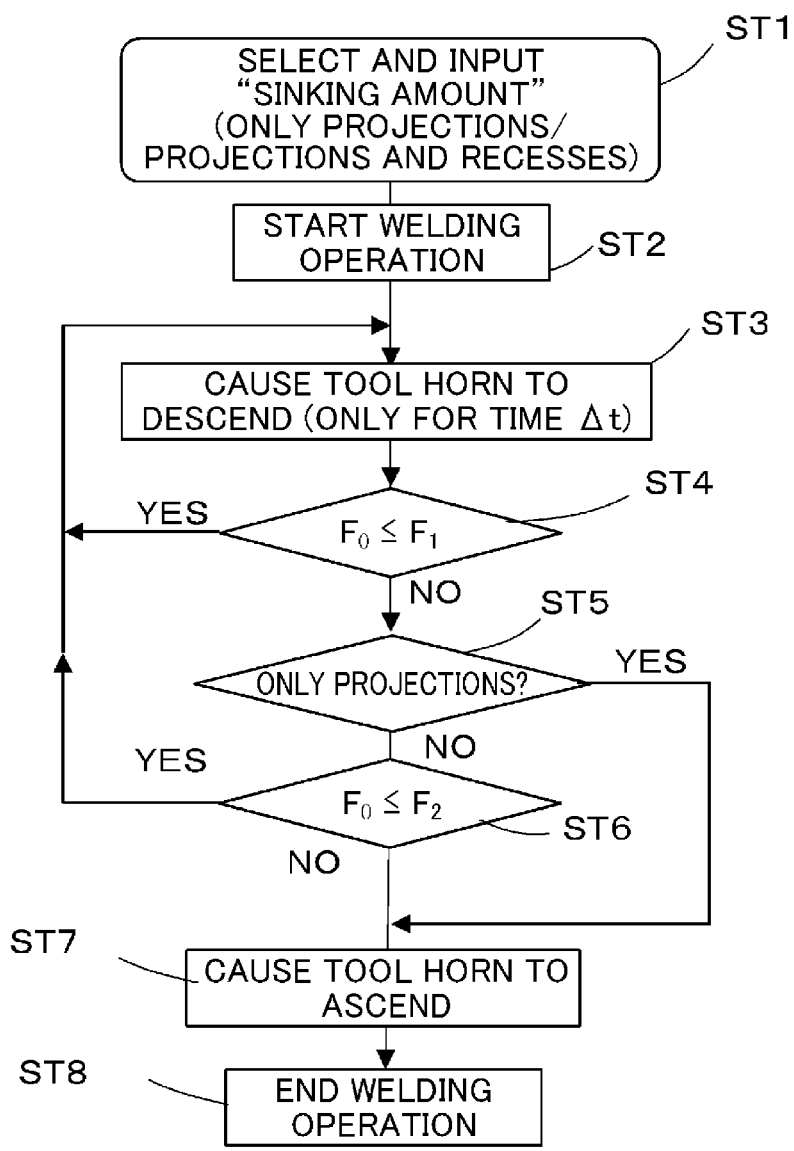
FIG. 10 is a flowchart (i.e. a flow diagram) showing a procedure of a welding operation using the ultrasonic welding machine according to the second embodiment of the present invention.

FIG. 10 is a flowchart of an example procedure of the welding operation. Specifically, FIG. 10 is the flowchart of the procedure of the welding operation performed by selecting, in accordance with the setting, (1) only the projections sinking or (2) the projections and recesses sinking at a predetermined amount. Note that the welding operation shown by the flowchart is executed under the control by an ultrasonic vibration controller 38, for example.

First, as the first procedure, whether to cause (1) only the projections to sink or (2) the projections and recesses to sink at a predetermined amount is selected as the amount of sinking. The result of selection is input from an input (not shown) of the machine (step ST1) and the welding operation starts (step ST2). Accordingly, the tool horn 35 starts vibrating ultrasonically and descends toward the upper surface of the thermoplastic resin member (step ST3). When the projections of the tool horn 35 abut on the upper surface of the thermoplastic resin member 50, the pressing force required for the tool horn 35 to push the thermoplastic resin member 50 gradually increases. Then, the pressing force (F0) exceeds a predetermined pressing force (F1). A pressure sensor (not shown) detects that the pressing force (F0) has exceeded the pressing force (F1) (step ST4). If causing "only the projections to sink" is selected in step ST1 (YES in step ST5), the vertical movement of the tool horn 35 is turned from descending toward the upper surface of the thermoplastic resin member 50 to ascending (step ST7). After that, the ultrasonic vibration driving of the tool horn 35 is turned off to end the welding operation (step ST8). This procedure allows only the projections of the pressing surface of the tool horn 35 to sink into the thermoplastic resin member 50.

On the other hand, in the case in which causing "the projections and recesses to sink at a predetermined amount" is selected and the result of selection is input (No in step ST5), the procedure proceeds to step ST3 so that the tool horn continues to descend unless the pressing force (F0) exceeds a predetermined pressing force (F2) (YES in step ST6). Once the pressing force (F0) exceeds the predetermined pressing force (F2) (NO in step ST6), the vertical movement of the tool horn 35 turns from descending toward the upper surface of the thermoplastic resin member to ascending (step ST7). After that, the ultrasonic vibration driving of the tool horn 35 is turned off to end the welding operation (step ST8). This procedure allows the projections and recesses of the pressing surface of the tool horn 35 to sink into the thermoplastic resin member 50 at the predetermined amount.

Figure 11A:
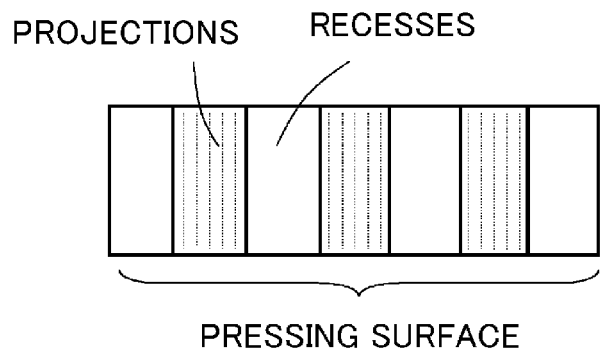
FIG. 11A illustrates a state of the pressing surface of one of various tool horns used in the second embodiment of the present invention.
Figure 11B:
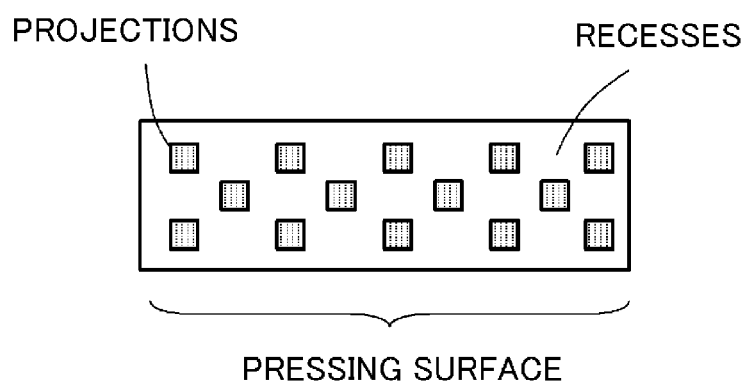
FIG. 11B illustrates a state of the pressing surface of another one of the various tool horns used in the second embodiment of the present invention.
Figure 11C:
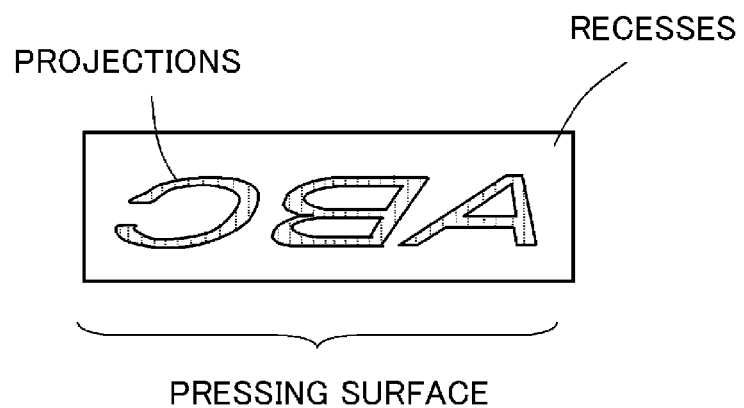
FIG. 11C illustrates a state of the pressing surface of further another one of the various tool horns used in the second embodiment of the present invention.

Note that the pressing surface of the tool horn 35 may have the following shapes: as shown in FIG. 11A, the projections may be arranged with an interval so that the projections and recesses alternate, or as shown in FIG. 11B, a plurality of small projections may be dispersed in a staggered pattern. As necessary, as shown in FIG. 11C, the projections may be in the shape of letters. If there are recesses next to the projections, the mechanism is achieved in which the melted resin pushed away by the projections rises in the recesses. In FIGS. 11A to 11C, in order to distinguish the projections from the recesses, the surfaces of the projections are patterned with the dotted lines. The projections and the recesses may have different surface roughness.

Third Embodiment of Present Invention

In an ultrasonic welding machine according to a third embodiment of the present invention, a tool horn 36 vibrates ultrasonically in parallel to the facing surfaces of a pair of thermoplastic resin members 40 and 41.

Figure 12:
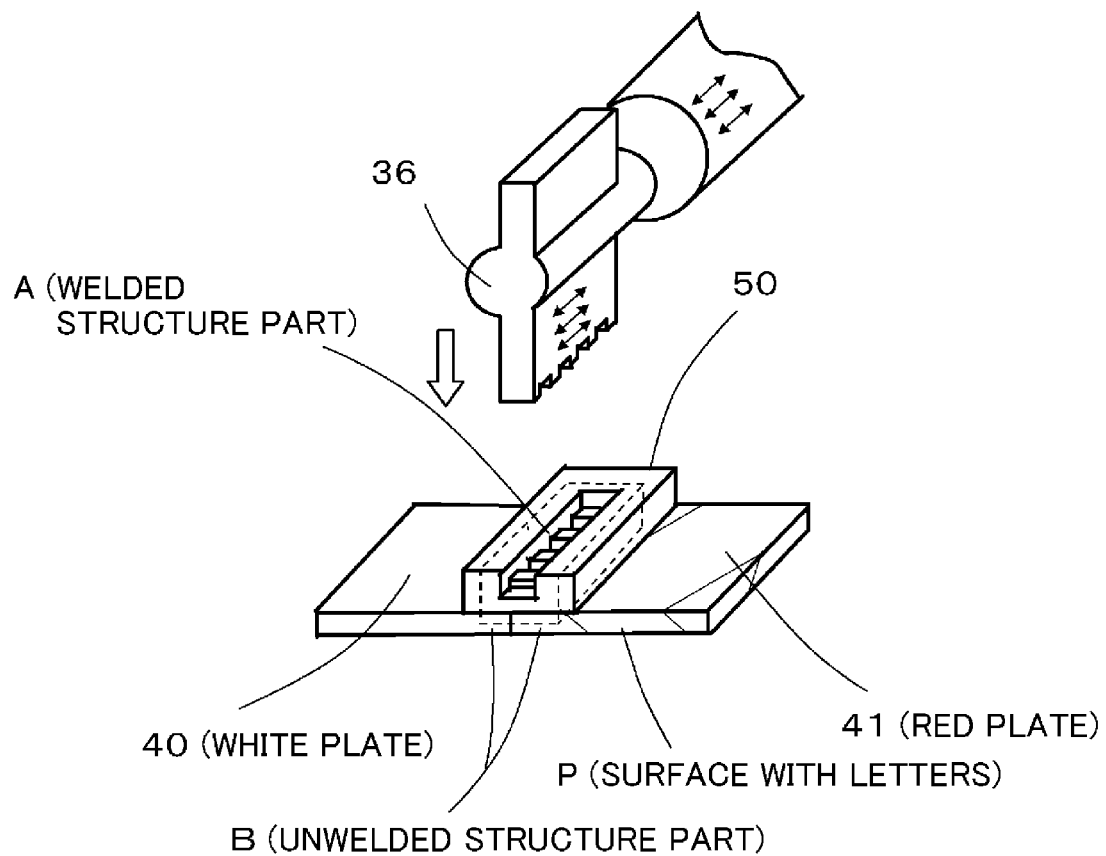
FIG. 12 shows a positional relationship between a tool horn and a structure welded by an ultrasonic welding method and an ultrasonic welding machine according to a third embodiment of the present invention.

FIG. 12 shows the pair of thermoplastic resin members 40 and 41, another thermoplastic resin member 50, and the tool horn 36, and their positional relationship. The resin members form a structure welded by an ultrasonic welding method and the ultrasonic welding machine according to the third embodiment of the present invention.

With respect to the relationship between the direction in which the tool horn 36 vibrates and a direction in which end surfaces of the thermoplastic resin member 50 extend, even if the angle between the direction in which the tool horn 36 vibrates and the direction in which the end surfaces of the thermoplastic resin member 50 extend is changed by, for example, making the directions intersect with each other at another angle, the distance between the facing end surfaces is kept unchanged before and after the welding according to the present invention, and the anvil-side surface of the thermoplastic resin is neither burned nor discolored before and after the welding.

Fourth Embodiment of Present Invention

Figure 13:
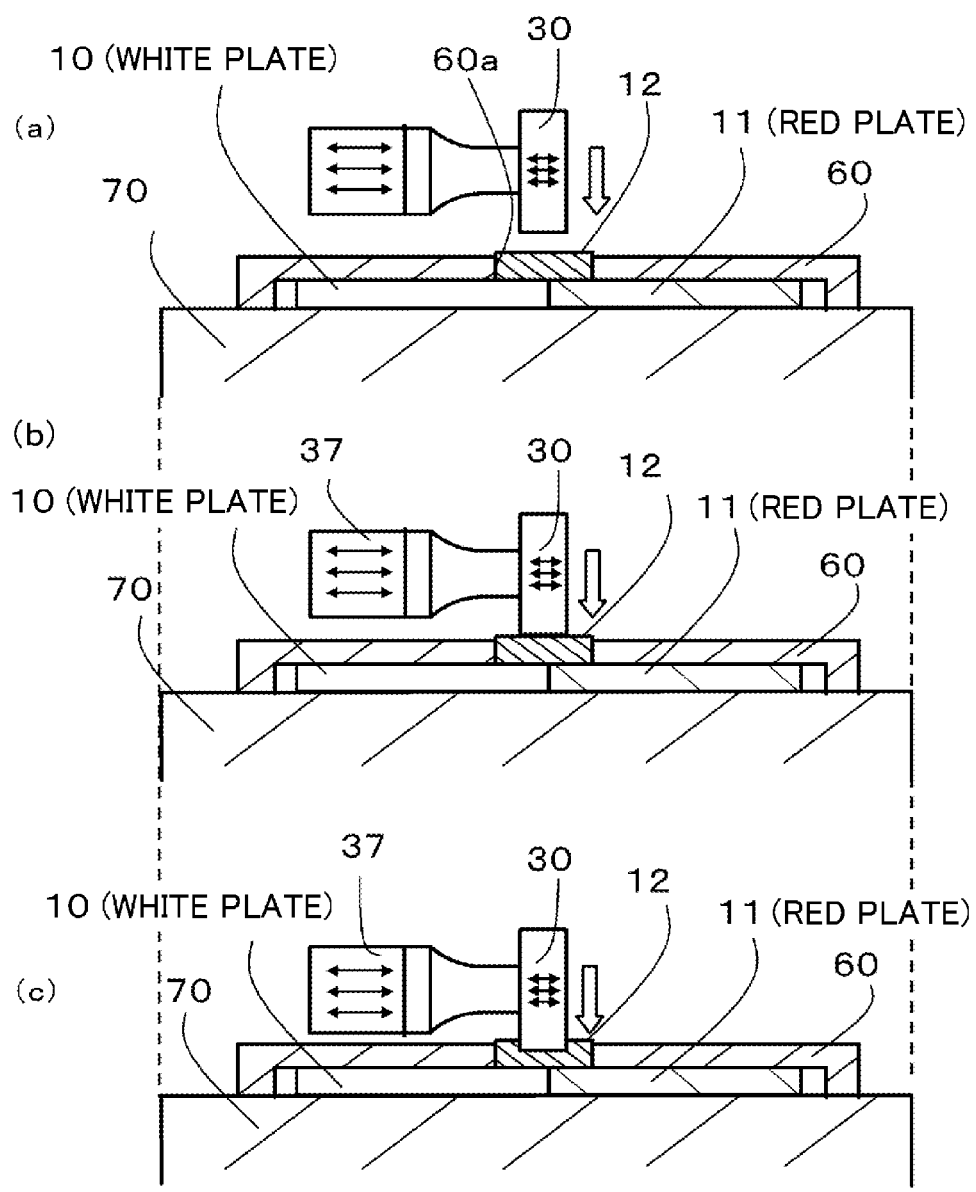
FIG. 13 includes: (a) which shows a positional relationship between a tool horn and an anvil when a frame-like positioning jig cover is placed to cover a pair of thermoplastic resin members and another thermoplastic resin member in an ultrasonic welding machine according to a fourth embodiment of the present invention; (b) which shows a state in which the tool horn is pressed onto the upper surface of the other thermoplastic resin member through a window of the frame-like positioning jig cover in the ultrasonic welding machine according to the fourth embodiment of the present invention; and (c) which shows a state in which the tool horn applies ultrasonic vibration energy to the upper surface of the other thermoplastic resin member through the window of the frame-like positioning jig cover in the ultrasonic welding machine according to the fourth embodiment of the present invention.
Figure 14:
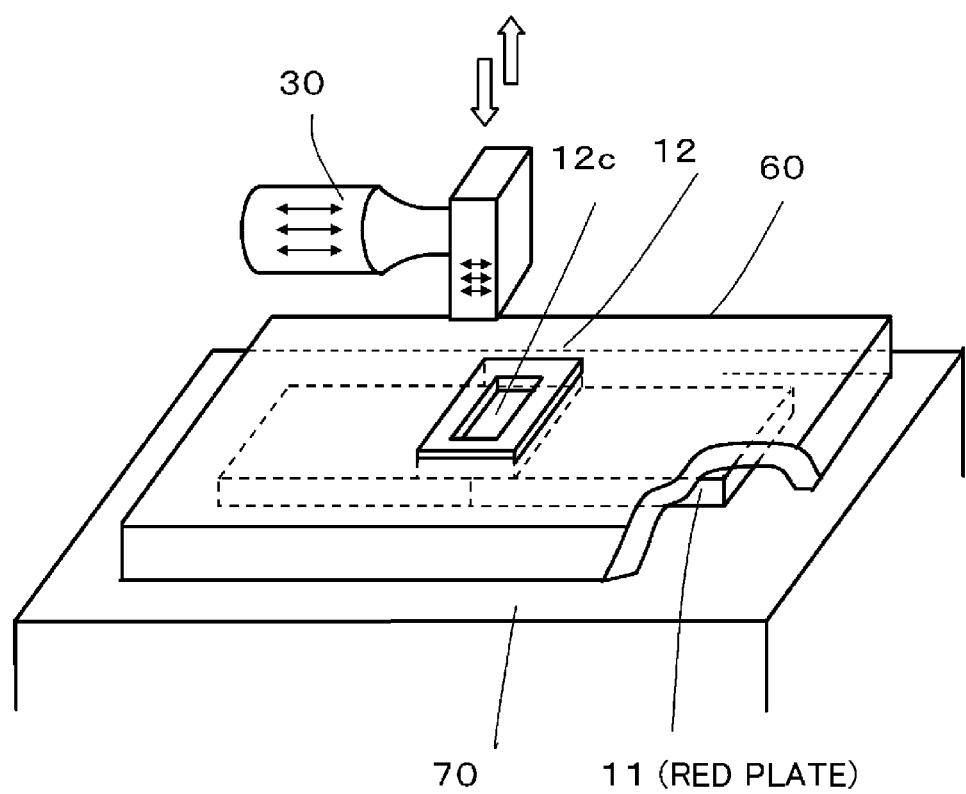
FIG. 14 is a perspective external view showing a positional relationship between the tool horn and the anvil when the frame-like positioning jig cover is placed to cover the pair of thermoplastic resin members and the other thermoplastic resin member in the ultrasonic welding machine according to the fourth embodiment of the present invention.

In FIG. 13, (a), (b), and (c) show a positional relationship between a tool horn 30 and an anvil 70 when a frame-like positioning jig cover 60 is placed to cover a pair of thermoplastic resin members 10 and 11 and another thermoplastic resin member 12 in an ultrasonic welding machine according to a fourth embodiment of the present invention. FIG. 14 shows, as an appearance perspective view, the positional relationship between the tool horn 30 and the anvil 70 when the frame-like positioning jig cover 60 is placed to cover the pair of thermoplastic resin members 10 and 11 and the other thermoplastic resin member 12 in the ultrasonic welding machine according to the fourth embodiment of the present invention.

The frame-like positioning jig cover 60 is a metal frame with a window 60a in almost the same shape as the outer shape of the thermoplastic resin member 12. The other thermoplastic resin member 12 communicates with the outside through the window 60a. The window 60a surrounds, as a window frame, the periphery of the other thermoplastic resin member 12.

The frame-like positioning jig cover 60 supports and maintains the other thermoplastic resin member 12 at a given position while the other thermoplastic resin member 12 receives the ultrasonic vibration energy of the tool horn 30. In a case in which the tool horn 30 vibrates at a greater amplitude, the jig cover regulates, as a side anvil, the position of the other thermoplastic resin member. The jig cover is thus advantageous in promoting the heat generation at the other thermoplastic resin member 12. The frame-like positioning jig cover 60 may be used as necessary.

The first to fourth embodiments of the present invention show that the pair of thermoplastic resin members face each other, that another thermoplastic resin member is placed on the pair of thermoplastic resin members, that the tool horn is pressed onto the other thermoplastic resin member to supply the ultrasonic vibration energy in two opposite directions along the surface of the other thermoplastic resin member.

Specifically, in the first to fourth embodiments and the variations, the ultrasonic welding method, the structure welded by the ultrasonic welding method, and the ultrasonic welding machine have been described. In the method, the pair of thermoplastic resin members are butt welded as follows. That is, the pair of thermoplastic resin members are placed on the anvil with their end surfaces facing each other. The other thermoplastic resin member is placed on a region where end surfaces of the pair of thermoplastic resin members face each other. The pressing surface of the tool horn vibrating ultrasonically in two opposite directions not perpendicular to but along the upper surface of the other thermoplastic resin member is pressed onto the upper surface. The pressing force of the tool horn vibrating ultrasonically is applied to melt the vicinity of the upper surface of the other thermoplastic resin member. A welded structure part is therefore formed on an unwelded structure part to obtain an overlap structure including the welded structure part arranged on the unwelded structure part.

This configuration provides the following advantages: (1) the same distance is kept between the facing end surfaces before and after the welding; and (2) the anvil-side surface of the thermoplastic resin is neither burned nor discolored before and after the welding.

Fifth Embodiment of Present Invention

A fifth embodiment of the present invention does not employ the other thermoplastic resin member described above. The pair of thermoplastic resin members are replaced with a pair of a thermoplastic resin members 10a and 10b, which are a white plate and a red plate, respectively, and each of which has an L-shaped cross section. The thicker parts of the L-shaped cross sections, that is, a thicker white part 10ax and a thicker red part 11ax face each other. The pressing surface of the tool horn 30 is pressed onto the upper surfaces of the thicker parts 10ax and 11ax of the L-shaped cross sections. Ultrasonic vibration energy is applied in two opposite directions along the upper surfaces of the thicker parts of the L-shaped cross sections to generate heat near the upper surfaces of the thicker parts of the L-shaped cross sections. The upper surfaces therefore melt, and a recess is formed. Welding is performed in this manner.

Figure 15A:
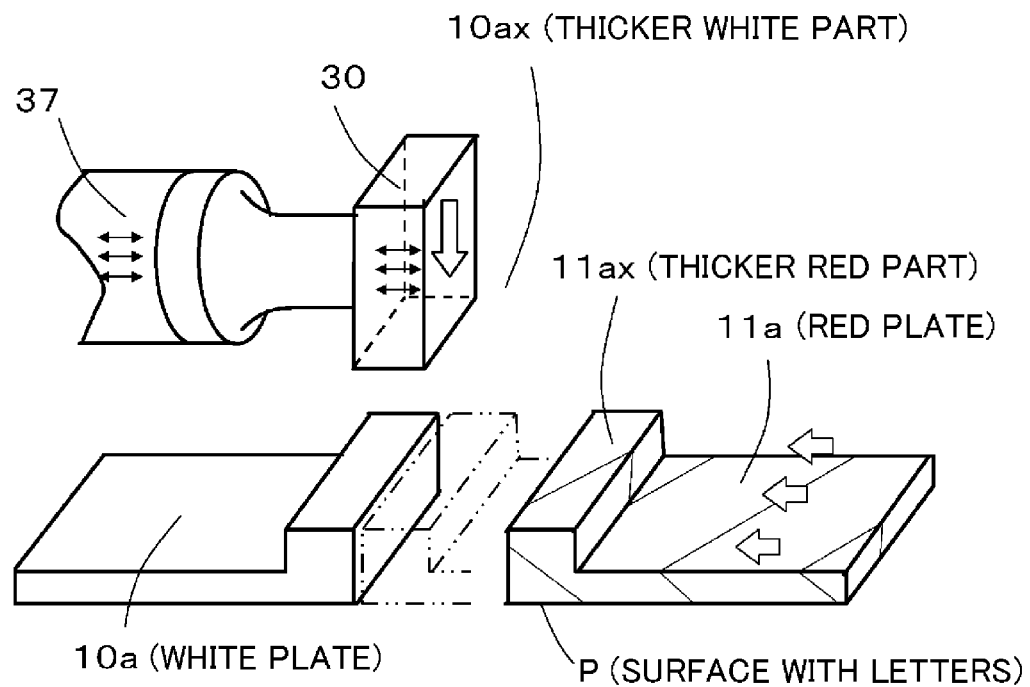
FIG. 15A shows a positional relationship between a tool horn and a pair of thermoplastic resin members, each having an L-shaped cross section, in an ultrasonic welding machine according to a fifth embodiment of the present invention.
Figure 15B:
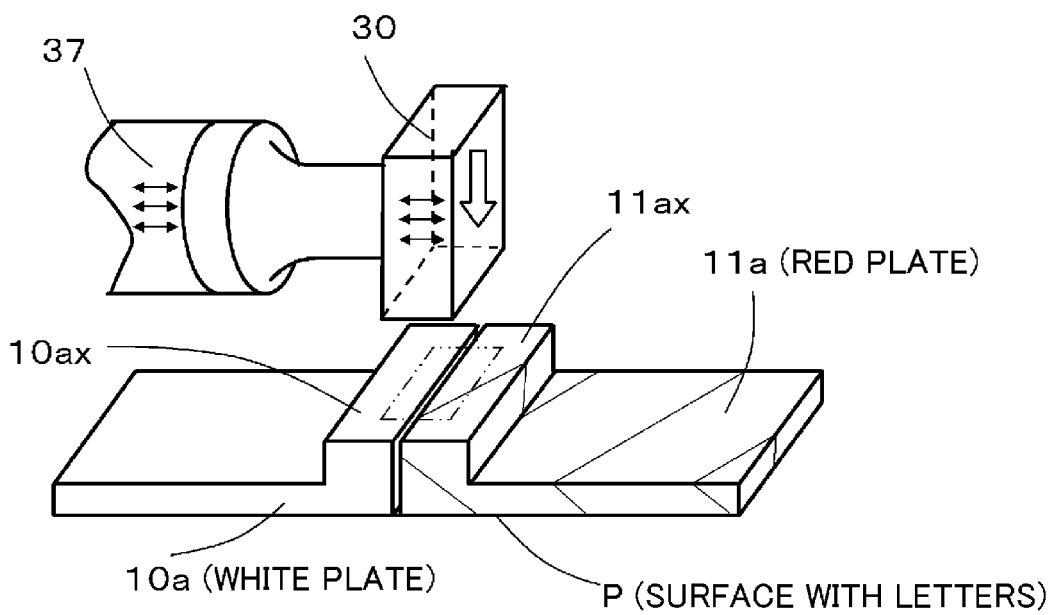
FIG. 15B shows a positional relationship between the tool horn and the pair of thermoplastic resin members, each having the L-shaped cross section, in the ultrasonic welding machine according to the fifth embodiment of the present invention.
Figure 16:
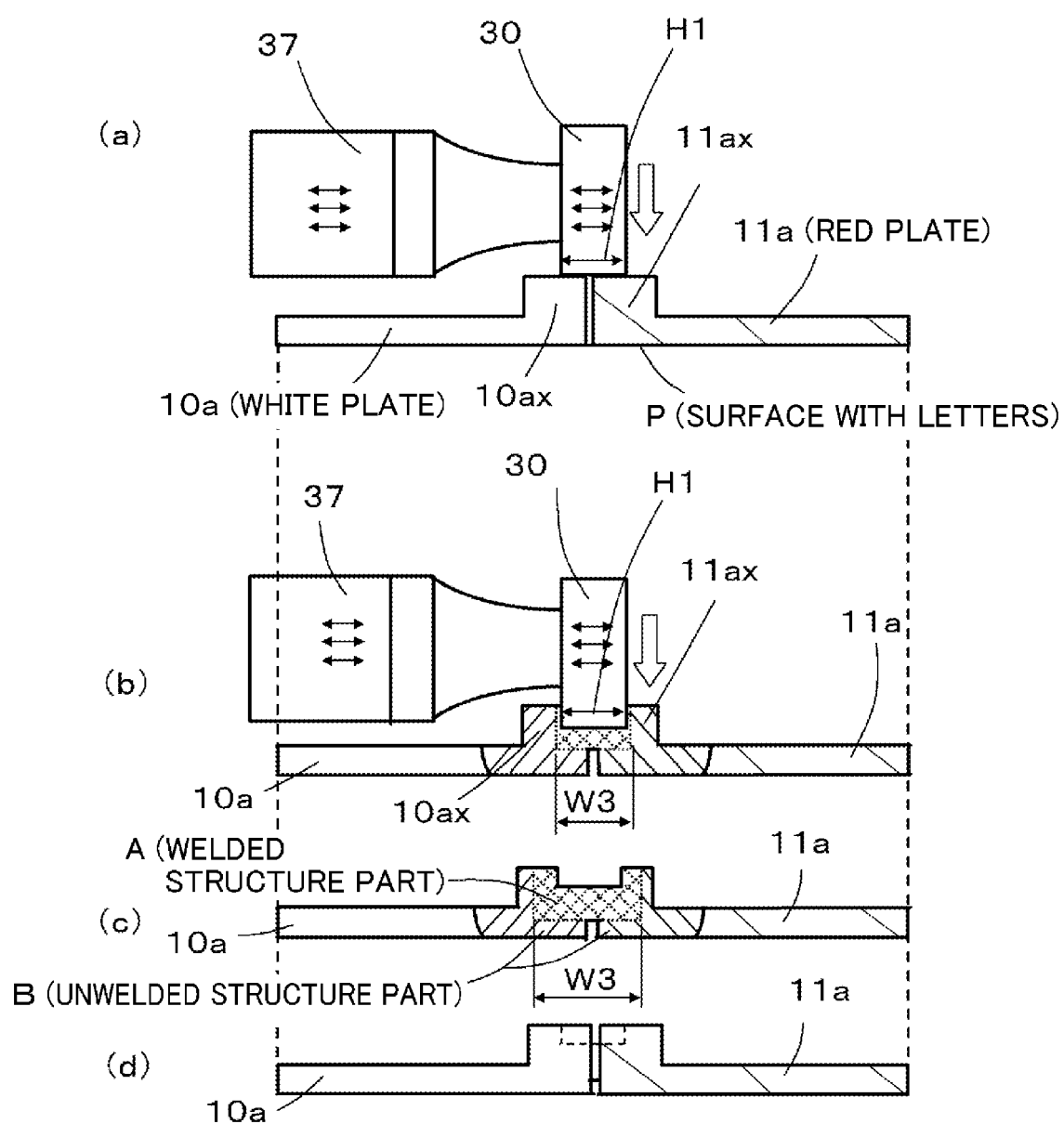
FIG. 16 includes: (a) and (b) which show a positional relationship where the tool horn applies ultrasonic vibration energy to the upper surfaces of thicker parts, which face each other, of the pair of thermoplastic resin members, each having the L-shaped cross section, in the ultrasonic welding machine according to the fifth embodiment of the present invention; (c) which shows a cross section of a part of the structure welded by an ultrasonic welding method and the ultrasonic welding machine according to the fifth embodiment of the present invention; and (d) which shows an appearance of the structure welded by the ultrasonic welding method and machine according to the fifth embodiment of the present invention.

FIGS. 15A and 15B show a positional relationship between the tool horn 30 and the pair of thermoplastic resin members 10a and 11a, each having the L-shaped cross section, in an ultrasonic welding machine according to the fifth embodiment of the present invention. In FIG. 16, (a) shows a positional relationship where the tool horn 30 applies the ultrasonic vibration energy to the upper surfaces of the facing thicker parts 10ax and 11ax of the pair of thermoplastic resin members 10a and 11a, each having the L-shaped cross section, in the ultrasonic welding machine according to the fifth embodiment of the present invention.

The thicker parts of the L-shaped cross sections serve as the other thermoplastic resin member 12 shown in the first and second embodiments of the present invention. As shown in (b) of FIG. 16, upon application of the ultrasonic vibration energy, the facing thicker parts 10ax and flax of the pair of thermoplastic resin members 10a and 11a, each having the L-shaped cross section, melt to form the recess. Accordingly, the thermoplastic resin members 10a and 11a melt across the width (W3) that is greater than the width (H1) of the pressing surface of the tool horn 30.

In FIG. 16, (c) shows a cross section of a part of the pair of thermoplastic resin members 10a and 11a, each having the L-shaped cross section, after the welding, that is, the structure welded by the ultrasonic welding method and the ultrasonic welding machine. In FIG. 16, (d) shows the pair of thermoplastic resin members 10a and 11a, each having the L-shaped cross section, after the welding, that is, the structure welded by the ultrasonic welding method and machine according to the fifth embodiment of the present invention.

Figure 17:
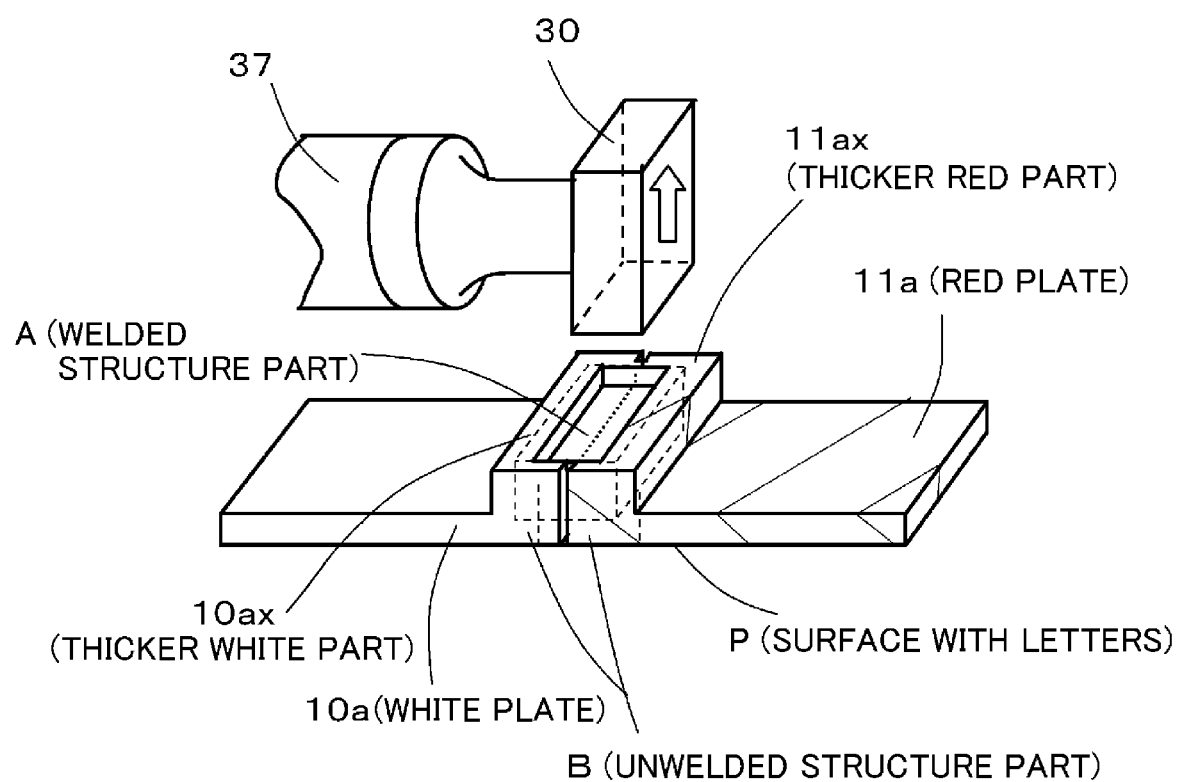
FIG. 17 is a perspective view showing a positional relationship between the tool horn and the structure welded by the ultrasonic welding method and machine according to the fifth embodiment of the present invention.

FIG. 17 is a perspective view showing a positional relationship between the tool horn and the thermoplastic resin members 10a and 11a, each having the L-shaped cross section, after the welding operation, that is, the structure welded by the ultrasonic welding method and machine according to the fifth embodiment of the present invention.

Technical aspects of the welding in this embodiment are similar to those in the first and second embodiments of the present invention. Although not described in detail, similarly to the first and second embodiments, this embodiment provides the following advantages: (1) the same distance is kept between the facing end surfaces before and after the welding; and (2) the anvil-side surface of the thermoplastic resin is neither burned nor discolored before and after the welding.

Sixth Embodiment of Present Invention

In an ultrasonic welding machine according to a sixth embodiment of the present invention, the thicker parts of the thermoplastic resin members, each having the L-shaped cross section, according to the fifth embodiment are replaced with a plurality of fitting parts fitting into each other.

Figure 18A:
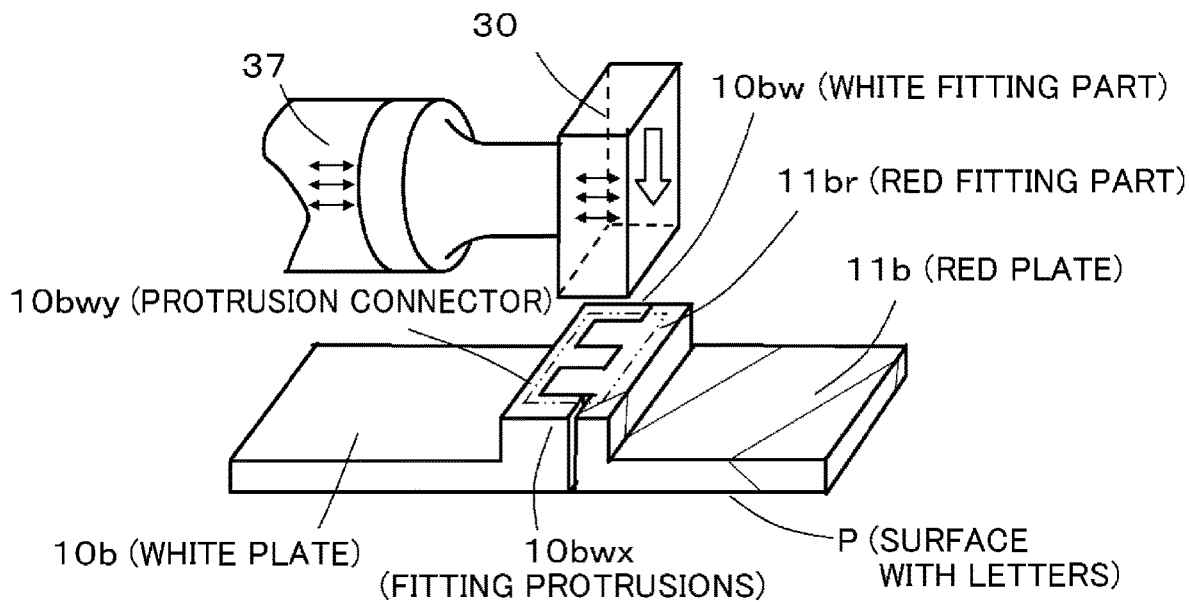
FIG. 18A shows a positional relationship between a tool horn and a pair of thermoplastic resin members, each having an L-shaped cross section, in an ultrasonic welding machine according to a sixth embodiment of the present invention.
Figure 18B:
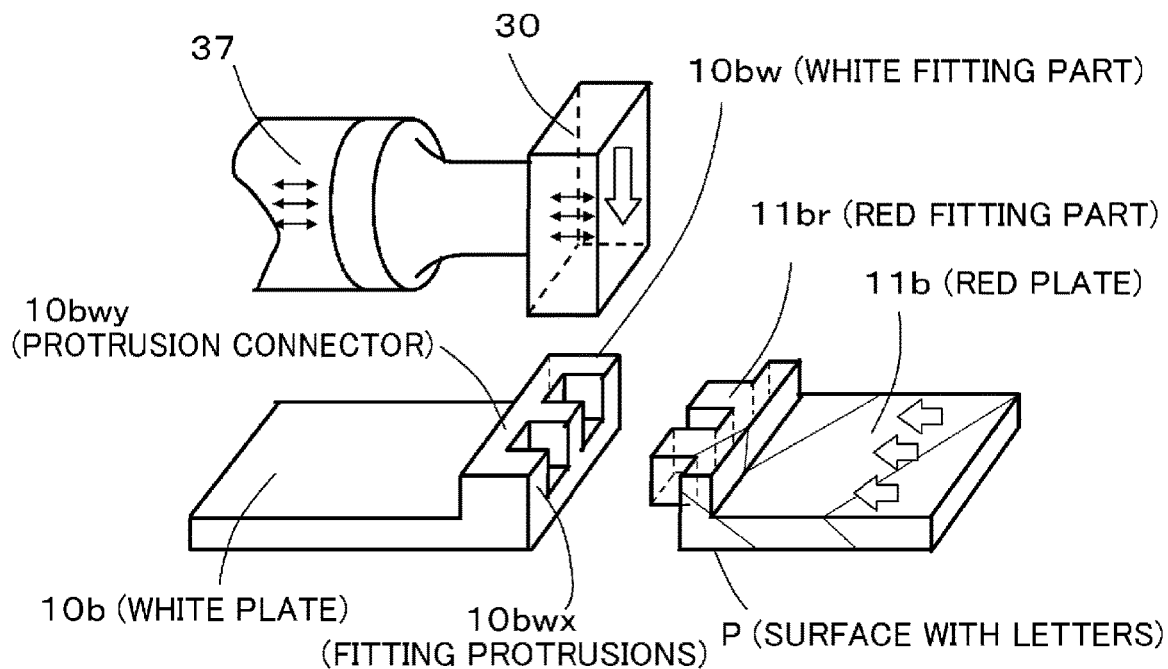
FIG. 18B shows a positional relationship between the tool horn and the pair of thermoplastic resin members, each having the L-shaped cross section, in the ultrasonic welding machine according to the sixth embodiment of the present invention.

FIGS. 18A and 18B show a positional relationship between a tool horn 30 and a pair of thermoplastic resin members 10b and 11b, each having a fitting part, in the ultrasonic welding machine according to the sixth embodiment of the present invention.

In the sixth embodiment, the facing thicker parts of the pair of the thermoplastic resin member 10b and 11b, each having the L-shaped cross section, have the plurality of fitting parts 10bw and 11br, respectively, fitting into each other. When the fitting parts melt, the resin members are firmly integrated with a higher bonding strength. In particular, as shown in the perspective view of FIG. 18B, the fitting parts 10bw and 11br are formed integrally with the end surfaces of the thermoplastic resin member 10b and 11b, respectively. The thermoplastic resin members 10b and 11b are integrated by welding the fitting parts 10bw and 11br together.

In the sixth embodiment, the end surfaces of the pair of thermoplastic resin members 10b and 11b, which are objects to be welded, have the fitting parts 10bw and 11br, respectively. The fitting parts 10bw and 11br in the end surfaces of the pair of thermoplastic resin members 10b and 11b fit into each other. In this state, to the upper surfaces of the fitting parts of the pair of thermoplastic resin members 10b and 11b, the pressing force of the tool horn vibrating ultrasonically in two opposite directions along the upper surfaces is applied. Accordingly, the vicinity of the upper surfaces of the respective fitting parts 10bw and 11br of the pair of thermoplastic resin members 10b and 11b melt to be welded together, with the fitting parts 10bw and 11br fitting into each other.

In the sixth embodiment shown in FIGS. 18A and 18B, the white fitting part 10*bw* and the red fitting part 11*br* fit into each other, with their projections, whose outer shapes are cubic, fitting into recesses, which are cubic spaces. Note that the white fitting part 10*bw* is in a shape obtained by connecting the bases of fitting protrusions 10*bwx* protruding outward to a protrusion connector 10*bwy*. Thus, as indicated by three white arrows in FIG. 18B, when the fitting part 11*br* is pushed into the fitting part 10*bw*, their projections and recesses fit into each other.

The recesses, which are the cubic spaces, and the projections, whose outer shapes are cubic, have planar side surfaces. Thus, when the fitting part 10*bw* and the fitting part 11*br* are apart from each other in the direction opposite to the three white arrows in FIG. 18B, the fitting parts come out of each other without any resistance. Thus, even in a state in which the fitting part 10*bw* and the fitting part 11*br* are, as a clearance fit, separated and independent from each other and not connected to each other, once the fitting parts are welded together, the melted thermoplastic resin enters the clearance, which prevents the fitting parts from coming out of each other. The degree of the fitting between the fitting part 10*bw* and the fitting part 11*b* may be determined freely in accordance with the purpose.

Figure 19:
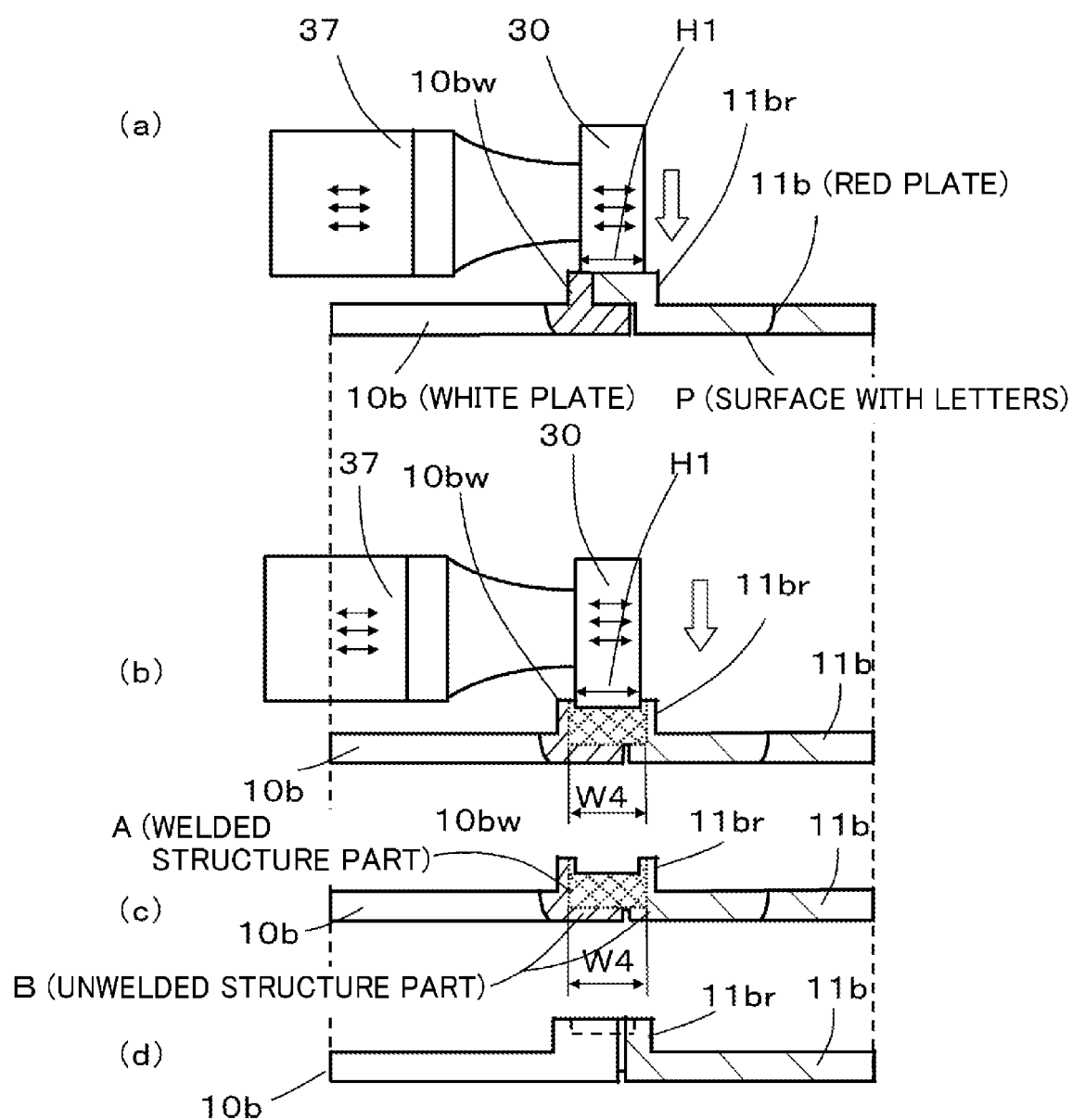
FIG. 19 includes: (a) and (b) which show a positional relationship where the tool horn applies ultrasonic vibration energy to the pair of thermoplastic resin members, each having a fitting part, in the ultrasonic welding machine according to the sixth embodiment of the present invention; (c) which shows a cross section of a part of a structure welded by the ultrasonic welding method and the ultrasonic welding machine according to the sixth embodiment of the present invention; and (d) which shows an appearance of the structure welded by the ultrasonic welding method and machine according to the sixth embodiment of the present invention.

In FIGS. 19, (a) and (b) show a positional relationship where the tool horn applies the ultrasonic vibration energy to the pair of thermoplastic resin members, each with having a fitting part, in the ultrasonic welding machine according to the sixth embodiment of the present invention. In FIG. 19, (c) shows a cross section of a part of the structure welded by an ultrasonic welding method and the ultrasonic welding machine according to the sixth embodiment of the present invention. In FIG. 19, (d) shows an appearance of the structure welded by the ultrasonic welding method and machine according to the sixth embodiment of the present invention.

Again, in the sixth embodiment, the pair of thermoplastic resin members 10*b* and 11*b*, which are objects to be welded, have, at their ends, the fitting parts 10*bw* and 11*br*, respectively, which are separated and independent from each other and not connected to each other. The pair of the objects to be welded are placed on an anvil 70 with the fitting parts 10*bw* and 11*br* fitting into each other. The pressing surface of the tool horn 30 vibrating ultrasonically in a direction not perpendicular to but along the upper surfaces of the fitting parts 10*bw* and 11*br* of the pair of thermoplastic resin members 10*b* and 11*b*, which are the objects to be welded, is pressed onto the upper surfaces. The pressing force of the tool horn 30 vibrating ultrasonically is applied to melt the vicinity of the upper surfaces of the respective fitting parts 10*bw* and 11*br* of the pair of thermoplastic resin members 10*b* and 11*b*, which are the objects to be welded. A welded structure part is thus formed on an unwelded structure part to obtain an overlap structure including the welded structure part arranged on the unwelded structure part. In this manner, the respective fitting parts 10*bw* and 11*br* of the pair of thermoplastic resin members 10*b* and 11*b*, which are the objects to be welded, are welded into this overlap structure.

This configuration provides the following advantages: (1) the same distance is kept between the facing end surfaces before and after the welding; and (2) the anvil-side surface of the thermoplastic resin is neither burned nor discolored before and after the welding; and in addition, (3) the facing surfaces of the pair of thermoplastic resin members are firmly integrated.

As necessary, the planar parts and the fitting parts 10*bw* and 11*br* of the thermoplastic resin members 10*b* and 11*b* may be made of different materials. If the planar parts of the thermoplastic resin members 10*b* and 11*b* are made of a fragile, breakable, and less weldable material, the fitting parts 10*bw* and 11*br* may be made of another material that compensates the properties that the planar parts of the thermoplastic resin members 10*b* and 11*b* lack. This configuration allows excellent welding between the fitting parts 10*bw* and 11*br*.

Although not being a method of welding into a brand nameplate, the following welding method is required for other purposes. That is, a pair of vinyl sheets as objects to be welded have, at their ends, the fitting parts, which are thermoplastic resin members, and are welded together, with the fitting parts fitting into each other. Similarly, a method is required in which tent sheets have, at their ends, the fitting parts, which are thermoplastic resin members, and are welded together, with the fitting parts fitting into each other. The vinyl sheets and tent sheets may be made of various materials. Even if the planar parts of the pair of objects to be welded are not the thermoplastic resin members, such the planar parts are also applicable as the sixth embodiment of the present invention, as long as the fitting parts 10*bw* and 11*br* which are the thermoplastic resin members can be firmly attached to the associated planar parts.

(First Variation of Sixth Embodiment of Present Invention)

Figure 20A:
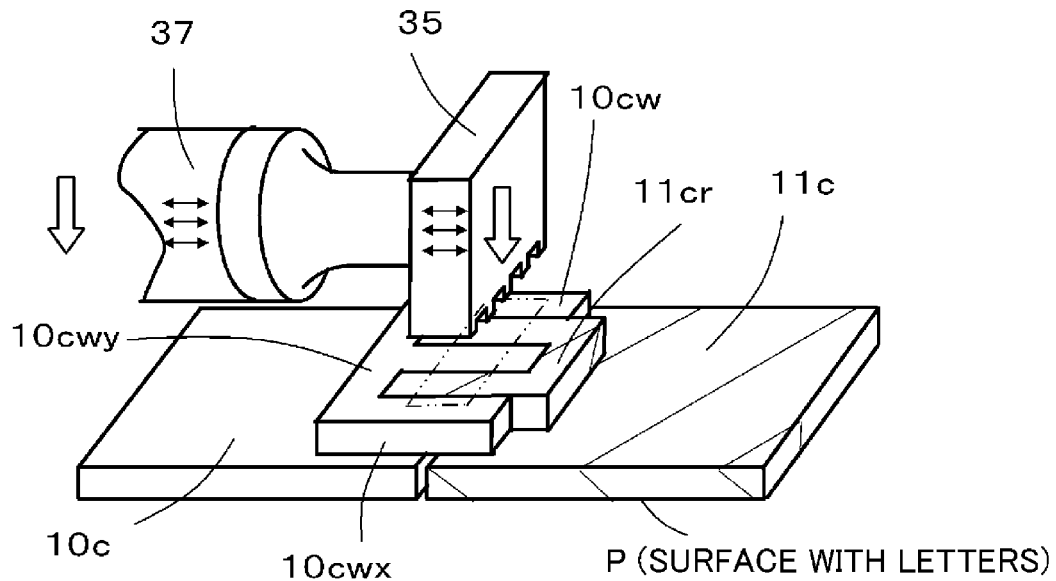
FIG. 20A shows a positional relationship between a tool horn and a pair of thermoplastic resin members, each having a fitting part, in an ultrasonic welding machine according to a first variation of the sixth embodiment of the present invention.
Figure 20B:
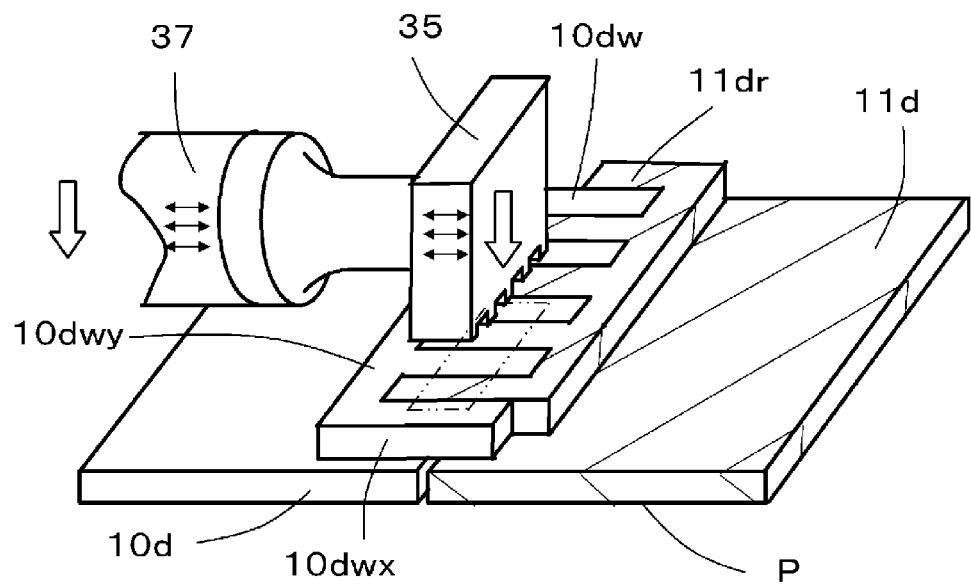
FIG. 20B shows a positional relationship between a tool horn and a pair of thermoplastic resin members, each having a fitting part, in an ultrasonic welding machine according to a second variation of the sixth embodiment of the present invention.

In an ultrasonic welding machine according to a first variation of the sixth embodiment of the present invention, pairs of thermoplastic resin members 10*c* and 11*c*, and 10*d* and 11*d* have fitting parts 10*cw* and 11*cr*, and 10*dw* and 11*dr*, respectively. The fitting parts are almost in the same shape as the fitting part (i.e., the white fitting part) 10*bw* of the thermoplastic resin member 10*b*, that is, one of the fitting parts 10*bw* and 11*br* fitting into each other in the sixth embodiment shown in FIGS. 18A and 18B. As shown in FIGS. 20A and 20B, each of the fitting parts 10*cw*, 11*cr*, 10*dw*, and 11*dr* has an E-shape or a C-shape obtained by connecting fitting protrusions 10*cwx* to a protrusion connector 10*cwy*.

The facing thicker parts of the pairs of thermoplastic resin members 10*c* and 11*c*, and 10*d* and 11*d*, each having the L-shaped cross section, have the fitting parts 10*cw* and 11*cr*, and 10*dw* and 11*dr*, respectively, fitting into each other. This configuration is advantages in increasing the welding strength between the thermoplastic resin members 10*c* and 11*c*, and 10*d* and 11*d*.

Note that the fitting parts 10*cw*, 11*cr*, 10*dw*, and 11*dr* may be in any shape. FIGS. 20A and 20B show a positional relationship between a tool horn 35 and the pairs of thermoplastic resin members 10*c* and 11*c*, and 10*d* and 11*d*, each having the fitting part, in the ultrasonic welding machine according to the first variation of the sixth embodiment of the present invention.

In FIG. 20A, the fitting protrusions 10*cwx* are longer than the fitting protrusions 10*bwx* in FIG. 18A. In FIG. 20B, the length of the fitting protrusions 10*dwx* is increased and the number of the fitting protrusions 10*dwx* is increased. With an increase in the length and the number of the fitting protrusions 10*dwx*, the welding strength increases. The length and the number may thus be determined freely in accordance with the purpose. FIGS. 20A and 20B show an example using the tool horn 35 with a pressing surface with projections and recesses.

Figure 21:
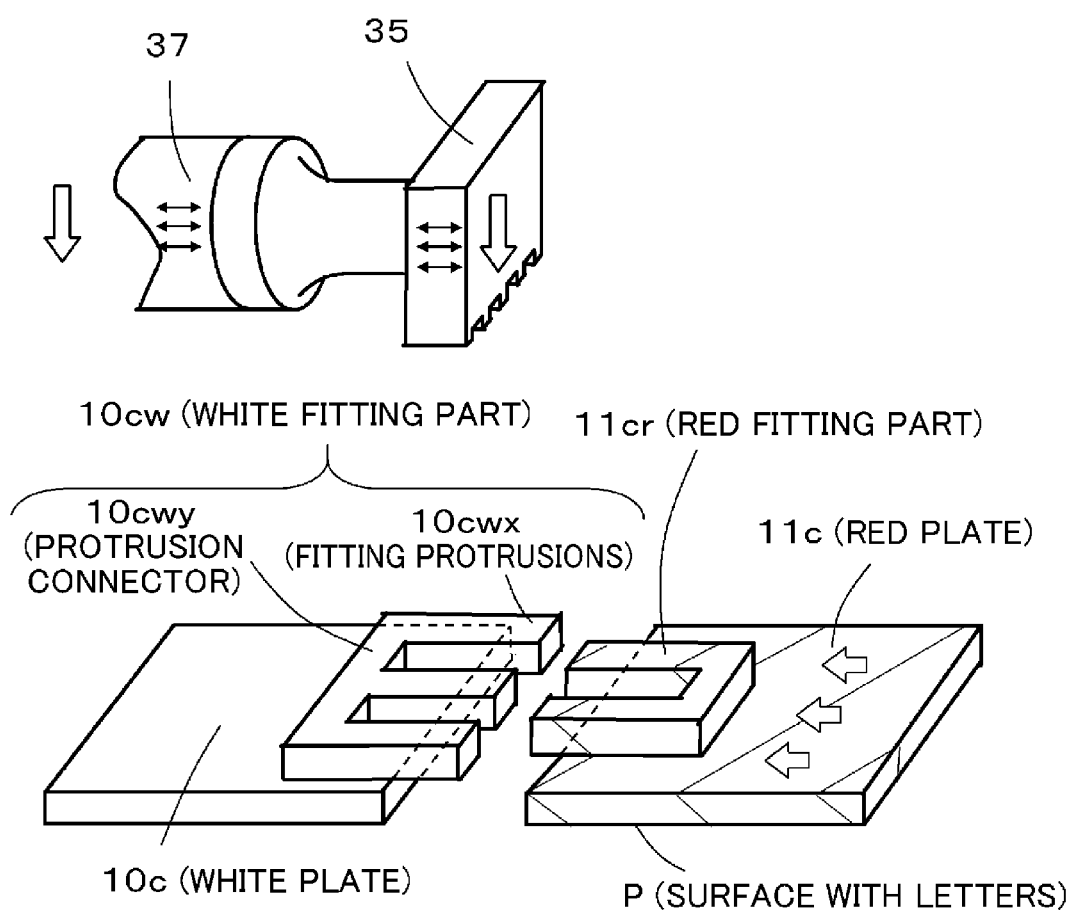
FIG. 21 shows a positional relationship between the tool horn and the pair of thermoplastic resin members, each having the fitting part, in the ultrasonic welding machine according to the first variation of the sixth embodiment of the present invention.

FIG. 21 is an appearance perspective view of separated fitting parts 10*cw* and 11*cr* before the fitting to clearly show the respective shapes of the fitting parts 10*cw* and 11*cr* in FIG. 20A. It is apparent from FIG. 21 that the white fitting part 10*cw* is obtained by connecting three fitting protrusions 10*cwx* to a single protrusion connector 10*cwy* to form an E-shape. If a lower welding strength is required, the white fitting part 10*cw* may include no protrusion connector 10*cwy* but only the three fitting protrusions 10*cwx*. The fitting protrusions 10*cwx* may be embedded in the planar part of the thermoplastic resin member 10*c*. The shape of the fitting part may be freely determined in accordance with the purpose.

In the sixth embodiment and its variation described above, the ultrasonic welding method, the structure welded by the ultrasonic welding method, and the ultrasonic welding machine have been described in which the pair of objects to be welded have, at their ends, the fitting parts that are the thermoplastic resin members.

The sixth embodiment of the present invention provides the following advantages: (1) the same distance is kept between the facing end surfaces before and after the welding; and (2) the anvil-side surface of the thermoplastic resin is neither burned nor discolored before and after the welding; and in addition, (3) the facing surfaces of the pair of thermoplastic resin members are firmly integrated.

Seventh Embodiment of Present Invention

In an ultrasonic welding machine according to a seventh embodiment of the present invention, a pair of thicker thermoplastic resin members 10*e* and 11 *e* face each other. In the fifth and sixth embodiments of the present invention, examples have been described in which the pair of thermoplastic resin members 10*a* and 11*a*, each having the L-shaped cross section, are welded, and in which the pairs of thermoplastic resin members 10*b* and 11*b*, 10*c* and 11 *c*, and 10*d* and 11*d* with the respective fitting parts are welded. The pairs of thermoplastic resin members have, on their end surfaces, the respective fitting parts. With the fitting parts fitting into each other, the pressing force of the tool horn vibrating ultrasonically in two opposite directions along the upper surfaces of the fitting parts is applied for welding. The configurations will be illustrated below because the same or similar advantages are obtainable also in a case in which the thermoplastic resin members that are thick or thin as a whole face each other.

Figure 22A:
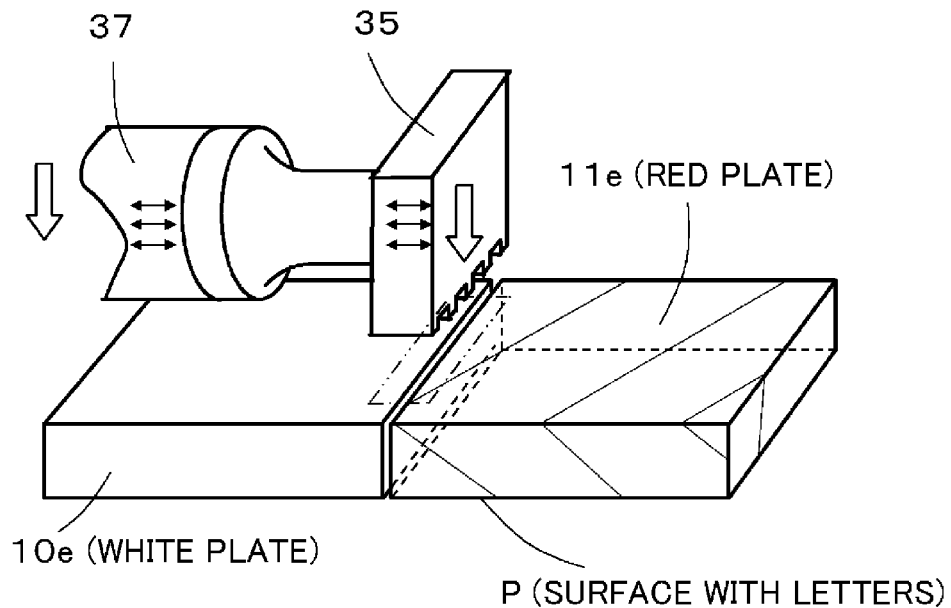
FIG. 22A shows a positional relationship between a tool horn and a pair of thicker thermoplastic resin members in an ultrasonic welding machine according to a seventh embodiment of the present invention.
Figure 22B:
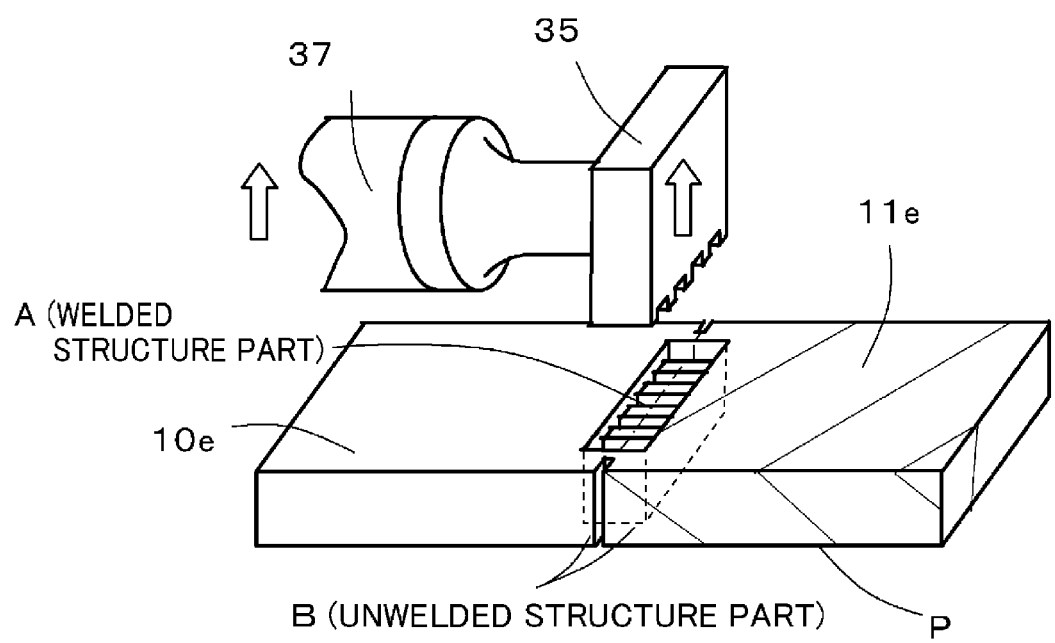
FIG. 22B is a perspective view showing a positional relationship between the tool horn and a structure welded by an ultrasonic welding method and the ultrasonic welding machine according to the seventh embodiment of the present invention.

FIG. 22A shows a positional relationship between a tool horn 35 and the pair of thicker thermoplastic resin members 10*e* and 11 *e* in the ultrasonic welding machine according to the seventh embodiment of the present invention. FIG. 22B shows the positional relationship between the tool horn 35 and the pair of thicker thermoplastic resin members 10*e* and 11*e*, that is, the structure welded by an ultrasonic welding method and the ultrasonic welding machine according to the seventh embodiment of the present invention.

In the seventh embodiment, the end surfaces of the pair of thicker thermoplastic resin members 10*e* and 11 *e* face each other. In this state, the pressing force of the tool horn vibrating ultrasonically in two opposite directions along the upper surfaces of the pair of thicker thermoplastic resin members is applied to melt and weld the vicinity of the upper surfaces of the pair of thicker thermoplastic resin members.

The ultrasonic welding machine according to the seventh embodiment provides the following advantages: (1) the same distance is kept between the facing end surfaces before and after the welding; and (2) the anvil-side surface of the thermoplastic resin is neither burned nor discolored before and after the welding; and in addition, (3) the facing surfaces of the pair of thermoplastic resin members are firmly integrated.

(First Variation of Seventh Embodiment of Present Invention)

Figure 23A:
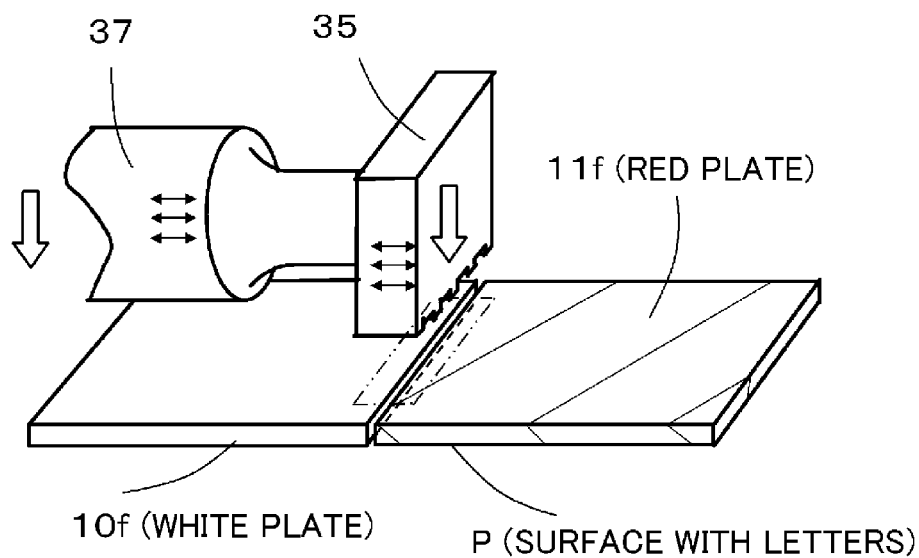
FIG. 23A shows a positional relationship between a tool horn and a pair of thinner thermoplastic resin members in an ultrasonic welding machine according to a first variation of the seventh embodiment of the present invention.
Figure 23B:
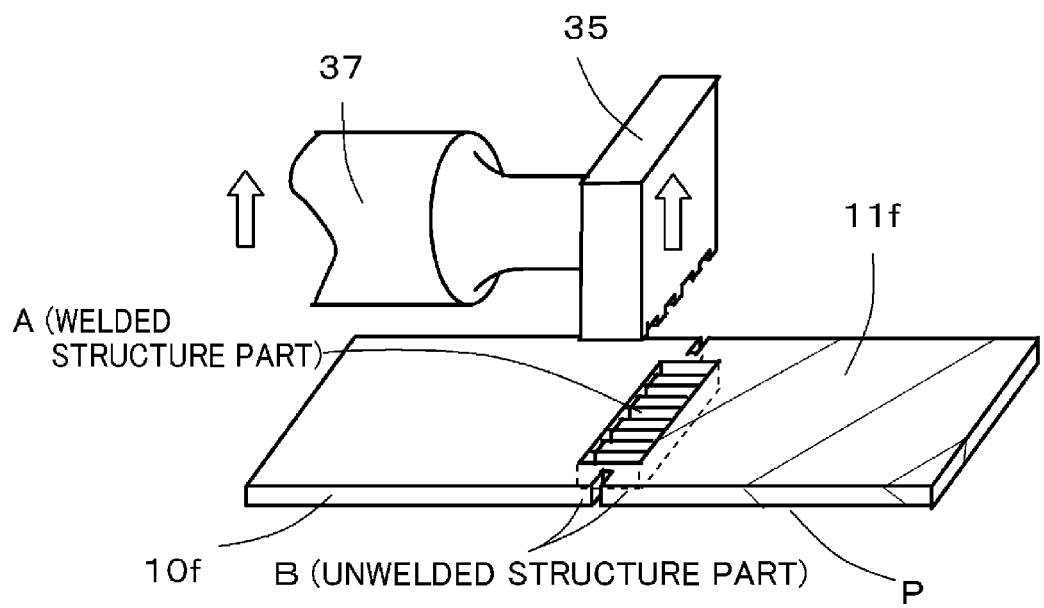
FIG. 23B is a perspective view showing a positional relationship between the tool horn and a structure welded by an ultrasonic welding method and the ultrasonic welding machine according to the first variation of the seventh embodiment of the present invention.

In an ultrasonic welding machine according to a first variation of the seventh embodiment of the present invention, a pair of thinner thermoplastic resin members 10*f* and 11*f* face each other. FIG. 23A shows a positional relationship between a tool horn 35 and the pair of thinner thermoplastic resin members 10*f* and 11 *f* in the ultrasonic welding machine according to the first variation of the seventh embodiment of the present invention. FIG. 23B shows the positional relationship between the tool horn 35 and the welded thinner thermoplastic resin members 10*f* and 11 *f*, that is, the structure welded by an ultrasonic welding method and the ultrasonic welding machine according to the first variation of the seventh embodiment of the present invention.

In the first variation of the seventh embodiment, the end surfaces of the pair of thinner thermoplastic resin members 10*f* and 11 *f* face each other. In this state, the pressing force of the tool horn 35 vibrating ultrasonically in two opposite directions along the upper surfaces of the pair of thinner thermoplastic resin members is applied to melt and weld the vicinity of the upper surfaces of the pair of thinner thermoplastic resin members.

The ultrasonic welding machine according to the first variation of the seventh embodiment provides the following advantages: (1) the same distance is kept between the facing end surfaces before and after the welding; and (2) the anvil-side surface of the thermoplastic resin is neither burned nor discolored before and after the welding; and in addition, (3) the overall thickness can be reduced.

(Second Variation of Seventh Embodiment of Present Invention)

In the first variation of the seventh embodiment of the present invention described with reference to FIG. 23A, the facing surfaces are linear, and a welding length SL is short. If the pair of thinner thermoplastic resin members with a smaller thickness are welded with a shorter length, the thermoplastic resin members are welded at a smaller amount, that is, with a lower welding strength, than the pair of thicker thermoplastic resin member 10*e* and 11*e*.

Figure 24A:
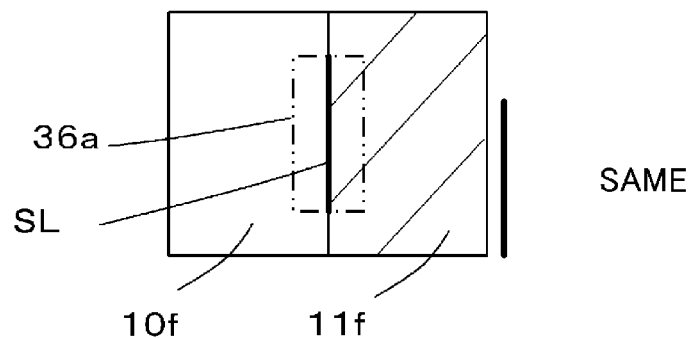
FIG. 24A is a top view showing a state in which facing surfaces of the pair of thinner thermoplastic resin members abut on each other according to the first variation of the seventh embodiment of the present invention.
Figure 24B:
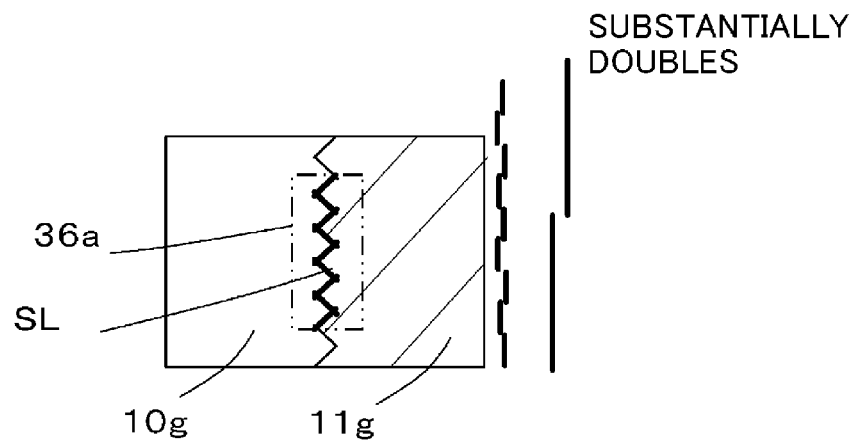
FIG. 24B is a top view showing a state in which facing surfaces of the pair of thinner thermoplastic resin members abut on each other according to a second variation of the seventh embodiment of the present invention.

To address the problem, in an ultrasonic welding machine according to a second variation of the seventh embodiment of the present invention, the facing end surfaces of a pair of thinner thermoplastic resin members 10*g* and 11*g* have a zigzag shape as seen from above as shown in FIG. 24B. In this configuration, the welding length SL is twice the length of that of the linear facing surfaces shown in FIG. 24A. The welding strength also doubles. Although not shown in the figure, if the surfaces face each other while being fitted into each other like a wedge, which further increases the welding length, the welding strength further increases.

In the second variation of the seventh embodiment, the end surfaces of the pair of thinner thermoplastic resin members 10*g* and 11*g* face each other with their projections and recesses fitted into the zigzag shape. In this state, the pressing force of the tool horn 35 vibrating ultrasonically in two opposite directions along the upper surfaces of the pair of thinner thermoplastic resin members 10*g* and 11*g* is applied to melt and weld the vicinity of the upper surfaces of the pair of thinner thermoplastic resin members 10*g* and 11*g*.

However, the pair of thinner thermoplastic resin members, each having the zigzag facing end surface, cannot be used in a conspicuous place such as a brand nameplate in view of the appearance and are thus used for other purposes, for example, for butt welding tent sheets. Although not shown in the figure, with fitting parts of a pair of tent sheets fitted into each other, the tool horn vibrating ultrasonically in a direction along the upper surfaces of the fitting parts is pressed onto the upper surfaces. Accordingly, the fitting parts which are cut to have an edge bent into a predetermined shape and are fitted into each other are integrally welded while keeping the fitted appearance.

The ends of typical tent sheets are welded with the pair of stacked tent sheets and a tool horn or a radio frequency electrode pressed perpendicularly to the stacked surfaces. Accordingly, the welded part cannot be sufficiently pressed to have a thickness closer to the original thickness and is finished thick, which causes ununiform stiffness and discomfort.

In the second variation of the seventh embodiment of the present invention, however, although the facing end surfaces of the pair of thinner thermoplastic resin members 10g and 11g are in the zigzag shape as seen from above as shown in FIG. 24B, the welded part between the pair of thinner thermoplastic resin members is finished to have a uniform thickness, which provides uniform stiffness and no discomfort.

In the seventh embodiment and the variations, the ultrasonic welding method, the structure welded by the ultrasonic welding method, and the ultrasonic welding machine have been described. In the method, two or more thermoplastic resin members are welded as follows. That is, the two or more thermoplastic resin members are aligned and placed on an anvil. The pressing surface of the tool horn vibrating ultrasonically in a direction not perpendicular to but along the upper surfaces of the thermoplastic resin members is pressed onto the upper surfaces. The pressing force of the tool horn vibrating ultrasonically is applied to melt the vicinity of the upper surfaces of the thermoplastic resin members. The welded structure part is therefore formed on the unwelded structure part to obtain an overlap structure including the welded structure part arranged on the unwelded structure part.

With this configuration, the ultrasonic welding machines according to the variations of the seventh embodiment provide the following advantages: (1) the same distance is kept between the facing end surfaces before and after the welding; and (2) the anvil-side surface of the thermoplastic resin is neither burned nor discolored before and after the welding; and in addition, (3) the facing surfaces of the pair of thermoplastic resin members are firmly integrated; and (4) even the thinner thermoplastic resin members can be welded.

The fifth embodiment described above is the same in that the two or more thermoplastic resin members are aligned and placed on the anvil and are welded together.

Eighth Embodiment of Present Invention

In an eighth embodiment of the present invention, a pair of thermoplastic resin members are butt welded in the following manner. That is, the pair of thermoplastic resin members are placed on an anvil with their end surfaces facing each other. A pressing force of a tool horn vibrating ultrasonically in two opposite directions along the upper surfaces of a region where the end surfaces of the pair of thermoplastic resin members face each other is applied to these upper surfaces, obliquely downward from obliquely above the upper surfaces of the region where the end surfaces of the pair of thermoplastic resin members face each other. The applied ultrasonic vibration energy melts the vicinity of the upper surfaces of the pair of thermoplastic resin members, thereby butt welding the pair of thermoplastic resin members.

Figure 25:
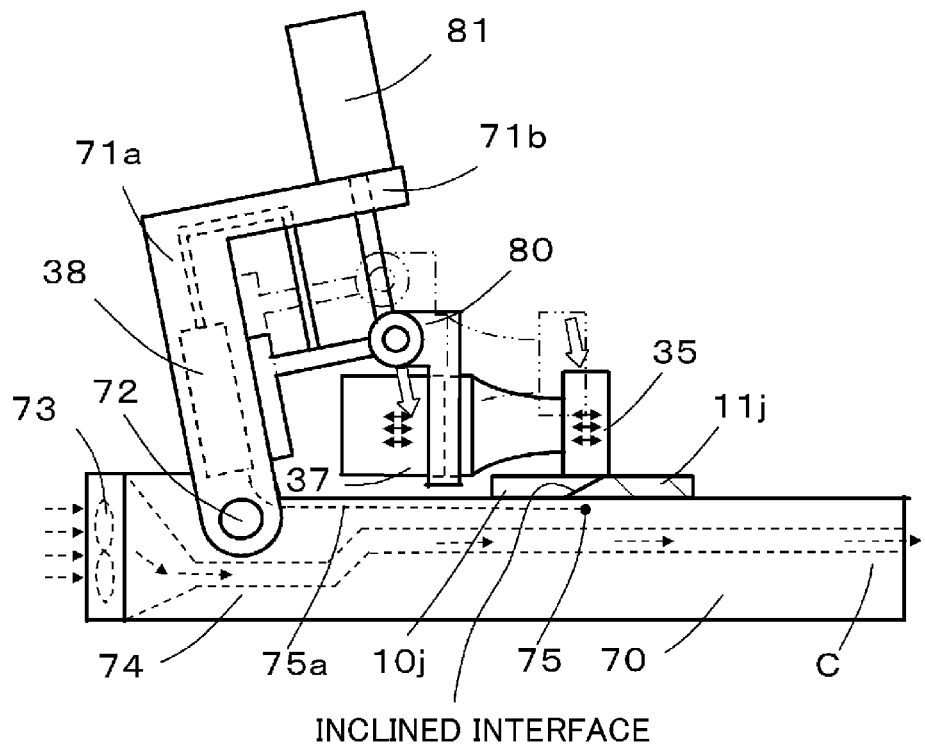
FIG. 25 is a front view of an ultrasonic welding machine according to an eighth embodiment of the present invention.
Figure 27:
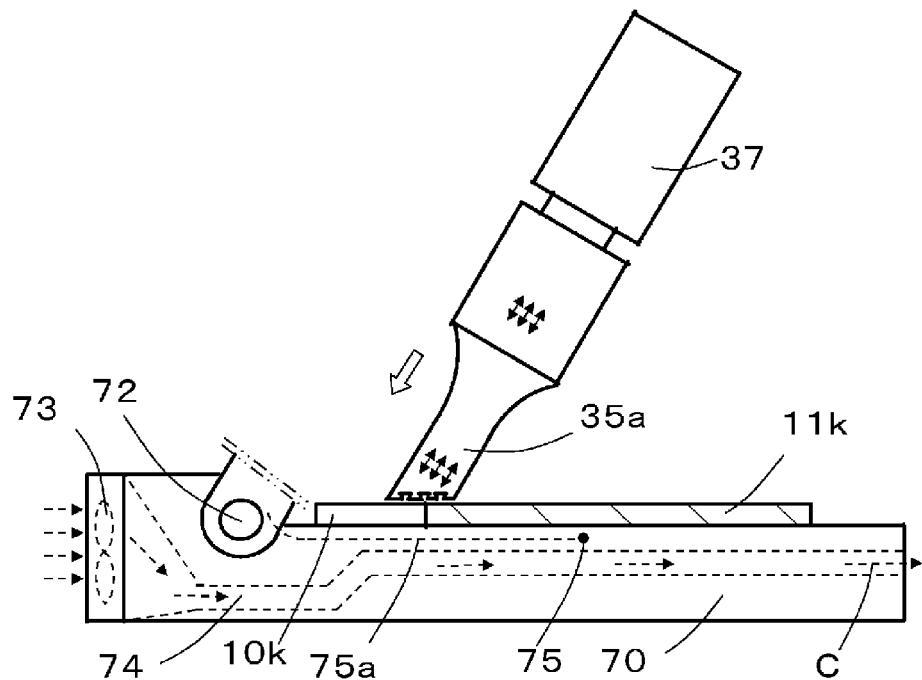
FIG. 27 is a front view of a major part of an ultrasonic welding machine according to a first variation of the eighth embodiment of the present invention.
Figure 30:
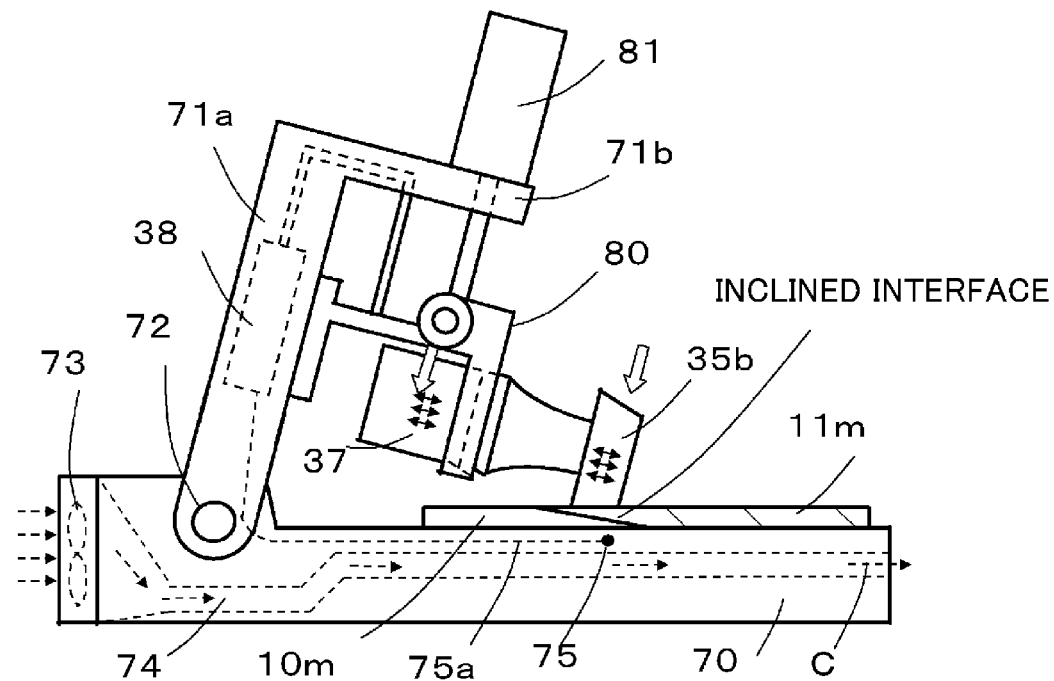
FIG. 30 is a front view of an ultrasonic welding machine according to a second variation of the eighth embodiment of the present invention.
Figure 32:
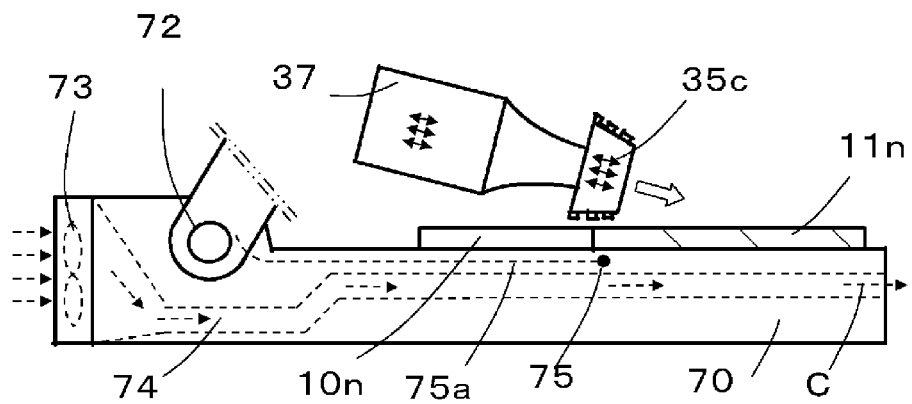
FIG. 32 is a front view of a major part of an ultrasonic welding machine according to a third variation of the eighth embodiment of the present invention.

FIG. 25 is a front view of an ultrasonic welding machine according to the eighth embodiment of the present invention. FIGS. 27, 30, and 32 show first, second, and third variations, respectively, of the embodiment. In the ultrasonic welding machine according to the eighth embodiment of the present invention, pairs of thermoplastic resin members 10j and 11j, 10k and 11k, 10m and 11m, and 10n and 11n are placed on the upper surface of an anvil 70 with their end surfaces facing each other.

Note that the ultrasonic welding machine according to the eighth embodiment of the present invention shown in FIGS. 25 and 30, the end surfaces of the pairs of thermoplastic resin member 10j and 11j, and 10m and 11m, that is, the respective interfaces between the pairs serve as "inclined interfaces" inclined with respect to the surface of the anvil 70. This is because this configuration provides a higher welding strength than an interface perpendicular to the surface of the anvil 70 as in the embodiments described above.

FIG. 25 shows ultrasonic welding with a tool horn 35 pressed onto the inclined interface between the pair of thermoplastic resin members 10j and 11j obliquely from the upper left to the lower right. The pressing surface of the tool horn 35 is moved obliquely, thereby applying the pressing force of the tool horn 35 obliquely, with respect to the upper surfaces above the inclined interface between the pair of thermoplastic resin members 10j and 11j.

The ultrasonic vibration of the pressing surface of the tool horn 35 is applied obliquely, from the upper left to the lower right, to the upper surfaces above the inclined interface between the pair of thermoplastic resin members 10j and 11j. For example, it is understood that the force vector ($F_{VO}$) of an air press is divided into the horizontal force ($F_{VX}$) and the vertical force ($F_{VY}$) to act. Similarly, the pressing force, that is, the vertical force ($F_{VY}$) applied onto the inclined interface between the pair of thermoplastic resin members 10j and 11j is smaller than the force vector ($F_{VO}$) of the air press. From the foregoing, if the tool horn is pressed on the surfaces while moving obliquely, it is possible to apply softly a smaller pressing force even with the same ultrasonic welding machine. Particularly in the case of a thinner thermoplastic resin member, the ultrasonic vibration can be applied to the surface of the thinner thermoplastic resin member by softly pressing the surface with a smaller force, which makes it easy to form an overlap structure including a welded structure part (A) arranged on an unwelded structure part (B) at the facing end surfaces of the pair of thinner thermoplastic resin members.

Figure 26:
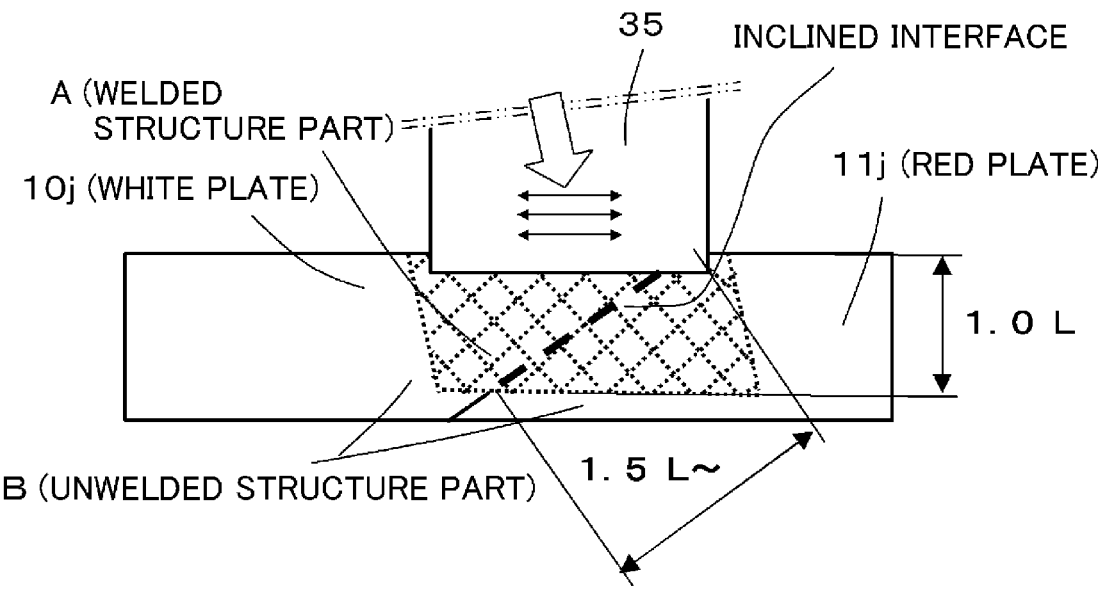
FIG. 26 is a cross-sectional view of a vicinity of a welded structure part of a structure welded by a welding method according to the eighth embodiment of the present invention.

As shown in FIG. 26, when the tool horn 35 moves from the upper left to the lower right, the region to be welded moves obliquely from the upper surfaces of the pair of thermoplastic resin members 10j and 11j toward the anvil. Accordingly, the welded structure part (A) is formed in a parallelogram region indicated by a dotted line on the unwelded structure part (B). When the inclined interface between the pair of thermoplastic resin members 10j and 11j is included in the welded structure part (A), the thermoplastic resin members 10j and 11j are welded.

Figure 28:
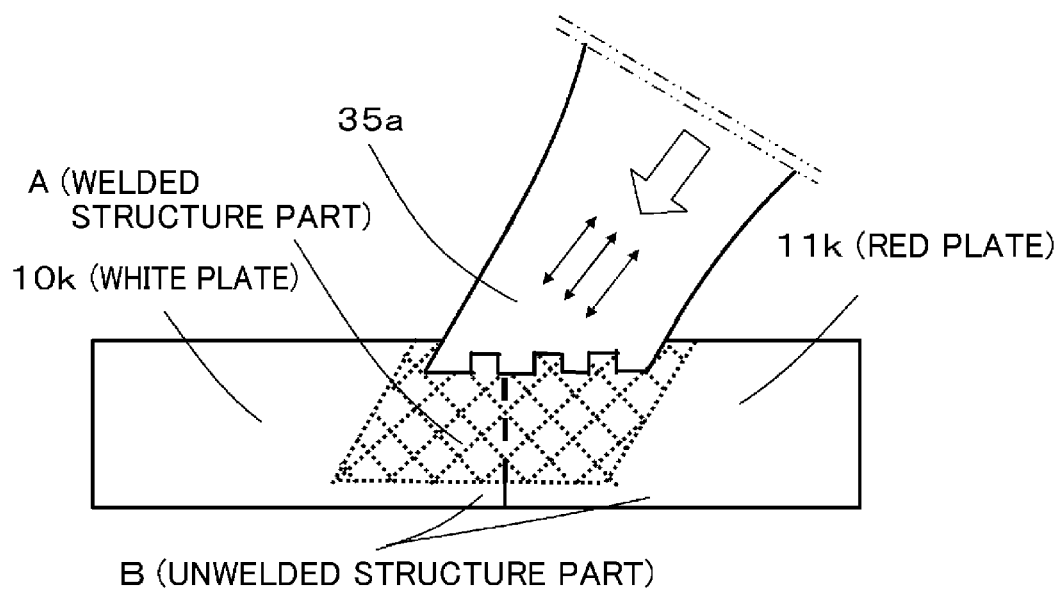
FIG. 28 is a cross-sectional view of a vicinity of a welded structure part of a structure welded by a welding method according to the first variation of the eighth embodiment of the present invention.

In the configuration described in the first variation of the eighth embodiment in FIG. 27, the ultrasonic welding is performed with a tool horn 35a pressed directly onto the interface between the pair of thermoplastic resin members 10k and 11k and obliquely from the upper right to the lower left. In FIG. 27, the ultrasonic vibration of the tool horn 35a is applied also obliquely to the surfaces of the pair of thermoplastic resin members 10k and 11k. As shown in an enlarged view of FIG. 28, the tool horn 35a has, on the pressing surface, a plurality of projections and recesses. The ultrasonic vibration energy is applied obliquely toward the anvil side of the pair of thermoplastic resin members 10k and 11k to melt the vicinity of the upper surfaces of the pair of thermoplastic resin members 10k and 11k. Although the interface is perpendicular to the surfaces of the pair of thermoplastic resin members 10k and 11k, the ultrasonic vibration is performed so as to leave the unwelded structure part (B).

Figure 29:
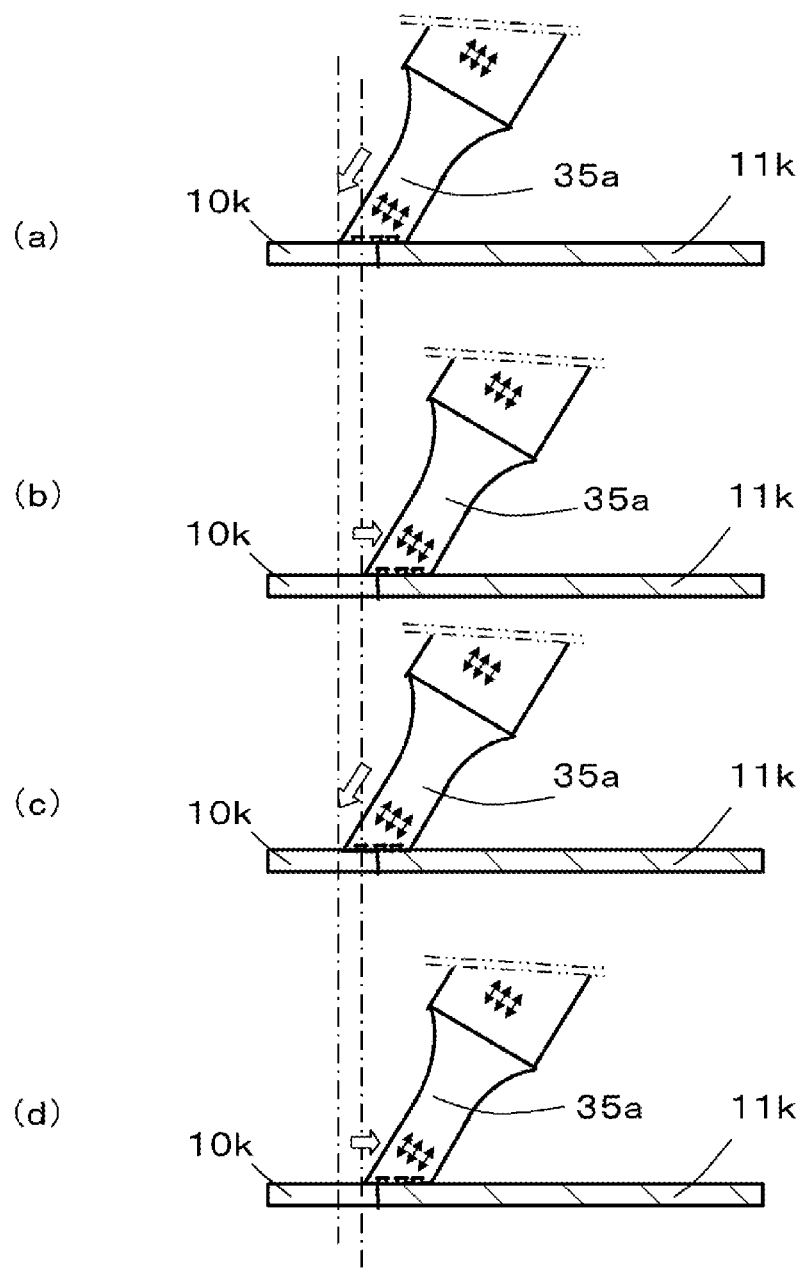
FIG. 29 includes (a), (b), (c), and (d) which show welding with a tool horn moving horizontally on a pair of thermoplastic resin members according to the first variation of the eighth embodiment of the present invention.

As shown in (a), (b), (c), and (d) of FIG. 29, the operation of pressing the tool horn 35a obliquely from the upper right to the lower left and the operation of moving the tool horn from the left to the right along the upper surfaces of the pair of thermoplastic resin members 10k and 11k alternate. The combination of these operations increases the ultrasonic vibration energy applied onto the upper surfaces of the pair of thermoplastic resin members 10k and 11k and the amount of the thermoplastic resin melted, cooled, and solidified on the upper surfaces of the pair of thermoplastic resin members 10k and 11k. An increase in the welding strength is thus expected.

In the second variation of the eighth embodiment in FIG. 30, the ultrasonic welding is performed with a tool horn 35b pressed directly onto the inclined interface between the pair of thermoplastic resin members 10m and 11m and obliquely from the upper right to the lower left. The pressing surface of the tool horn 35b has substantially a trapezoid shape to press, as a plane, the upper surfaces of the pair of thermoplastic resin members 10m and 11m. One of the inclined surfaces of the trapezoid serves as the pressing surface. In the ultrasonic welding machine according to the eighth embodiment of the present invention in FIG. 30, the end surfaces of the pair of thermoplastic resin members 10m and 11m, that is, the interface between the pair, serves as an "inclined interface" inclined with respect to the surface of the anvil 70.

Figure 31:
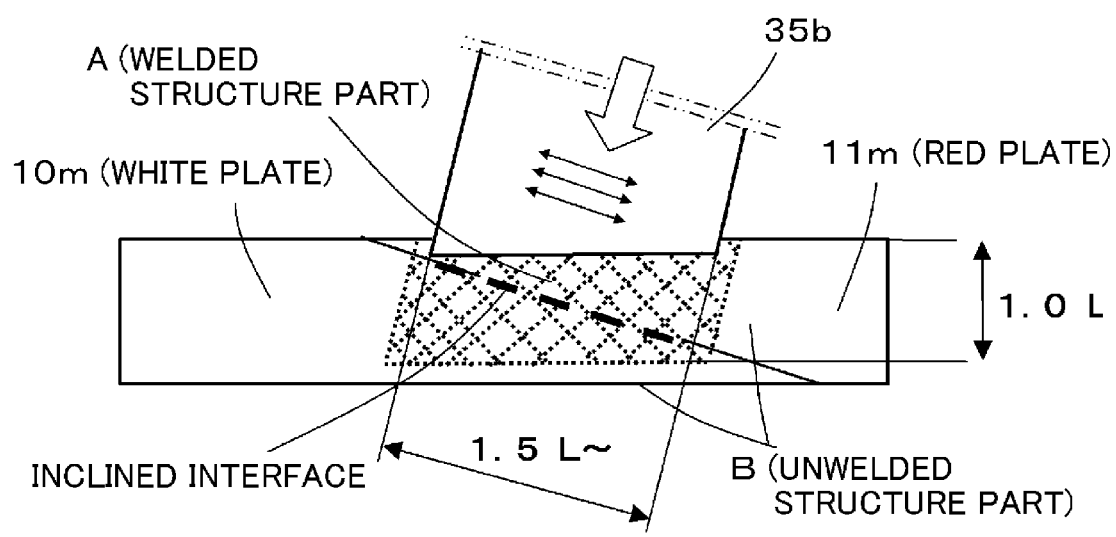
FIG. 31 is a cross-sectional view of a vicinity of a welded structure part of a structure welded by a welding method according to the second variation of the eighth embodiment of the present invention.

As shown in an enlarged view of FIG. 31, the ultrasonic vibration energy is applied obliquely from the pressing surface of the tool horn 35b toward the anvil side of the pair of thermoplastic resin members 10m and 11m to melt the vicinity of the upper surfaces of the pair of thermoplastic resin members. The ultrasonic vibration is performed so as to include the inclined interface in the welded structure part (A) and leave the unwelded structure part (B).

The ultrasonic vibration of the tool horn 35b acts as a vibration that presses and hits the "inclined interface" between the pair of thermoplastic resin members 10m and 11m. Accordingly, vibration energy higher than that applied onto the interface perpendicular to the surface of the anvil 70 can be applied, as a strong pressing energy, to the inclined interface between the pair of thermoplastic resin members 10m and 11m. The tool horn 35b has, on the pressing surface, a plurality of projections and recesses. The ultrasonic vibration energy is applied obliquely toward the anvil side of the pair of thermoplastic resin members 10m and 11m to melt the vicinity of the upper surfaces of the pair of thermoplastic resin members. Although the interface is inclined with respect to the surfaces of the pair of thermoplastic resin members 10m and 11m, the ultrasonic vibration is performed so as to leave the unwelded structure part (B).

In the third variation of the eighth embodiment in FIG. 32, ultrasonic welding is performed with a tool horn 35c pressed onto the interface between the pair of thermoplastic resin members 10n and 11n obliquely from the upper left to the lower right. In FIG. 32, the ultrasonic vibration of the tool horn 35 is applied also obliquely to the surfaces of the pair of thermoplastic resin members 10n and 11n. The pressing surface of the tool horn 35c is has substantially a trapezoid shape to press, as a plane, the upper surfaces of the pair of thermoplastic resin members 10n and 11n. One of the inclined surfaces of the trapezoid serves as the pressing surface, and the pressing surface has projections and recesses.

Figure 33:
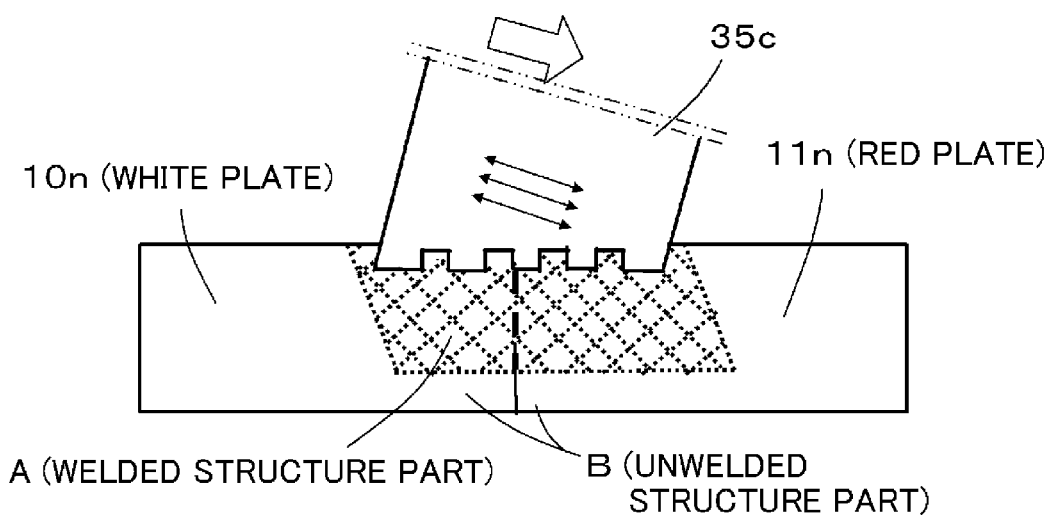
FIG. 33 is a cross-sectional view of a vicinity of a welded structure part of a structure welded by a welding method according to the third variation of the eighth embodiment of the present invention.

As shown in an enlarged view of FIG. 33, the ultrasonic vibration energy is applied obliquely toward the anvil side of the pair of thermoplastic resin members 10n and 11n to melt the vicinity of the upper surfaces of the pair of thermoplastic resin members 10n and 11n. Although the interface is perpendicular to the surfaces of the pair of thermoplastic resin members 10n and 11n, the ultrasonic vibration is performed so as to leave the unwelded structure part (B).

Figure 34:
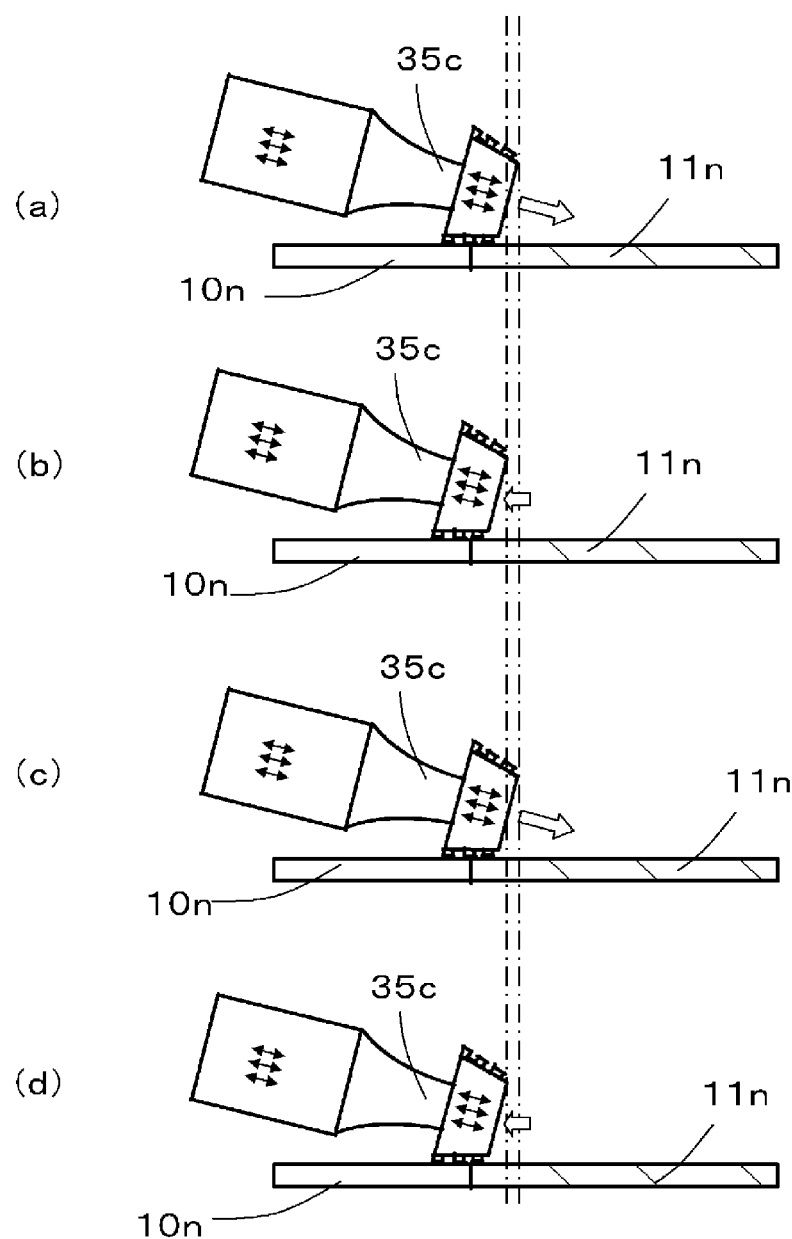
FIG. 34 includes (a), (b), (c), and (d) which show welding with a tool horn moving horizontally on a pair of thermoplastic resin members according to the third variation of the eighth embodiment of the present invention.

As shown in (a), (b), (c), and (d) of FIG. 34, the operation of pressing the tool horn 35c obliquely from the upper left to the lower right and the operation of moving the tool horn from the right to the left along the upper surfaces of the pair of thermoplastic resin members 10n and 11n alternate. The combination of these operations increases the ultrasonic vibration energy applied onto the upper surfaces of the pair of thermoplastic resin members 10n and 11n and the amount of the thermoplastic resin melted, cooled, and solidified on the upper surfaces of the pair of thermoplastic resin members 10n and 11n. An increase in the welding strength is thus expected.

Figure 35:
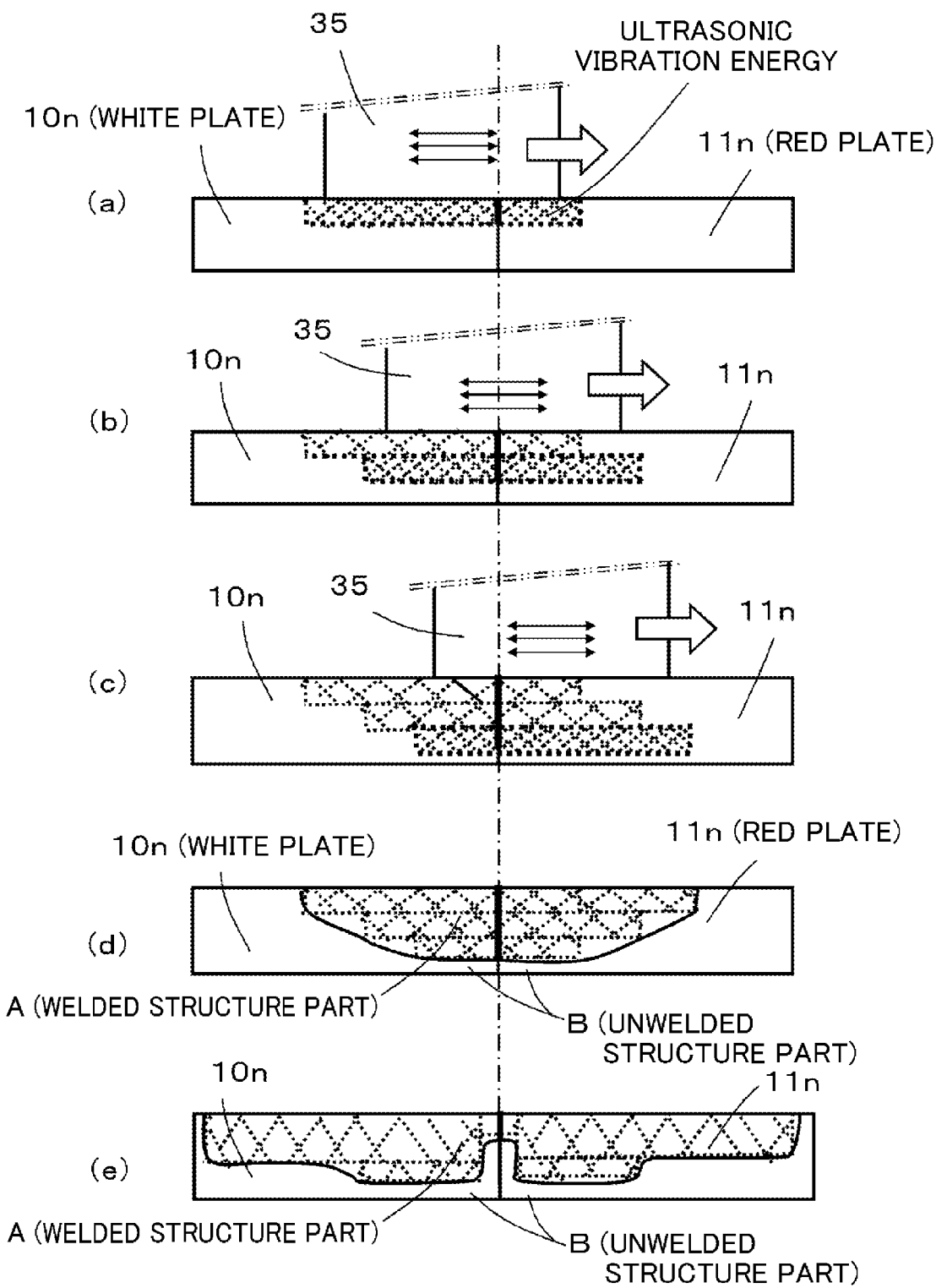
FIG. 35 includes: (a), (b), and (c) which show welding with a tool horn moving horizontally on a pair of thermoplastic resin members according to the eighth embodiment of the present invention; and (d) and (e) which show a configuration of a structure welded with the tool horn moving horizontally on the pair of thermoplastic resin members according to the eighth embodiment of the present invention.

For example, as shown in (a), (b), and (c) of FIG. 35, the tool horn 35 moves from the left to the right while vibrating ultrasonically along the upper surfaces of the facing ends of the pair of thermoplastic resin members 10n and 11n, with the pressing surface pressed onto the upper surfaces. Thus, the region where the ultrasonic vibration energy is applied moves from the left to the right. The amount of ultrasonic vibration energy applied is determined as an integral value at a location where the ultrasonic vibration energy is applied, and therefore varies depending on the length of time of pressing the tool horn 35. For example, as shown in (d) of FIG. 35, the welded structure part (A) and the unwelded structure part (B) can be formed so that the welded structure part (A) has a wider upper surface and a shape tapered downward (i.e., along the thickness). As shown in (e) of FIG. 35, the welded structure part (A) may have a shape that is shallower in the downward direction (i.e., along the thickness direction) at the interface, deeper around the interface, and shallower on the periphery. In this manner, movement of the tool horn 35 may be controlled to freely determine the shapes of the welded structure part (A) and the unwelded structure part (B) shown in (d) and (e) of FIG. 35 as necessary.

Although not shown in the figure, the ultrasonic welding machine according to the present invention described above may have the following additional elements to form the welded structure part (A) and the unwelded structure part (B) in any preferred shapes: (1) a tool horn mover that moves the tool horn along the upper surfaces of a pair of thermoplastic resin members or two or more thermoplastic resin members; and (2) a moving speed controller that variably controls the moving speed of the tool horn mover in a predetermined pattern.

Specifically, the controller 38 causes the tool horn 35 to perform the ultrasonic vibration and the pressing, that is, causes the tool horn 35 to vibrate ultrasonically in a direction not perpendicular to but along the upper surfaces of the thermoplastic resin member 10n and 11n so that the pressing surface of the tool horn 35 presses the upper surfaces.

At this moment, the mover of the tool horn 35 and the moving speed controller are used to move the pressing surface of the tool horn 35 along the upper surfaces of the pair of thermoplastic resin members 10n and 11n or two or more thermoplastic resin members 10n and 11n at a moving speed variable in the predetermined pattern. The vicinity of the upper surfaces of the pair of thermoplastic resin members 10n and 11n is melted in this manner. If a moving speed per unit length is high while constant ultrasonic vibration energy is emitted from the pressing surface of the tool horn 35, the ultrasonic vibration energy is emitted thinly with respect to the unit length. On the other hand, if a moving speed per unit length is low, the ultrasonic vibration energy is emitted densely with respect to the unit length. In (a), (b), and (c) of FIG. 35, the amount of the ultrasonic vibration energy emitted from the tool horn 35 moving at the same moving speed is represented by the area of a rectangle. At a higher moving speed per unit length, the rectangle has a smaller thickness and a smaller area. On the other hand, at a lower moving speed per unit length, the rectangle has a larger thickness and a larger area. The size of the welded structure part is proportional to the amount of applied ultrasonic vibration energy.

The moving speed of the tool horn mover is controlled variably in the predetermined pattern to form, on an unwelded structure part, a welded structure part in the shape corresponding to the pattern. In this manner, the control is performed to weld the two or more thermoplastic resin members into an overlap structure including the welded structure part arranged on the unwelded structure part. This control allows the formation of the welded structure part (A) and the unwelded structure part (B) in the shapes as shown in (d) and (e) of FIG. 35.

Again, the control of the movement of the tool horn 35 in a certain pattern as necessary allows the free setting of the shapes of the welded structure part (A) and the unwelded structure part (B) as shown in (d) and (e) of FIG. 35. The control provides a desired welding strength by efficiently utilizing the ultrasonic vibration energy, which is convenient.

In the eighth embodiment and variations described above, the ultrasonic welding method, the structure welded by the ultrasonic welding method, and the ultrasonic welding machine have been described. In the method, a pair of thermoplastic resin members are butt welded as follows. That is, the pair of thermoplastic resin members are placed on the anvil with their end surfaces facing each other. The pressing surface of the tool horn vibrating ultrasonically in a direction not perpendicular to but along the upper surfaces of a region where end surfaces of the pair of thermoplastic resin members face each other is pressed onto the upper surfaces of the region. The pressing force of the tool horn vibrating ultrasonically is applied to melt the vicinity of the upper surfaces of the pair of thermoplastic resin members. The welded structure part is therefore formed on the unwelded structure part to obtain an overlap structure including the welded structure part arranged on the unwelded structure part.

The ultrasonic welding machine according to the eighth embodiment of the present invention provides the following advantages of the present invention: (1) the same distance is kept between the facing end surfaces before and after the welding; and (2) the anvil-side surface of the thermoplastic resin is neither burned nor discolored before and after the welding; and in addition, (3) the facing surfaces of the pair of thermoplastic resin members are firmly integrated; and (4) even the thinner thermoplastic resin members can be welded.

Ninth Embodiment of Present Invention

In an ultrasonic welding machine according to a ninth embodiment of the present invention, an air cooling fan 73 as an air cooling device is attached to the outside of an anvil 70 that has a through-hole 74 through which air C passes. The air flows from one end of the thorough-hole 74 to the other to release the heat inside the anvil 70 to the outside of the anvil 70. A temperature sensor 75 is embedded in the anvil 70 to transmit temperature information via a signal line 75a to an ultrasonic vibration controller 38 and performs feedback control of the temperature information on the anvil 70.

The ultrasonic welding machine according to the ninth embodiment of the present invention has almost the same configuration already shown in FIG. 25. Just to be sure, FIG. 36 is an enlarged view showing a positional relationship among a part of the anvil 70, the pair of thinner thermoplastic resin materials 10j and 11j, and the tool horn 35 as a main structure of the ultrasonic welding machine according to the ninth embodiment of the present invention.

In the ninth embodiment, the pair of thermoplastic resin members 10j and 11j are butt welded as follows. That is, the pair of thermoplastic resin members 10j and 11j are placed on the anvil 70 with their end surfaces facing each other. Based on the temperature information on the anvil, a cooler is used to set the temperature of the anvil 70 to be a constant temperature or lower. The pressing force of the tool horn 35 vibrating ultrasonically in two opposite directions along the upper surface of a region where end surfaces of the pair of thermoplastic resin members 10j and 11j face each other is applied to the upper surface. The ultrasonic vibration energy is therefore applied to melt the vicinity of the upper surfaces of the pair of thermoplastic resin members 10j and 11j.

Figure 36:
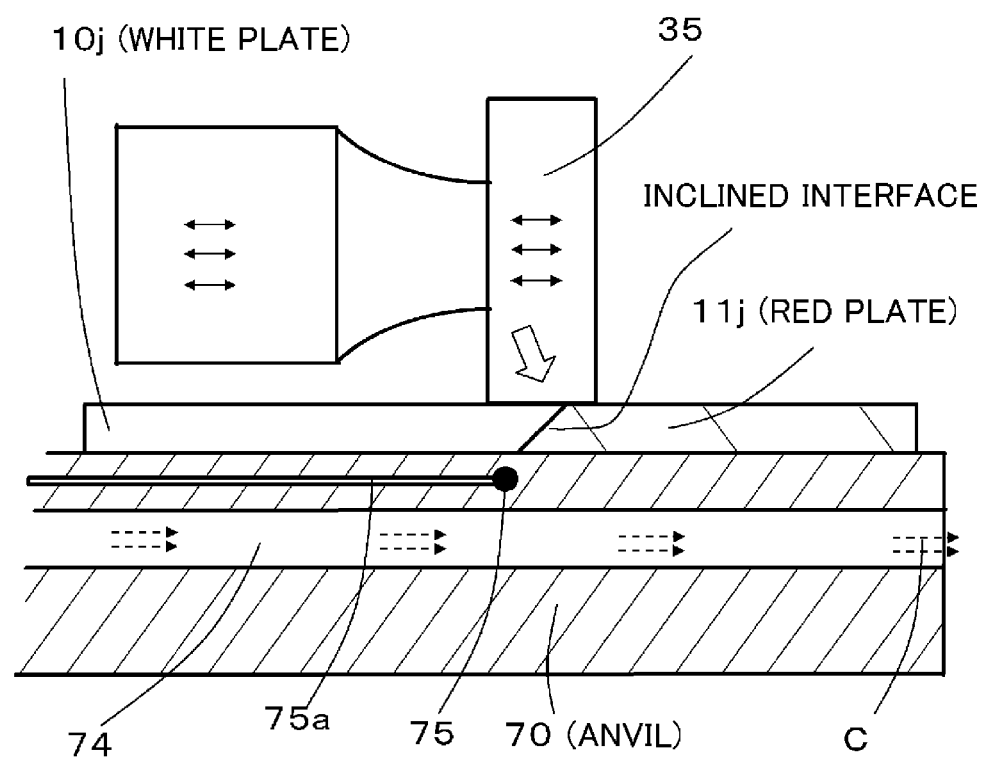
FIG. 36 is a partial cross-sectional view showing a positional relationship among an anvil, a pair of thinner thermoplastic resin members, and a tool horn in an ultrasonic welding machine according to a ninth embodiment of the present invention.

As shown in FIG. 36, when the tool horn 35 applies the ultrasonic vibration along the upper surfaces of the pair of thinner thermoplastic resin members 10j and 11j, the pair of thinner thermoplastic resin members 10j and 11j melt from the upper surfaces toward the anvil 70. Since the anvil 70 is cooled by the temperature sensor 75 and the air cooling fan 73 to the constant temperature or lower, the temperatures of the pair of thinner thermoplastic resin members 10j and 11j near the anvil 70 are kept lower. If the pair of thinner thermoplastic resin members 10j and 11j near the anvil 70 has lower temperatures, the melted thermoplastic resin flows slowly near the anvil 70. Thus, the gap (S) does not increase, and the surfaces do not burn. Accordingly, an overlap structure is obtained in which the welded structure part (A) is arranged on the unwelded structure part (B) of the facing end surfaces of the pair of thinner thermoplastic resin members.

This configuration provides the following advantages of the present invention: (1) the same distance is kept between the facing end surfaces before and after the welding; and (2) the anvil-side surface of the thermoplastic resin is neither burned nor discolored before and after the welding; and in addition, (3) the facing surfaces of the pair of thermoplastic resin members are firmly integrated; and (4) even the thinner thermoplastic resin members can be welded.

Note that the air cooling fan 73 has been described above as the cooler, a liquid cooler for circulating a liquid refrigerant may be used.

Tenth Embodiment of Present Invention

An ultrasonic welding machine according to a tenth embodiment of the present invention controls cooling of an anvil.

Figure 37:
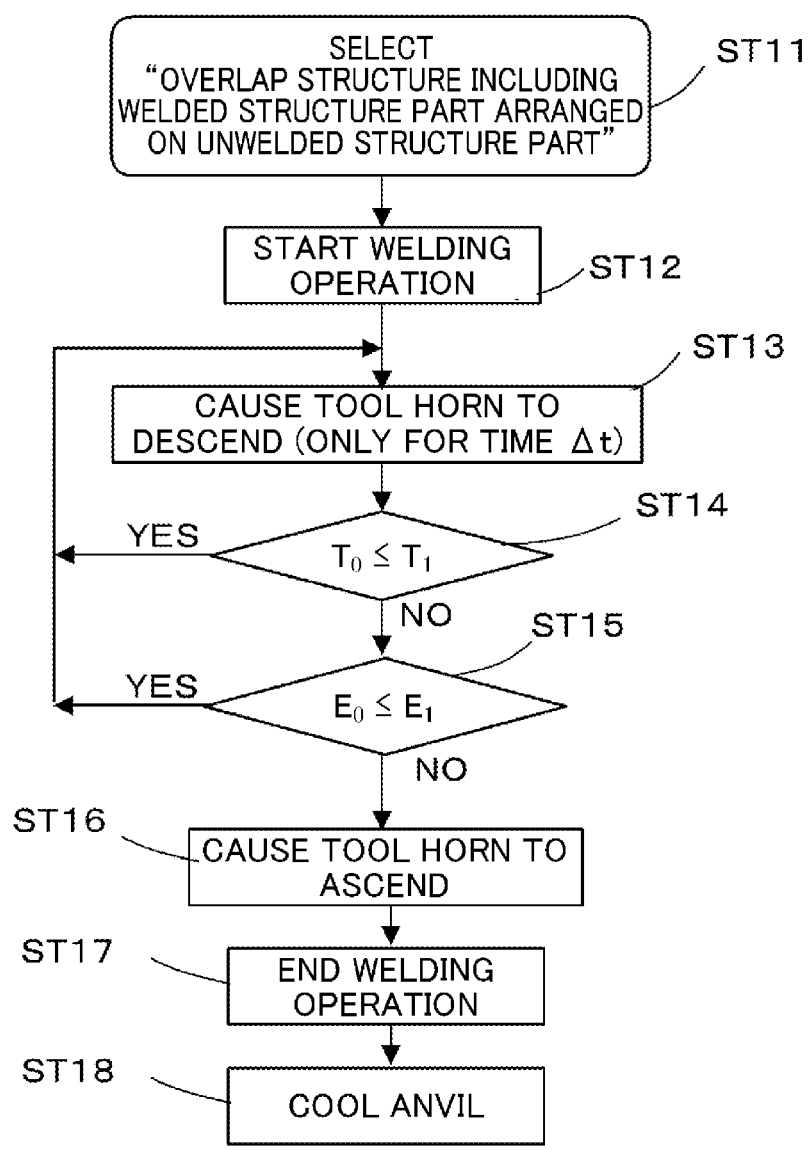
FIG. 37 is a flowchart (i.e. a flow diagram) showing a procedure of a welding operation using an ultrasonic welding machine according to a tenth embodiment of the present invention.

In an operation flow of the ultrasonic welding machine according to the ninth embodiment of the present invention shown in FIG. 37, the "overlap structure including the welded structure part arranged on the unwelded structure part" is selected (step ST11) as a process in the present invention. Once the welding operation starts (step ST12), an ultrasonic vibration controller 38 causes a tool horn 35 to descend at a predetermined amount each time Δt. At each time, it is observed whether the temperature (T0) of an anvil 70 is lower than or equal to a predetermined temperature (T1)(step ST14), and whether applied ultrasonic vibration energy E0 is lower than or equal to a predetermined amount (E1) of energy (step ST15). If one of the answers is Yes, the process returns to step ST13 and the tool horn 35 continues to descend. If both the answers are No, the tool horn 35 ascends to avoid an increase of the gap (S) or burning of the surfaces (step ST16), and the welding operation ends (step ST17). After that, the anvil 70 is cooled within a predetermined temperature range (step ST18). Once the anvil 70 is cooled, the welding operation can restart. In particular, this control operation is useful when the temperature of the anvil 70 increases due to continuous welding operation.

Eleventh Embodiment of Present Invention

An ultrasonic welding machine according to an eleventh embodiment of the present invention controls a temperature of an anvil within a predetermined temperature range before the start of a welding operation to the end of the welding operation.

Figure 38:
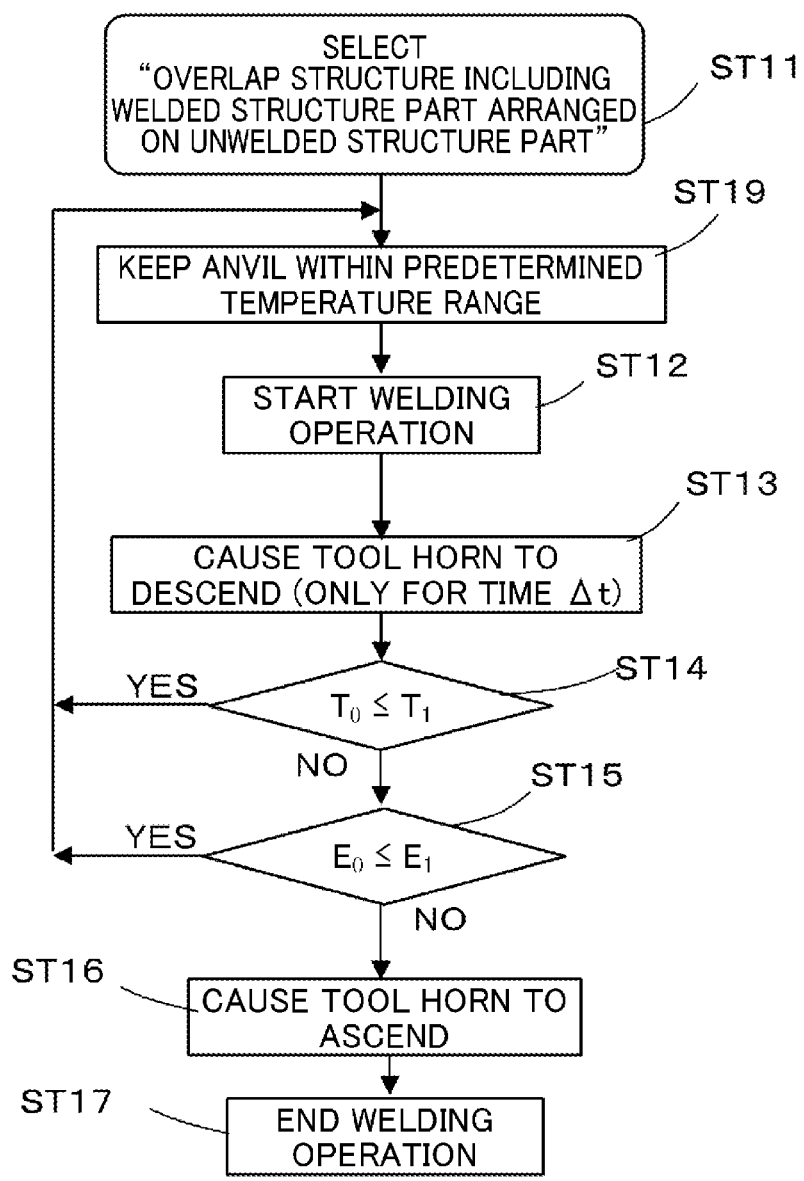
FIG. 38 is a flowchart (i.e. a flow diagram) showing a procedure of a welding operation using an ultrasonic welding machine according to an eleventh embodiment of the present invention.

Specifically, in another operation flow of the ultrasonic welding machine according to the eleventh embodiment of the present invention shown in FIG. 38, the "overlap structure including the welded structure part arranged on the unwelded structure part" is selected (step ST11) as a process in the present invention. Then, an ultrasonic vibration controller 38 starts controlling the temperature of the anvil 70 within the predetermined temperature range (step ST19). The procedures are carried out from the start of the welding operation (step ST12) to the end of the welding operation (step ST17) while the temperature of the anvil 70 is continuously controlled within the predetermined temperature range.

After controlling the temperature of the anvil within the predetermined temperature range, the ultrasonic vibration controller 38 causes the tool horn 35 to descend at a predetermined amount each time Δt. At each time, it is observed whether the temperature (T0) of the anvil 70 is lower than or equal to a predetermined temperature (T1) (step ST14), and whether applied ultrasonic vibration energy E0 is lower than or equal to a predetermined amount (E1) of energy (step ST15). If both the answers are No, the tool horn 35 ascends to avoid an increase of the gap (S) or burning of the surfaces (step ST16), and the welding operation ends (step ST17).

The ultrasonic welding machine according to the tenth embodiment of the present invention cools the anvil after the end of the welding operation. The ultrasonic welding machine according to the eleventh embodiment of the present invention controls the temperature of the anvil within the predetermined temperature range during the welding operation. This control stably reduces an increase in the gap (S) or burning of the surfaces.

Twelfth Embodiment of Present Invention

Figure 39:
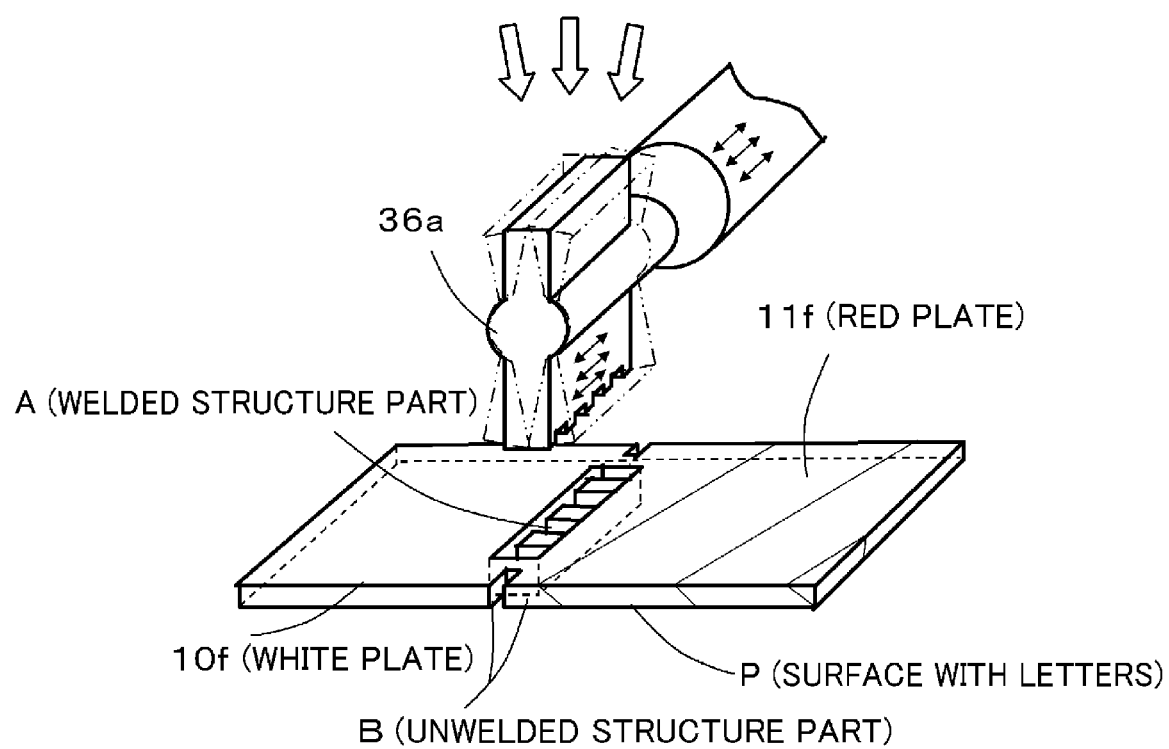
FIG. 39 is a perspective view showing an inclination of the pressing surface of a tool horn seen from the top of the tool horn in a twelfth embodiment of the present invention.

As shown in FIG. 39, in an ultrasonic welding machine according to a twelfth embodiment of the present invention, a tool horn 36a vibrates ultrasonically in parallel to facing surfaces of a pair of thinner thermoplastic resin members 10f and 11f.

Figure 40:
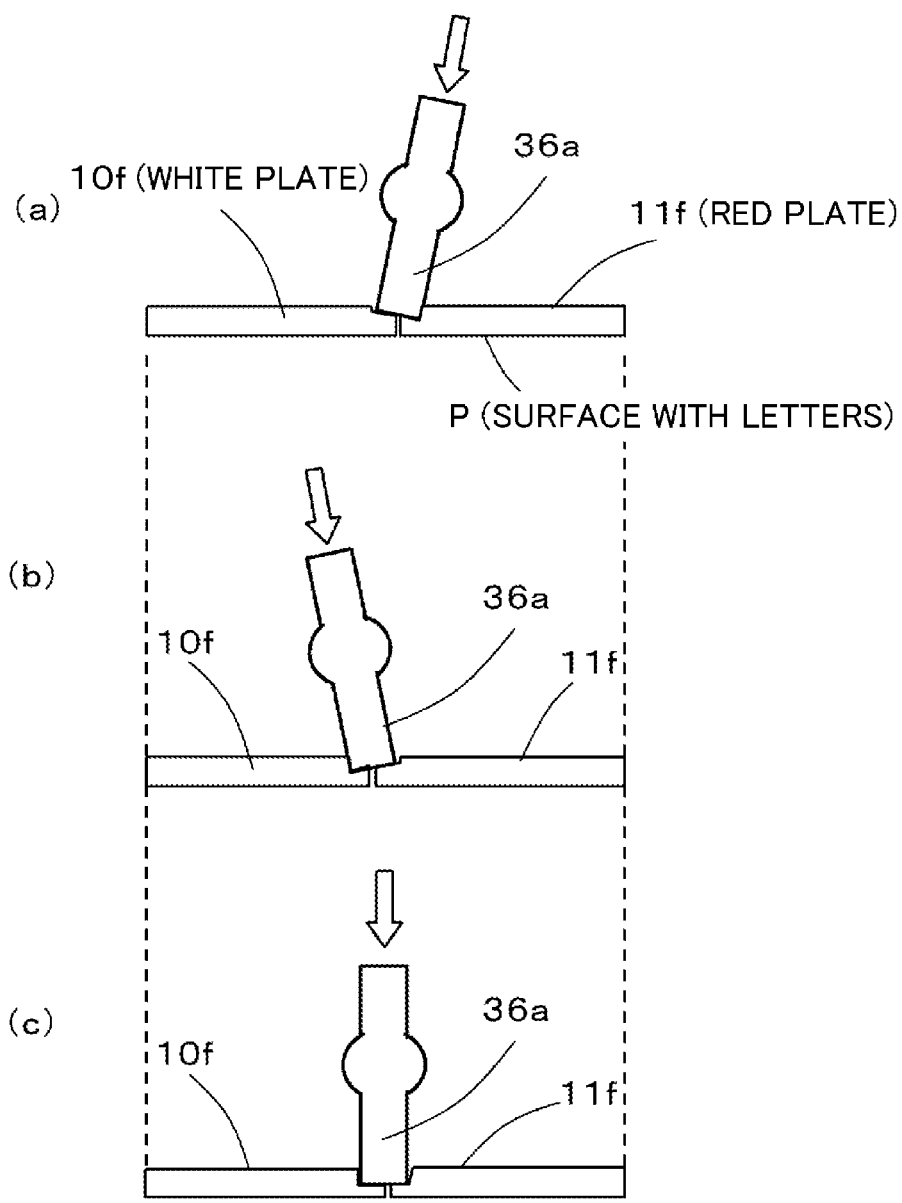
FIG. 40 includes (a), (b), and (c) which show the inclination of the pressing surface of the tool horn seen from the top of the tool horn in the twelfth embodiment of the present invention.

As shown in (a) and (b) of FIG. 40, the biting amount of the tool horn 36a is changed by inclining the tool horn 36a with respect to the surfaces of the pair of thinner thermoplastic resin members 10f and 11f. That is, the amount of the melted resin varies depending on the inclination of the tool horn 36a.

In the twelfth embodiment of the present invention, the pair of thermoplastic resin members are butt welded as follows. That is, the pair of thermoplastic resin members are placed on the anvil with their end surfaces facing each other. The tool horn vibrates ultrasonically in parallel to the facing surfaces of the thinner thermoplastic resin members. The pressing force of the tool horn vibrating ultrasonically in two opposite directions along the upper surface of a region where end surfaces of the pair of thermoplastic resin members face each other is applied to the upper surface. The ultrasonic vibration energy is thus applied to melt the vicinity of the upper surfaces of the pair of thermoplastic resin members.

The following steps may be combined for the welding: a step in which the tool horn 36a is pressed obliquely with respect to the surfaces of the pair thinner thermoplastic resin members 10f and 11f as shown in (a) and (b) of FIG. 40; and a step in which the tool horn 36a is pressed perpendicularly to the surfaces of the pair of thinner thermoplastic resin members 10f and 11f as shown in (c) of FIG. 36.

The ultrasonic welding machine according to the twelfth embodiment provides the following advantages: (1) the same distance is kept between the facing end surfaces before and after the welding; and (2) the anvil-side surface of the thermoplastic resin is neither burned nor discolored before and after the welding; and in addition, (3) the facing surfaces of the pair of thermoplastic resin members are firmly integrated; and (4) even the thinner thermoplastic resin members can be welded.

Thirteenth Embodiment of Present Invention

An example has been described with reference to FIGS. 18A and 18B in the sixth embodiment of the present invention in which the thermoplastic resin member 10b that is the white plate and the white fitting part 10bw are molded integrally, and the thermoplastic resin member 11b that is the red plate and the red fitting part 11br are molded integrally. Alternatively, in a case in which the planar part of the thermoplastic resin member 10b that is the white plate and the planar part of the thermoplastic resin member 11b that is the red plate serve as thinner thermoplastic resin members, the white fitting part 10bw and the red fitting part 11br may be manufactured as separated parts and welded to the planar part of the white plate 10b and the planar part of the red plate 11b, respectively.

Figure 41A:
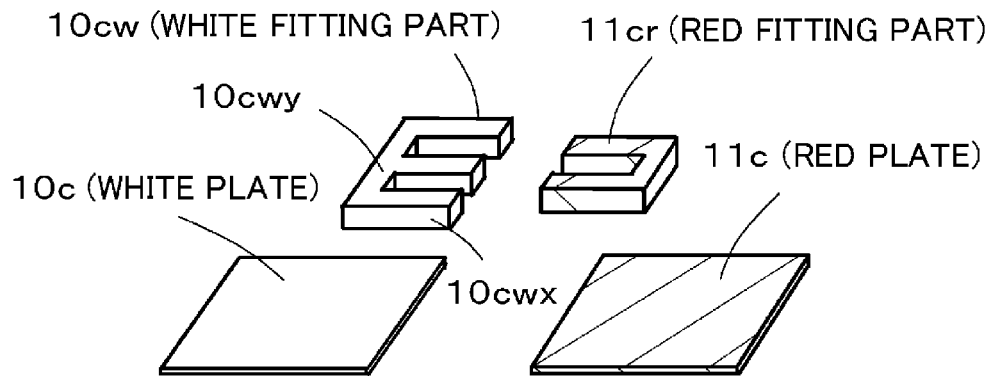
FIG. 41A shows a step of manufacturing a brand nameplate 100 according to a thirteenth embodiment of the present invention.
Figure 41B:
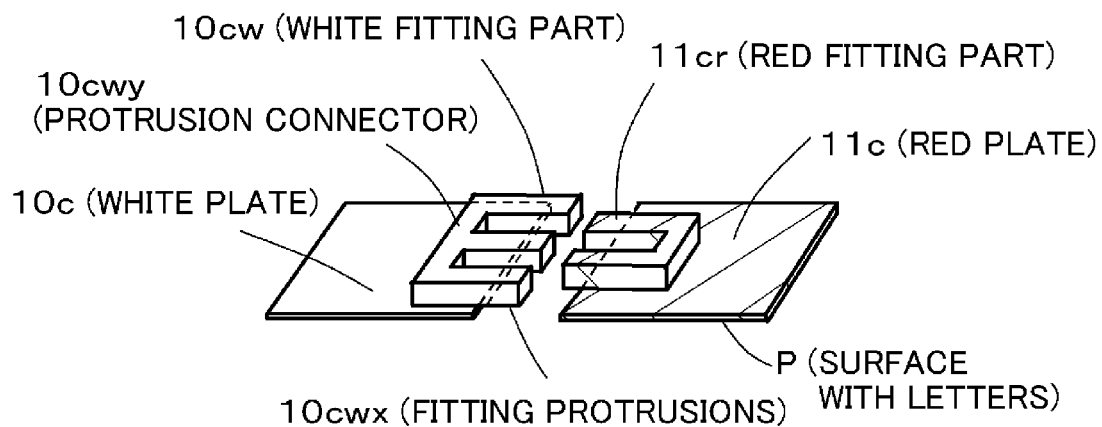
FIG. 41B shows another step of manufacturing the brand nameplate 100 according to the thirteenth embodiment of the present invention.
Figure 41C:
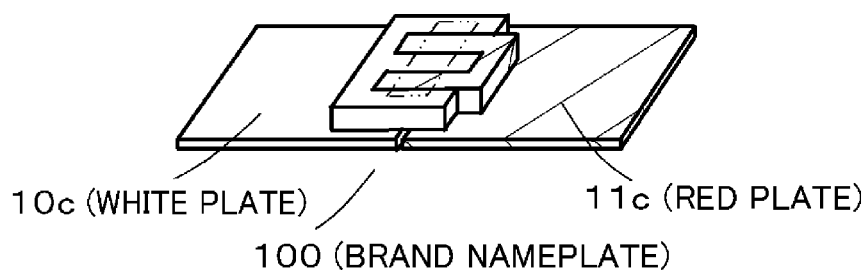
FIG. 41C shows further another step of manufacturing the brand nameplate 100 according to the thirteenth embodiment of the present invention.

In the thirteenth embodiment of the present invention, a method of manufacturing a white fitting part 10cw and a red fitting part 11cr as separated parts and welding these parts to the planar part of a white plate 10c and the planar part of a red plate 11c, respectively, will be described. FIGS. 41A, 41B, and 41C show a manufacturing process, including three steps, of a brand nameplate 100.

Specifically, the steps are as follows.

(First Step) The thermoplastic resin member 10c that is the thinner white plate, the white fitting part 10cw, the thermoplastic resin member 11c that is the thinner red plate, and the red fitting part 11cr are formed as separated parts.

(Second Step) The thermoplastic resin member 10c that is the thinner white plate and the white fitting part 10cw are welded together, and the thermoplastic resin member 11c that is the thinner red plate and the red fitting part 11cr are welded together.

(Third Step) The thermoplastic resin member 10c that is the thinner white plate with the white fitting part 10cw and the thermoplastic resin member 11c that is the thinner red plate with the red fitting part 11cr are welded into the brand nameplate 100.

In the first step, a thermoplastic resin plate is cut by a known technique into the thermoplastic resin member 10c that is the thinner white plate, the white fitting part 10cw, the thermoplastic resin member 11c that is the thinner red plate, and the red fitting part 11cr as separate parts.

Figure 42:
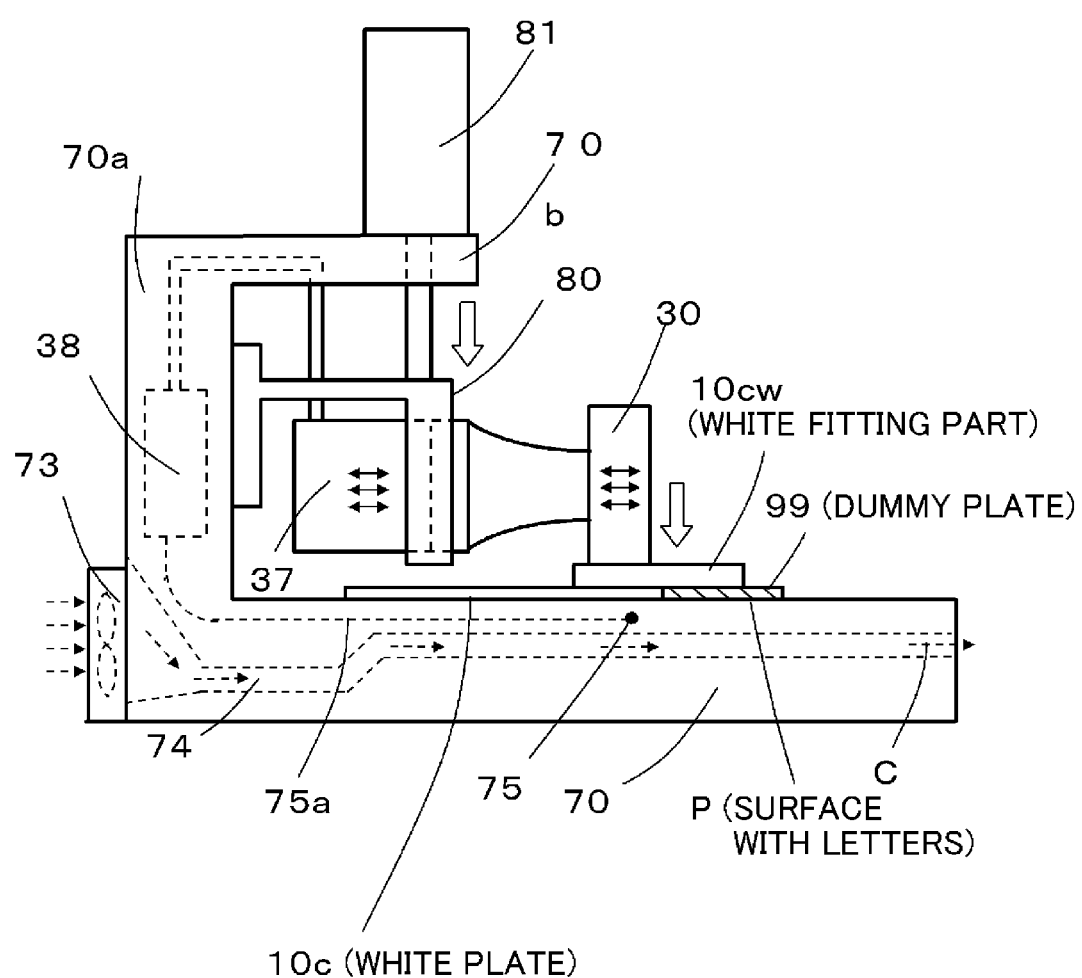
FIG. 42 shows a state in which an ultrasonic welding machine according to the thirteenth embodiment of the present invention welds a white fitting part onto a white plate.
Figure 43:
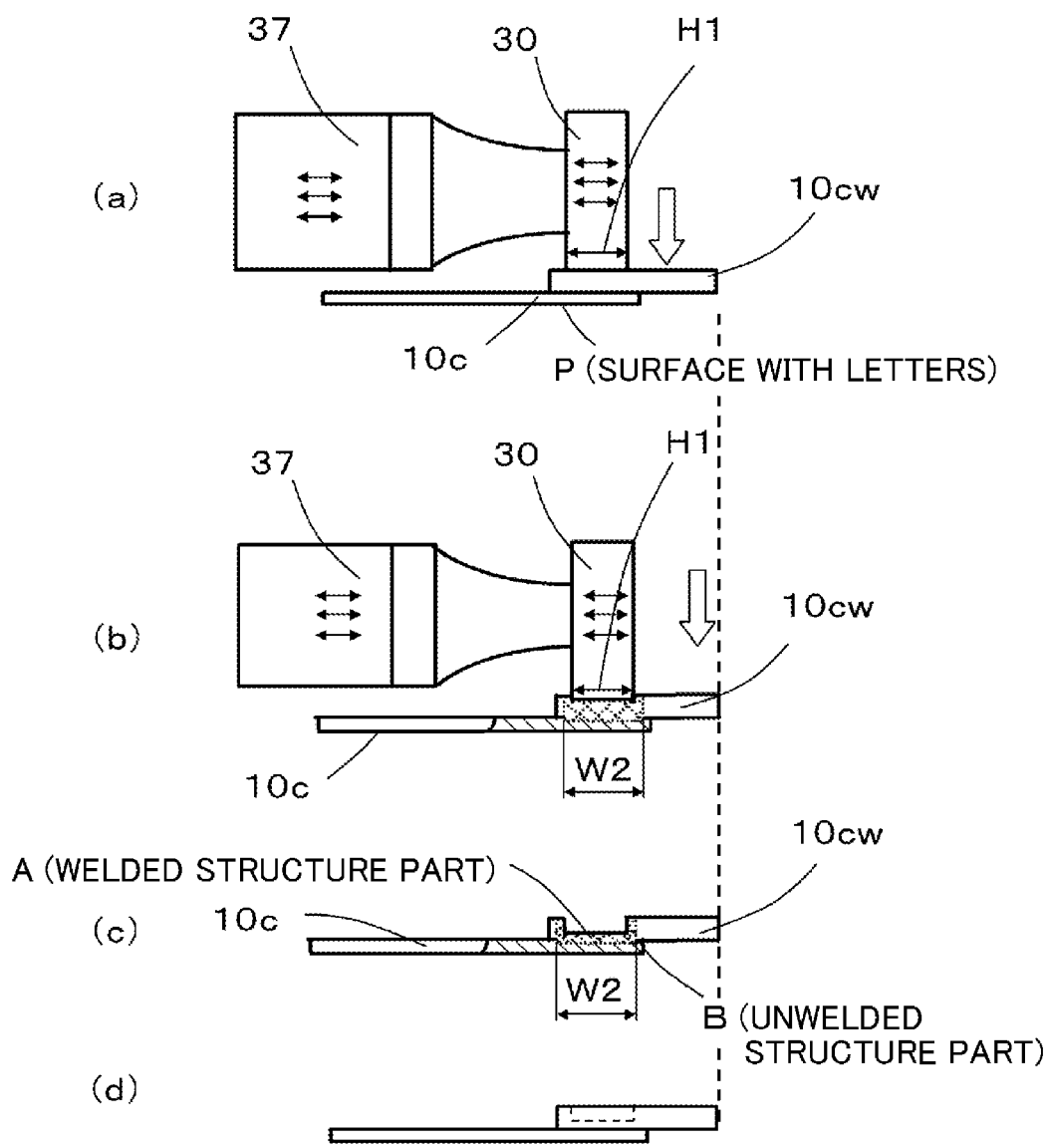
FIG. 43 includes: (a) and (b) which show a state in which the ultrasonic welding machine according to the thirteenth embodiment of the present invention welds the white fitting part on the white plate; and (c) and (d) which show the white plate and the white fitting part welded together by the ultrasonic welding machine according to the thirteenth embodiment of the present invention.

In the second step, as shown in FIG. 42, a dummy plate 99 is placed on an anvil 70 in the ultrasonic welding machine according to the present invention. The end surface of the dummy plate 99 abuts on the thermoplastic resin member 10c that is the white plate. The white fitting part 10cw is placed on the dummy plate 99 and the thermoplastic resin member 10c that is the white plate. The outermost part of the pressing surface of the tool horn is located within the thermoplastic resin member 10c that is the white plate using, as the boundary, the interface between the end surface of the dummy plate 99 and the thermoplastic resin member 10c that is the white plate. Since no ultrasonic vibration energy is applied to the interface between the end surface of the dummy plate 99 and the thermoplastic resin member 10c that is the white plate, the structure remains unwelded. Utilizing this feature, the upper surface of the white fitting part 10cw is pressed by the pressing surface of the tool horn vibrating ultrasonically in a direction along the upper surface so that the upper surface is welded as shown in (a), (b), (c), and (d) of FIG. 43.

In the third step, the thermoplastic resin member 10c that is the thinner white plate with the white fitting part 10cw and the thermoplastic resin member 11c that is the thinner red plate with the red fitting part 11cr are welded together to obtain the brand nameplate 100.

In the procedure described above, the individual parts are welded ultrasonically to produce the brand nameplate 100.

An example has been described above in which two or more thermoplastic resin members are aligned and placed on the anvil and the end surfaces of the two or more thermoplastic resin members are butt welded. Alternatively, the present invention is also applicable to welding of two or more thermoplastic resin members stacked on an anvil.

In the following fourteenth to sixteenth embodiments, an ultrasonic welding method, the structure welded by the ultrasonic welding method, and an ultrasonic welding machine will be described. In the method, two or more thermoplastic resin members are welded as follows. That is, the two or more thermoplastic resin members are stacked one on another on an anvil. The pressing surface of a tool horn vibrating ultrasonically in a direction not perpendicular to but along the upper surfaces of the thermoplastic resin members is pressed on the upper surfaces. The pressing force of the tool horn vibrating ultrasonically is applied to melt the vicinity of the upper surfaces of the thermoplastic resin members. A welded structure part is therefore formed on an unwelded structure part to obtain an overlap structure including the welded structure part arranged on the unwelded structure part.

Fourteenth Embodiment of Present Invention

In an ultrasonic welding machine according to the fourteenth embodiment of the present invention, a heat-resistant film and a heat-resistant ring are welded together.

Figure 44A:
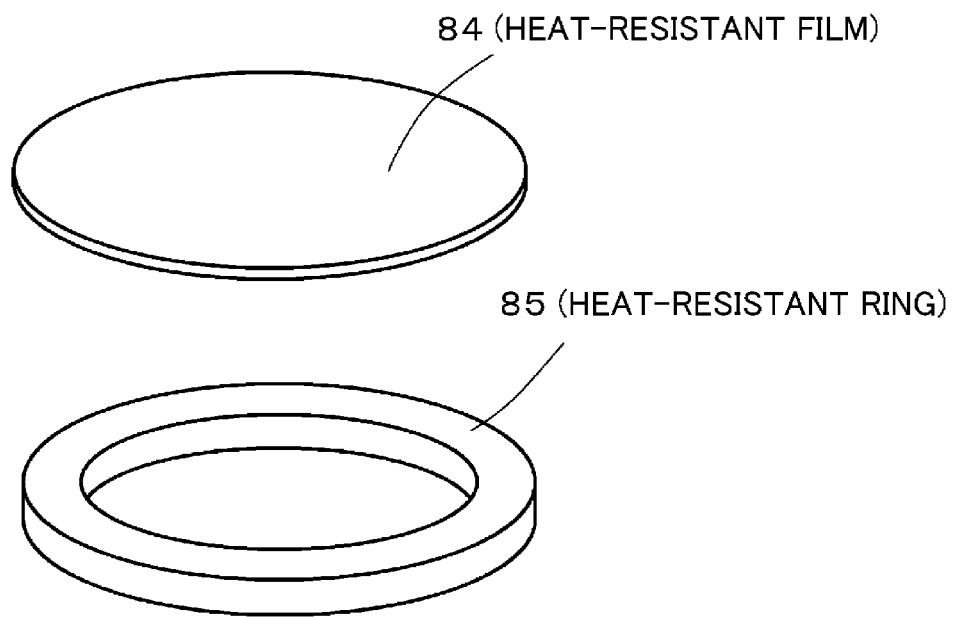
FIG. 44A is a perspective view showing a heat-resistant film and a heat-resistant ring according to a fourteenth embodiment of the present invention.
Figure 44B:
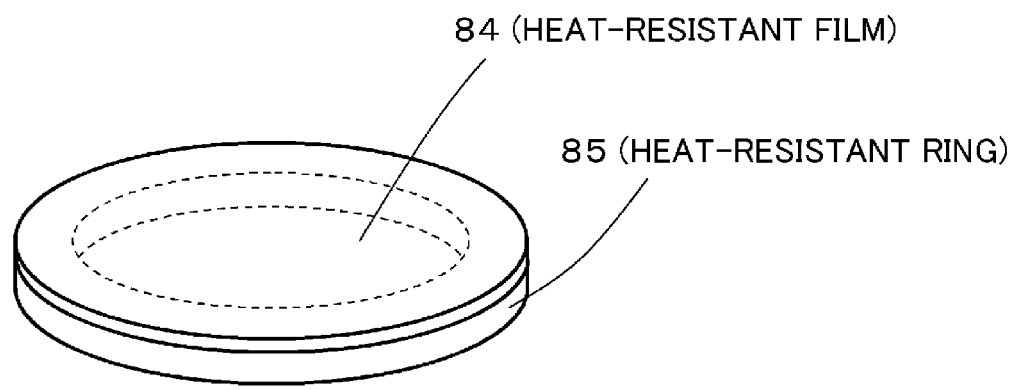
FIG. 44B is a perspective view showing the heat-resistant film and the heat-resistant ring welded together in the fourteenth embodiment of the present invention.
Figure 45:
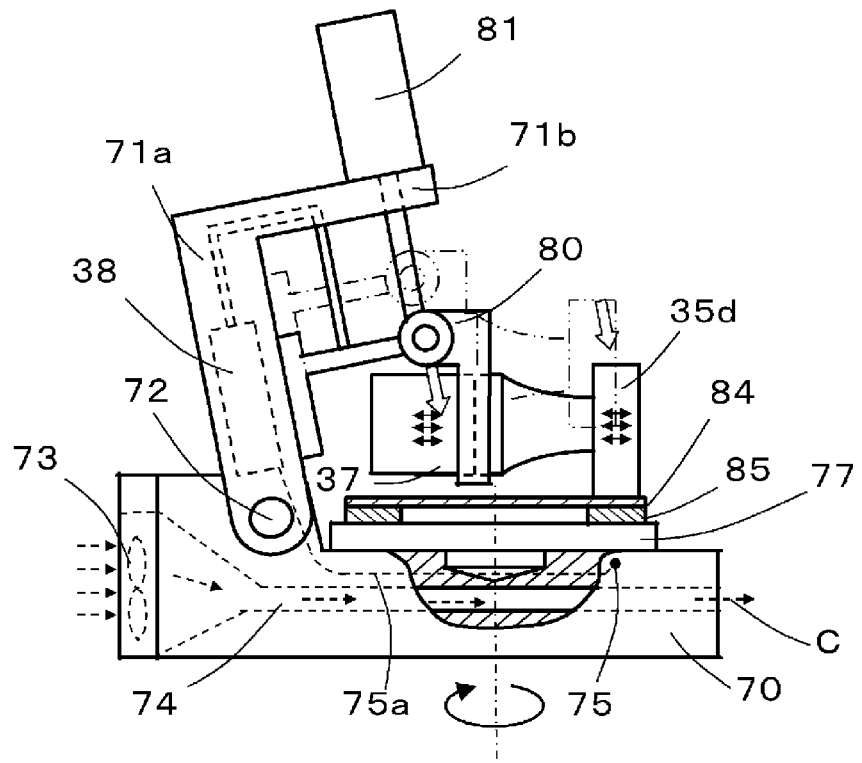
FIG. 45 is a front view showing a state in which an ultrasonic welding machine according to the fourteenth embodiment of the present invention welds the heat-resistant film and the heat-resistant ring together, and partially including a cross section.

FIG. 44A is a perspective view showing a heat-resistant film 84 and a heat-resistant ring 85 according to the fourteenth embodiment of the present invention. FIG. 44B is a perspective view showing the heat-resistant film 84 and the heat-resistant ring 85 welded together. In FIG. 45, the heat-resistant ring 85 is placed on a turntable 77 rotatably attached onto an anvil 70. The heat-resistant film 84 is placed on the ring. In this state, the pressing surface of a tool horn 35d vibrating ultrasonically in a direction along the surfaces of the heat-resistant ring 85 and the heat-resistant film 84, that is, performing what is called "horizontal vibration," is pressed obliquely from the upper left to the lower right to weld the film and the ring together.

Figure 46:
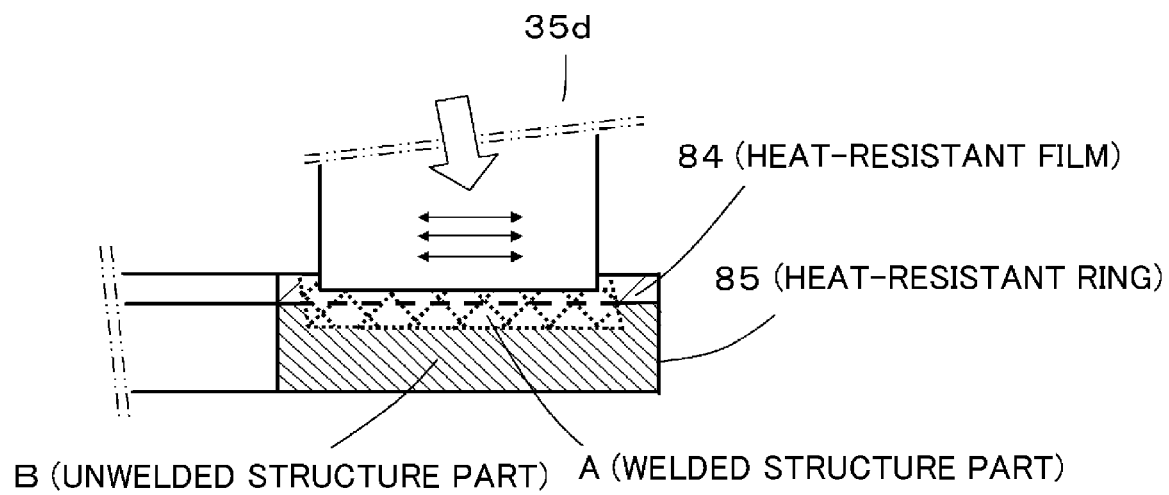
FIG. 46 is an enlarged view of a major part showing a state in which the ultrasonic welding machine according to the fourteenth embodiment of the present invention welds the heat-resistant film and the heat-resistant ring together.

FIG. 46 is an enlarged view of a state in which the ultrasonic welding machine according to the fourteenth embodiment of the present invention welds the heat-resistant film 84 and the heat-resistant ring 85 together. Both the heat-resistant film 84 and the heat-resistant ring 85 have high melting point temperatures and thus hardly melt. However, as shown in FIG. 46, when the pressing surface of the tool horn 35d vibrating ultrasonically in the direction along the surfaces of the heat-resistant ring 85 and the heat-resistant film 84 is pressed onto the surface, a welded structure part (A) is formed on an unwelded structure part (B).

Super engineering plastics such as liquid crystal polymer (LCP) were tried as the material of the heat-resistant film 84 and the heat-resistant ring 85. As a result, the heat-resistant film 84 was beautifully welded to the heat-resistant ring 85 without causing any thermal deformation. In particular, a significantly thin heat-resistant film 84 with a thickness of several tens of μm was welded beautifully, and the technique can thus be utilized in wider technical fields including precision parts.

In a case in which the heat-resistant ring 85 that is a molded article with a higher heat resistance and the heat-resistant film 84 made of the same material are welded by an ultrasonic welder, a welding method using vertical vibration, that is, a welding method applying vertical vibration to the upper surfaces of the thermoplastic resin members causes thermal deformation of only the heat-resistant ring 85 on the welding interface, and it is therefore extremely difficult to provide a sufficient welding strength. On the other hand, horizontal vibration, that is, vibration parallel to the upper surfaces of the thermoplastic resin members provides better heat generation efficiency as compared to the vertical vibration. In the horizontal vibration, a distance that needs to be melted to provide a required strength is significantly short, and no thermal deformation of the heat-resistant ring 85 occurs. Even in a case in which the heat-resistant ring 85 and the heat-resistant film 84 are welded at an extremely smaller width that is too small to ensure strength in welding by the vertical vibration, the ring and the film are welded to each other at a low pressure by the horizontal vibration and not deformed by the pressure.

According to the experiment in the fourteenth embodiment of the present invention, it is possible to weld a thin resin having a higher thermal deformation temperature. Even welding at a small width can ensure sufficient strength. Such welding is advantageous in reducing the sinking amount of the melted resin and reduce welding burrs.

Fifteenth Embodiment of Present Invention

An example has been described in the fourteenth embodiment in which the heat-resistant ring 85 and the heat-resistant film 84 are welded together. An ultrasonic welding machine according to a fifteenth embodiment welds, instead of the heat-resistant film 84, a heat-resistant lattice-like filter 94 to a heat-resistant thin ring 95.

Figure 47A:
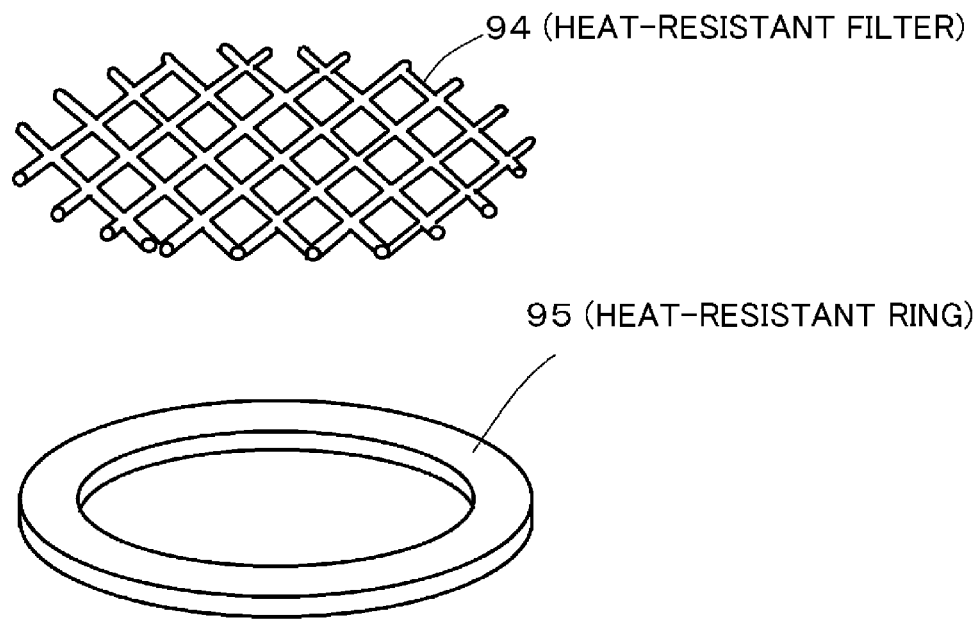
FIG. 47A is a perspective view showing a heat-resistant filter and a heat-resistant ring according to a fifteenth embodiment of the present invention.
Figure 47B:
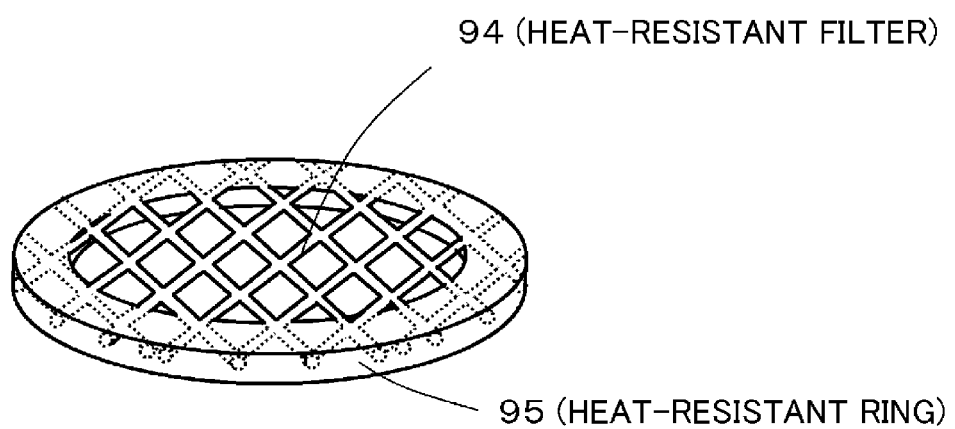
FIG. 47B is a perspective view showing the heat-resistant filter and the heat-resistant ring welded together in the fifteenth embodiment of the present invention.
Figure 48:
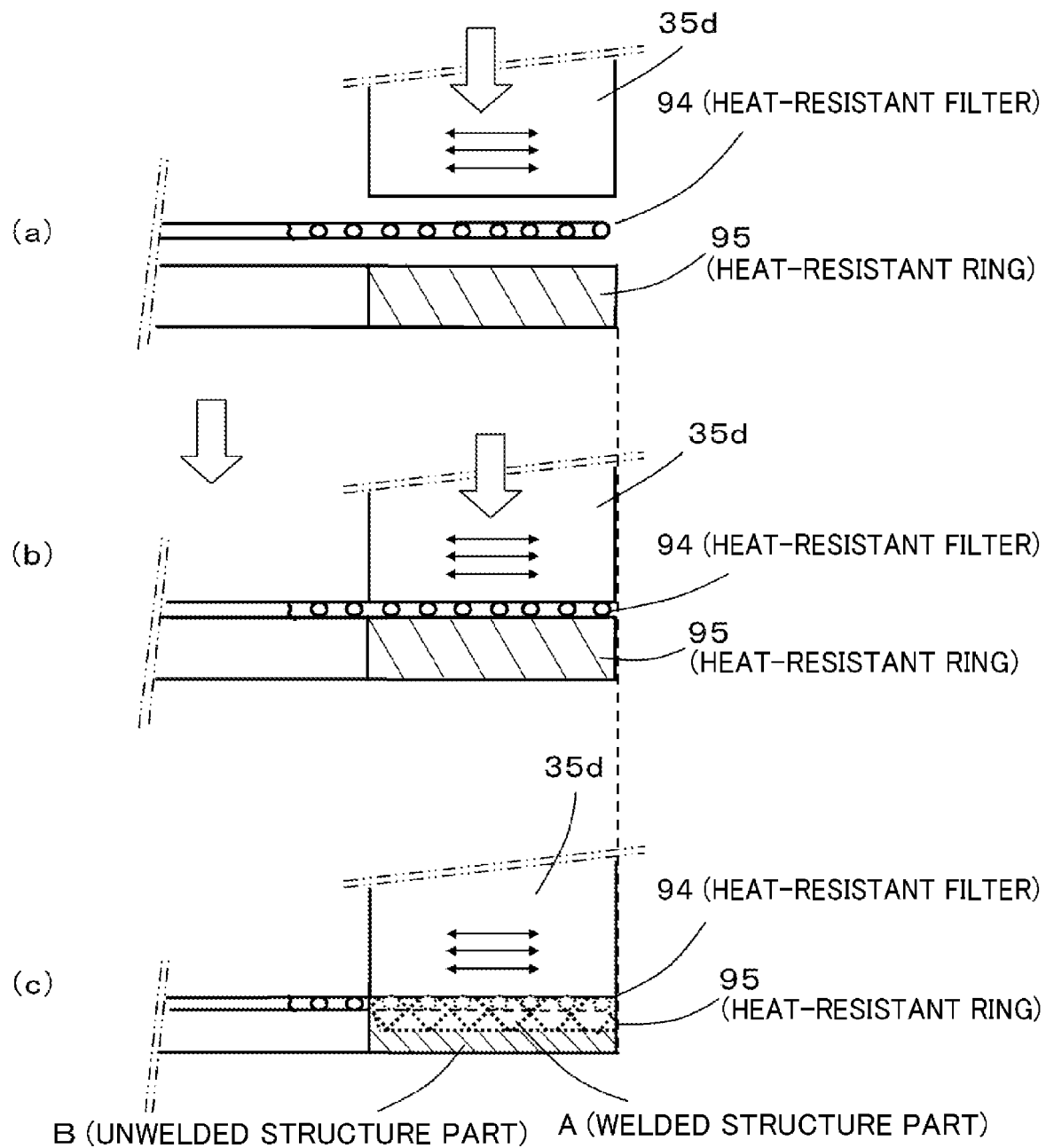
FIG. 48 includes (a), (b), and (c) which are transition diagrams showing a procedure of welding the heat-resistant filter and the heat-resistant ring together by an ultrasonic welding machine according to the fifteenth embodiment of the present invention.

FIG. 47A is a perspective view showing the heat-resistant filter 94 and the heat-resistant ring 95 according to the fifteenth embodiment of the present invention. FIG. 47B is a perspective view showing the heat-resistant filter and the heat-resistant ring welded together. In FIG. 48, (a), (b), and (c) are transition diagrams showing a procedure of welding the heat-resistant filter and the heat-resistant ring together by an ultrasonic welding machine according to the fifteenth embodiment of the present invention.

In particular, in FIG. 48, the pressing surface of a tool horn 35d vibrating ultrasonically in a direction along the surfaces of the heat-resistant ring 95 and the heat-resistant filter 94 is pressed in a direction perpendicular to the surfaces the heat-resistant ring 95 and the heat-resistant filter 94.

Both the heat-resistant filter 94 and the heat-resistant ring 95 have high melting point temperatures and thus hardly melt. However, when the pressing surface of a tool horn 35c vibrating ultrasonically in the direction along the surfaces of the heat-resistant ring 95 and the heat-resistant filter 94 is pressed onto the surfaces, a welded structure part (A) is formed on an unwelded structure part (B) as shown in (c) of FIG. 48. The heat-resistant filter 94 sinks into the heat-resistant ring 95 and welds in this state.

According to the fifteenth embodiment of the present invention, too, it is possible to weld a thin resin having a higher thermal deformation temperature. Even welding at a small width can ensure sufficient strength. Such welding is advantageous in reducing the sinking amount of the melted resin and reduce welding burrs.

Sixteenth Embodiment of Present Invention

The pair of thermoplastic resin members that are objects to be welded are not only the planes such as flat plates or sheets but also three-dimensional objects such as polyhedrons or spheres including helmets or containers. An example will be described as a sixteenth embodiment of the present invention in which a heat-resistant film is welded to the bottom of a round plate-like plastic container.

Figure 49:
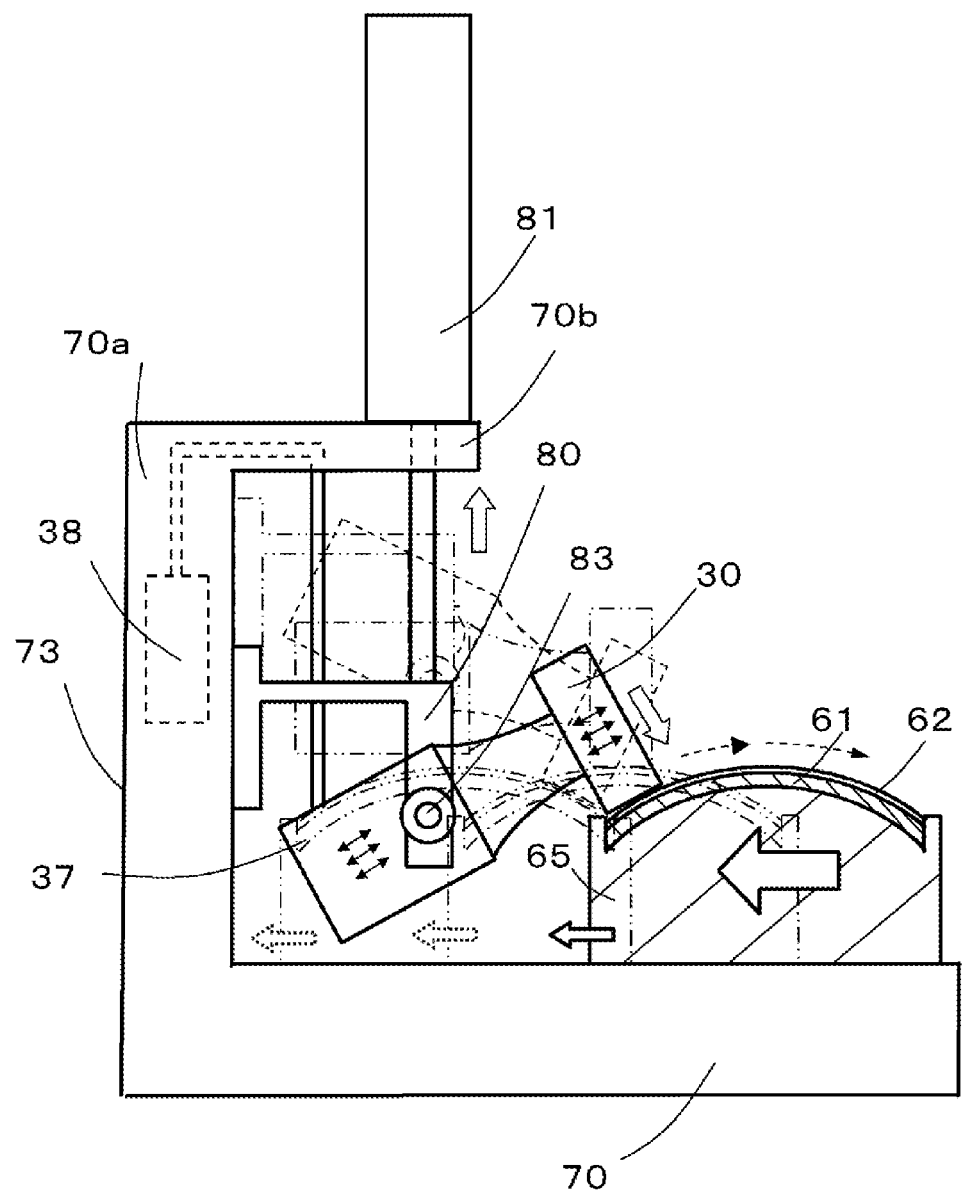
FIG. 49 is a front view of an ultrasonic welding machine according to a sixteenth embodiment of the present invention at the start of a welding operation.
Figure 50:
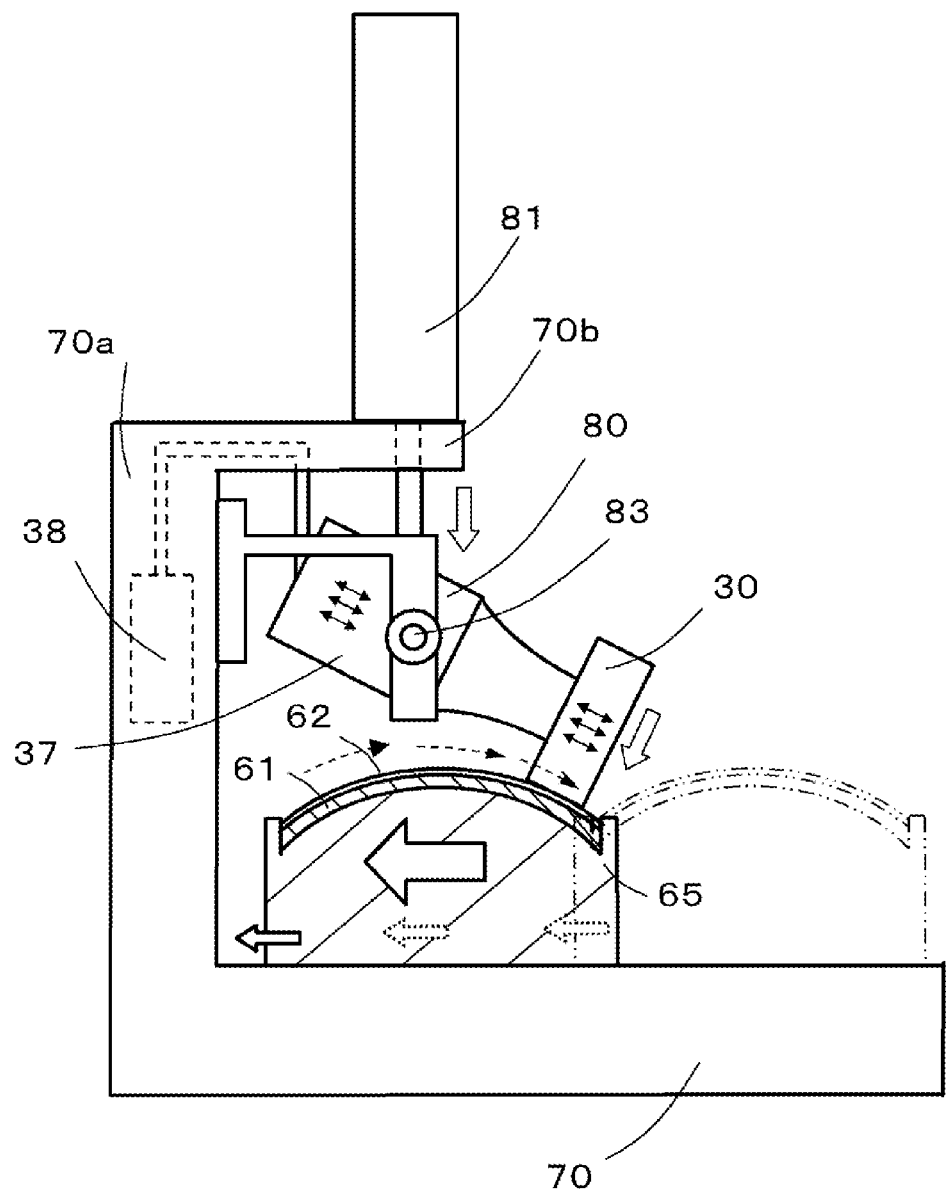
FIG. 50 is a front view of the ultrasonic welding machine according to the sixteenth embodiment of the present invention at the end of the welding operation.
Figure 51:
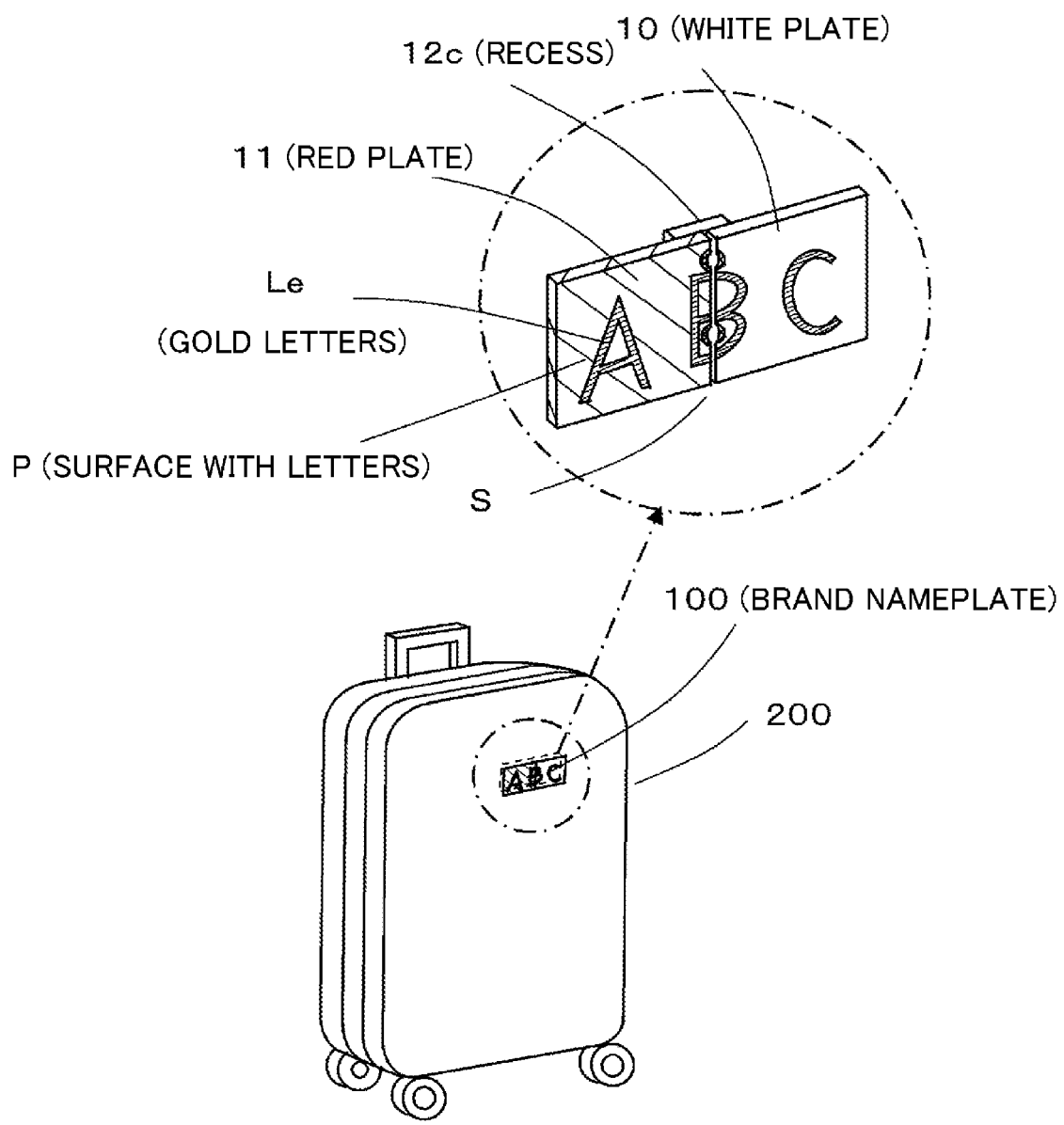
FIG. 51 is a perspective view of a suitcase with casters according to background art, including an enlarged view of a brand nameplate that is a welded structure.

FIG. 49 is a front view of an ultrasonic welding machine according to the sixteenth embodiment of the present invention at the start of a welding operation. FIG. 50 is a front view of the ultrasonic welding machine according to the sixteenth embodiment of the present invention at the end of the welding operation.

In FIGS. 49 and 50, an integral body of a tool horn 30 and an ultrasonic vibrator 37 is supported swingably about a support shaft 83 of a support 80. In short, the tool horn 30 and the ultrasonic vibrator 37 vibrate ultrasonically along the axes of the tool horn 30 and the ultrasonic vibrator 37 and swing about the support shaft 83. The pressing surface of the tool horn 30 abuts on the upper surfaces of a pair of thermoplastic resin members at a constant pressure. In FIGS. 49 and 50, a slide table 65 is slidably placed on an anvil 70. A thermoplastic resin member 61, which is a round plate-like plastic container, is turned down on the upper surface of the slide table 65. A thermoplastic resin member 62, which is a thin heat-resistant film, is stacked on the resin member. The basic structure of the ultrasonic welding machine is similar to that of the ultrasonic welding machine described above with reference to FIGS. 2 and 25. Thus, the description of the structure of the machine will be omitted.

A pressing force of the tool horn 30 vibrating ultrasonically in two opposite directions along the upper surfaces of the pair of thermoplastic resin members 61 and 62 is applied to the upper surfaces, while the slide table 65 from the right to the left in FIGS. 49 and 50 are moved. The pressing surface of the tool horn 30 abuts on the upper surfaces of the pair of thermoplastic resin members 61 and 62 at a constant pressure, while changing the angle like a swinging motion of a shaver, to melt the vicinity of the upper surfaces of the pair of thermoplastic resin members 61 and 62.

The ultrasonic vibration energy flows along the upper surfaces of the pair of thermoplastic resin members 61 and 62 and does not flow along the thickness of the pair of thermoplastic resin members 61 and 62. This means that an unwelded structure part is left on the anvil-side of the pair of thermoplastic resin members 61 and 62, and that a welded structure part is formed on the unwelded structure part. As a result, the pair of thermoplastic resin members 61 and 62 are welded together in an overlap structure including the welded structure part arranged on the unwelded structure part.

It is understood from the above description that the "tool horn vibrating ultrasonically in two opposite directions along the upper surfaces of the pair of thermoplastic resin members" includes not only (1) the tool horn, described in the first to seventh embodiments, which vibrates ultrasonically along a plane parallel to the upper surfaces of the pair of thermoplastic resin members, but also (2) the tool horn, described in the eighth embodiment, which vibrates ultrasonically along a plane intersecting obliquely with the upper surfaces of the pair of thermoplastic resin members, and (3) the tool horn which vibrates ultrasonically along a plane parallel to the upper surfaces of the thermoplastic resin members, even if the upper surfaces of the pair of thermoplastic resin members are curved.

It is understood from the above description that the directions in which "a pressing force of the tool horn vibrating ultrasonically is applied to the upper surfaces of the pair of thermoplastic resin members" includes not only (1) a direction, described in the first to seventh embodiments, which is perpendicular to the upper surfaces of the pair of thermoplastic resin members, but also (2) a direction, described in the eighth embodiment, which intersects obliquely with the upper surfaces of the pair of thermoplastic resin members.

Note that those skilled in the art of ultrasonic welding machines or ultrasonic welders may refer to applying ultrasonic vibration perpendicularly to the surfaces of thermoplastic resin members as "applying vertical vibration," and applying ultrasonic vibration in parallel to the surfaces of thermoplastic resin members as "applying horizontal vibration." The fourteenth embodiment has been described using the terms of the "vertical vibration" and the "horizontal vibration." According to this usage of the terms, the expressions "vibration in a direction not perpendicular to but along the upper surface(s)" defined as a feature of the present invention may be replaced with the expression—vibration that is not a vertical vibration but a vibration along the upper surface(s)—.

Important features of the present invention further include: a pressing force of a tool horn vibrating ultrasonically is applied to melt the vicinity of upper surfaces of a pair of thermoplastic resin members and form a welded structure part on an unwelded structure part, thereby welding the pair of thermoplastic resin members together in an overlap structure including a welded structure part arranged on an unwelded structure part.

The unwelded structure part is a structure part that is not welded, and its surface remains as it is before the welding operation, which means that the distance between facing surfaces does not increase. The distance and positional relationship between so-called end surfaces do not change. Moreover, the temperature of the surfaces does not increase to a high temperature, and burning does not occur on the surfaces.

The operations in the flowchart or the cooler for cooling the anvil described above are used so that when the vicinity of the upper surfaces of the pair of thermoplastic resin members is welded, the welded structure part is formed on the unwelded structure part to obtain the overlap structure including the welded structure part arranged on the unwelded structure part.

INDUSTRIAL APPLICABILITY

The present invention is widely applicable to an ultrasonic welding method and an ultrasonic welding machine in which: a pair of thermoplastic resin members are arranged so that end surfaces face each other or layered on each other; and a tool horn vibrating ultrasonically is pressed directly onto a surface or surfaces of the pair of thermoplastic resin members, or indirectly through another thermoplastic resin member interposed therebetween, thereby welding the thermoplastic resin members, such as a case in which: a pair of thermoplastic resin members are arranged so that end surfaces face each other; and a tool horn vibrating ultrasonically is pressed directly onto the facing end surfaces, or indirectly through another thermoplastic resin member layered on the pair of thermoplastic resin members, thereby melting the interface between the pair thermoplastic resin members and the other thermoplastic resin member

DESCRIPTION OF REFERENCE CHARACTERS 10, 11 Pair of Thermoplastic Resin Members
12 Another Thermoplastic Resin Member
30, 35, 36 Tool Horn
60 Frame-Like Positioning Jig Cover
65 Slide Table
70 Anvil

The invention claimed is:

1. A structure welded by an ultrasonic welding method of welding two or more thermoplastic resin members, the method including:
    placing the two or more thermoplastic resin members on an anvil;
    pressing, onto upper surfaces of the thermoplastic resin members, a pressing surface of a tool horn vibrating ultrasonically in a direction not perpendicular to but along the upper surfaces;
    applying a pressing force of the tool horn vibrating ultrasonically to melt a vicinity of the upper surfaces of the thermoplastic resin members; and
    forming a welded structure part on an unwelded structure part to obtain an overlap structure including the welded structure part arranged on the unwelded structure part.

2. The structure of claim 1, wherein
the two or more thermoplastic resin members are placed on the anvil with end surfaces of a pair of thermoplastic resin members facing each other, and
the tool horn presses onto an upper surface of a region where the end surfaces of the pair of thermoplastic resin members face each other, a pressing surface vibrating ultrasonically in a direction not perpendicular to but along the upper surface.

3. The structure of claim 1, wherein
the two or more thermoplastic resin members are placed on the anvil with end surfaces of a pair of thermoplastic resin members facing each other,
another thermoplastic resin member is placed on a region where the end surfaces of the pair of thermoplastic resin members face each other, and
the tool horn presses onto an upper surface of the other thermoplastic resin member, a pressing surface vibrating ultrasonically in a direction not perpendicular to but along the upper surface.

4. The structure of claim 1, wherein
the two or more thermoplastic resin members are fitting parts at associated ends of the respective ones of a pair of objects to be welded,
the pair of objects to be welded are placed on the anvil with the fitting parts fitting into each other, and
the tool horn presses onto upper surfaces of the fitting parts through which the pair of objects to be welded fit into each other, a pressing surface vibrating ultrasonically in a direction not perpendicular to but along the upper surfaces.

5. An ultrasonic welding machine comprising:
an anvil on which two or more thermoplastic resin members are placed;
a tool horn having a pressing surface, the pressing surface descending and being pressed onto upper surfaces of the two or more thermoplastic resin members while vibrating ultrasonically in a direction not perpendicular to but along the upper surfaces;
a press configured to cause the pressing surface of the tool horn to descend and press onto the upper surfaces of the two or more thermoplastic resin members; and
a controller configured to control, in accordance with a sinking amount of the tool horn, ultrasonic vibration of the tool horn and pressing of the tool horn by the press, the controller being configured to control welding of the two or more thermoplastic resin members by controlling the tool horn so as to apply a pressing force that presses the upper surfaces of the two or more thermoplastic resin members, while keeping the tool horn vibrating ultrasonically, to melt a vicinity of the upper surfaces of the two or more thermoplastic resin members, and configured to stop the descending of the tool horn and cause the tool horn to ascend when the sinking amount of the tool horn reaches a predetermined sinking amount, thereby forming a welded structure part on an unwelded structure part, and welding the two or more thermoplastic resin members in an overlap structure including the welded structure part arranged on the unwelded structure part.

6. The ultrasonic welding machine of claim 5, wherein
the two or more thermoplastic resin members are a pair of thermoplastic resin members, end surfaces of the pair of thermoplastic resin members facing each other, and the tool horn has a pressing surface, the pressing surface descending and being pressed onto an upper surface of a region where the end surfaces of the pair of thermoplastic resin members face each other while vibrating ultrasonically in a direction not perpendicular to but along the upper surface.

7. The ultrasonic welding machine of claim 5, wherein
the two or more thermoplastic resin members are a pair of thermoplastic resin members, end surfaces of the pair of thermoplastic resin members facing each other, and another thermoplastic resin member placed on a region where the end surfaces of the pair of thermoplastic resin members face each other, and
the tool horn has a pressing surface, the pressing surface descending and being pressed onto an upper surface of the other thermoplastic resin member while vibrating ultrasonically in a direction not perpendicular to but along the upper surface.

8. The ultrasonic welding machine of claim 5, wherein
the two or more thermoplastic resin members are fitting parts at associated ends of the respective ones of a pair of objects to be welded, the fitting parts being fitted into each other on the anvil,
the tool horn has a pressing surface, the pressing surface descending and being pressed onto upper surfaces of the fitting parts of the pair of objects to be welded while vibrating ultrasonically in a direction not perpendicular to but along the upper surfaces.

9. The ultrasonic welding machine of claim 5, further comprising:
a temperature sensor configured to measure a temperature of the anvil;
a cooler configured to cool the anvil; and
a cooling controller configured to cool the temperature of the anvil to a predetermined temperature or lower using the cooler based on temperature information on the anvil detected by the temperature sensor, wherein
the controller performs control for stopping the ultrasonic vibration and the pressing of the tool horn when the temperature of the anvil reaches or exceeds a certain temperature, and
the cooling controller performs control for cooling the temperature of the anvil to the predetermined temperature or lower.

10. The ultrasonic welding machine of claim 5, further comprising:
a temperature sensor configured to measure a temperature of the anvil;
a cooler configured to cool the anvil; and
a cooling controller configured to cool the temperature of the anvil to a predetermined temperature or lower using the cooler based on temperature information on the anvil detected by the temperature sensor, wherein
while the cooling controller performs control for cooling the temperature of the anvil to the predetermined temperature or lower, the controller causes the ultrasonic vibration and the pressing of the tool horn.

11. The ultrasonic welding machine of claim 5, wherein
the pressing surface of the tool horn has alternating projections and recesses.

12. The ultrasonic welding machine of claim 5, further comprising:
a tool horn mover configured to move the tool horn along the upper surfaces of the two or more thermoplastic resin members; and
a moving speed controller configured to control a moving speed of the tool horn mover variably in a predetermined pattern, wherein welding of the two or more thermoplastic resin members is controlled by procedures in which
the controller causes the ultrasonic vibration and the pressing of the tool horn to cause the tool horn to vibrate ultrasonically in a direction not perpendicular to but along the upper surfaces of the thermoplastic resin members and press the upper surfaces by the pressing surface of the tool horn, and
simultaneously with the ultrasonic vibration and the pressing of the tool horn, the tool horn mover and the moving speed controller are used to move the pressing surface of the tool horn along the upper surfaces of the two or more thermoplastic resin members at the moving speed variable in the predetermined pattern, so that the vicinity of the upper surfaces of the two or more thermoplastic resin members is melted to form a the welded structure part on the unwelded structure part, and the two or more thermoplastic resin members are welded in the overlap structure including the welded structure part arranged on the unwelded structure part.

13. The ultrasonic welding machine of claim 5, further comprising:
a temperature sensor configured to measure a temperature of the anvil; and
a detector configured to detect an amount of ultrasonic vibration energy emitted from the tool horn, wherein
when the temperature of the anvil according to the temperature information from the temperature sensor exceeds the predetermined temperature, and the amount of ultrasonic vibration energy emitted from the tool horn and detected by the detector exceeds a predetermined value, the controller performs control for stopping the ultrasonic vibration and the pressing of the tool horn.

14. A structure obtained by welding two or more thermoplastic resin members placed on an anvil, using a tool horn configured to vibrate ultrasonically in a direction not perpendicular to but along upper surfaces of the two or more thermoplastic resin members, wherein
the structure has an overlap structure including a welded structure part arranged on an unwelded structure part,
the welded structure part is formed by applying, to the upper surfaces of the thermoplastic resin members, ultrasonic vibration energy in the direction not perpendicular to but along the upper surfaces of the thermoplastic resin members so as to melt a vicinity of the upper surfaces of the thermoplastic resin members, the welded structure part corresponding to an area extending from the upper surfaces of the two or more thermoplastic resin members, through an interface, which is a target of welding, between the two or more thermoplastic resin members, to a predetermined depth not reaching lower surfaces of the two or more thermoplastic resin members,
the unwelded structure part corresponds to an area to which the ultrasonic vibration energy is not applied, the unwelded structure part extending from the predetermined depth, not reaching the lower surfaces of the two or more thermoplastic resin members, to the lower surfaces, and
a surface state of the lower surfaces of the structure having the overlap structure including the welded structure part arranged on the unwelded structure part is kept unchanged before and after the welding.

* * * * *